US011921440B2

(12) United States Patent
Shimada

(10) Patent No.: US 11,921,440 B2
(45) Date of Patent: Mar. 5, 2024

(54) DEVELOPER SUPPLY DEVICE, DEVELOPMENT DEVICE, AND IMAGE FORMATION APPARATUS

(71) Applicant: Oki Electric Industry Co., Ltd., Tokyo (JP)

(72) Inventor: Shingo Shimada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/064,642

(22) Filed: Dec. 12, 2022

(65) Prior Publication Data

US 2023/0273547 A1 Aug. 31, 2023

(30) Foreign Application Priority Data

Feb. 25, 2022 (JP) ................................ 2022-027852

(51) Int. Cl.
*G03G 15/08* (2006.01)

(52) U.S. Cl.
CPC ..... *G03G 15/0886* (2013.01); *G03G 15/0872* (2013.01); *G03G 15/0875* (2013.01); *G03G 2215/068* (2013.01); *G03G 2215/0692* (2013.01)

(58) Field of Classification Search
CPC ........... G03G 15/0875; G03G 15/0886; G03G 15/0872; G03G 2215/0692; G03G 2215/068
USPC ............................ 399/258, 262; 222/DIG. 1
See application file for complete search history.

(56) References Cited

U.S. PATENT DOCUMENTS 8,526,861 B2 * 9/2013 Matsumoto ........ G03G 15/0886 399/119
9,459,557 B1 * 10/2016 Kasukawa ......... G03G 15/0879
2007/0237551 A1 * 10/2007 Kawai ................ G03G 15/0855 399/258
2008/0063427 A1 * 3/2008 Ikado ..................... G03G 21/12 399/106
2008/0181673 A1 * 7/2008 Kim ................... G03G 15/0855 399/258

(Continued)

FOREIGN PATENT DOCUMENTS

EP 985981 A1 * 3/2000 ......... G03G 15/0855
JP H06-95505 A 4/1994

*Primary Examiner* — Robert B Beatty
(74) *Attorney, Agent, or Firm* — METROLEX IP LAW GROUP, PLLC

(57) ABSTRACT

A developer supply device according to an embodiment may include: a developer container; and a developer container holder to which the developer container is to be attached in a first direction. The developer container includes: a shutter movable between a closing position to close a supply port of a housing thereof and an opening position to open the supply port; and a sealing member provided between the housing and the shutter. The shutter includes: a cover portion including a cover surface configured to close the supply port; and a protruding portion projected in the first direction from the cover portion and provided at a position spaced apart from the cover surface to a side of the developer container holder. The developer container holder includes an engagement portion to be engaged with the protruding portion in a state where the developer container is attached to the developer container holder.

12 Claims, 45 Drawing Sheets

(56) References Cited

U.S. PATENT DOCUMENTS

| | | | | |
|---|---|---|---|---|
| 2012/0003013 A1* | 1/2012 | Sakamoto | G03G 15/0877 | 399/258 |
| 2012/0257912 A1* | 10/2012 | Hasebe | G03G 15/0886 | 399/262 |
| 2014/0140735 A1* | 5/2014 | Oda | G03G 15/0875 | 399/258 |
| 2018/0307157 A1* | 10/2018 | Murata | G03G 15/0865 | |
| 2022/0057730 A1* | 2/2022 | Goto | G03G 15/0886 | |

* cited by examiner 80
81
81b
801
82
88
90
91
91a
92
98
70
71
73
75
76
77
T1
T2
T3
F3
F4
R1
R2
X
Y
Z

DEVELOPER SUPPLY DEVICE, DEVELOPMENT DEVICE, AND IMAGE FORMATION APPARATUS

CROSS REFERENCE TO RELATED APPLICATIONS

This application claims priority based on 35 USC 119 from prior Japanese Patent Application No. 2022-027852 filed on Feb. 25, 2022, entitled "DEVELOPER SUPPLY DEVICE, DEVELOPMENT DEVICE, AND IMAGE FORMATION APPARATUS", the entire contents of which are incorporated herein by reference.

BACKGROUND

The disclosure may relate to a developer supply device configured to supply a developer, a development device and an image formation apparatus equipped with the developer supply device.

In a related art, an image formation apparatus is equipped with a developer container that contains therein a developer. The developer container includes a supply port to discharge the developer and an opening/closing member to open and close the supply port (Patent Document No. 1: Japanese Patent Application Publication No. H6-95505, see FIG. 1).

SUMMARY

However, in such a configuration, when the developer container is detached, the developer may be adhered to one end portion of the opening/closing member and spilled out. This may contaminate the surroundings of the developer container.

An object of an embodiment of the disclosure may be to provide a developer supply device that is capable of preventing a developer from spilling out of a developer container.

According to an aspect of the disclosure may be a developer supply device that may include: a developer container including a housing with a supply port, and containing a developer therein; and a developer container holder that includes a reception port to receive the developer supplied from the supply port of the developer container, and to which the developer container is to be attached in a first direction. The developer container includes: an opening/closing member movable relative to the housing between a closing position where the opening/closing member closes the supply port and an opening position where the opening/closing member opens the supply port; and a sealing member provided between the housing and the opening/closing member. The opening/closing member includes: a cover portion including a cover surface configured to close the supply port; and a protruding portion projected in the first direction from the cover portion and provided at a position spaced apart from the cover surface to a side of the developer container holder. The developer container holder includes an engagement portion configured to be engaged with the protruding portion in a state where the developer container is attached to the developer container holder. A part of the engagement portion is located between the protruding portion and the sealing member at a point after the protruding portion of the opening/closing member is engaged with the engagement portion of the developer container holder and before the supply port of the developer container and the reception port of the developer container holder are opposed to each other in a course of attaching the developer container to the developer container holder.

According to the above aspect, since the opening/closing member includes the protruding portion, the developer is caught on the protruding portion when the developer container is removed, and thus is less likely to be spilled out. In addition, since a part of the engagement portion is located between the protruding portion and the sealing member at a point after the protruding portion of the developer container is engaged with the engagement portion of the developer container holder and before the supply port of the developer container and the reception port of the developer container holder are opposed to each other, it is possible to reduce the amount of the developer adhered to the protruding portion when the developer container is removed. Therefore, it may be possible to prevent the surroundings of the developer container from becoming contaminated with the developer.

DETAILED DESCRIPTION

Figure 1:
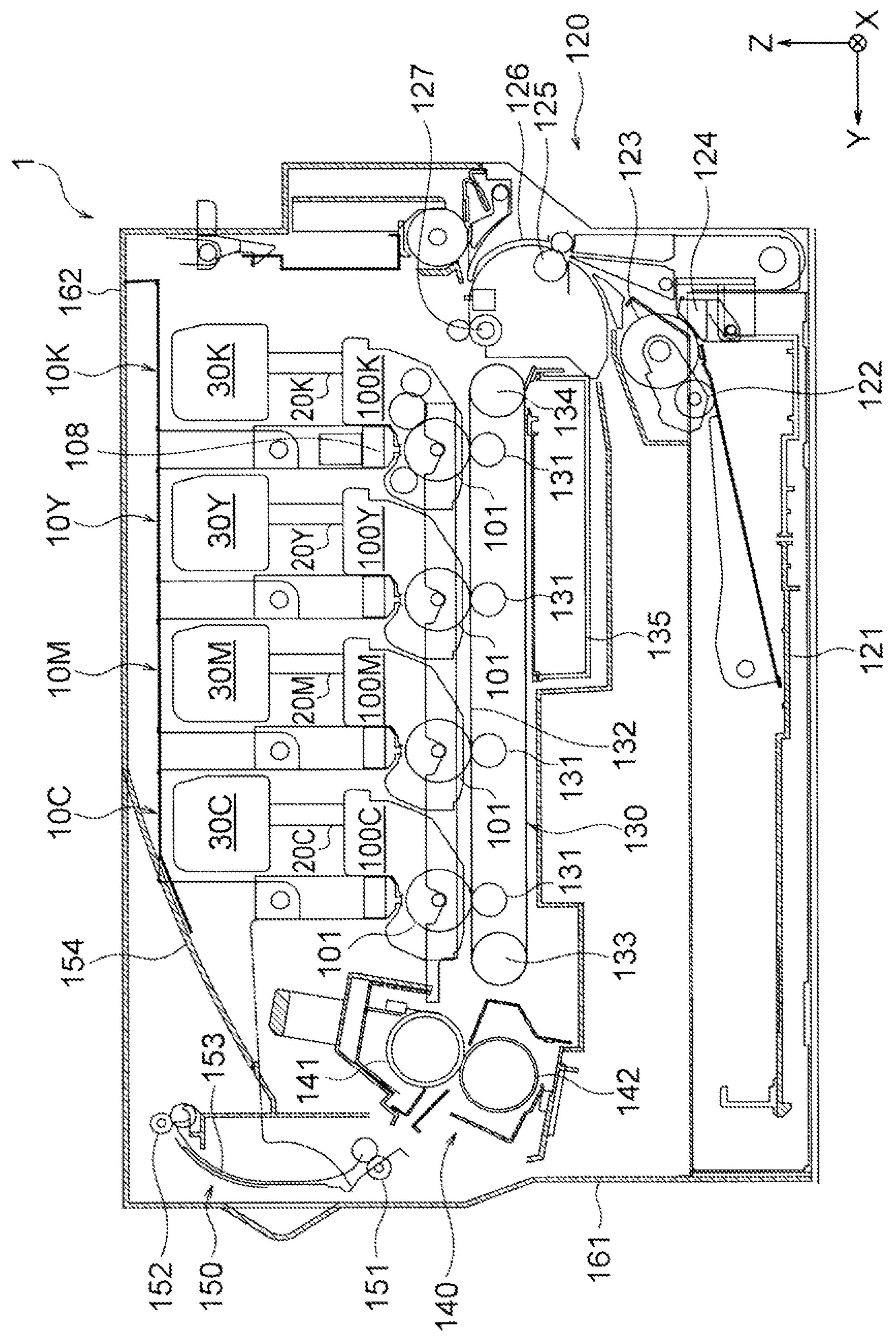
FIG. 1 is a diagram illustrating a basic configuration of an image formation apparatus according to a first embodiment.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

First Embodiment (Image Formation Apparatus)

First, an image formation apparatus according to a first embodiment is described. FIG. 1 is a diagram illustrating a view of a basic configuration of an image formation apparatus 1. The image formation apparatus 1 may be a printer configured to form images using an electrophotographic process.

The image formation apparatus 1 includes a media feeder 120 configured to supply a medium such as print paper or the like, an image formation sections 10K, 10Y, 10M, and 10C configured to form images, a transfer unit 130 configured to transfer the images onto the medium, a fixation device 140 configured to fix the images on the media, and a media discharge section 150 configured to discharge the medium. These components are accommodated in a housing 161 of the image formation apparatus 1. A top of the housing 161 is covered by a top cover 162.

The media feeder 120 includes a media cassette 121, a pickup roller 122, a feed roller 123, a separation pad 124, a resist roller 125, and a conveyance roller 127.

The media cassette 121 accommodates therein media such as printing paper or the like. The pickup roller 122 pulls out media one by one from the media cassette 121. The feed roller 123 and the separation pad 124 separate the media picked up by the pickup roller 122 one by one and feed the separated medium to a conveyance path 126.

The resist roller 125 corrects a skew of the medium fed from the media cassette 121 and conveys the medium along the conveyance path 126. The conveyance roller 127 conveys the medium being conveyed along the conveyance path 126 toward the transfer unit 130.

The image formation sections 10K, 10Y, 10M, and 10C are sections configured to form black, yellow, magenta, and cyan developer images. The image formation sections 10K, 10Y, 10M, and 10C are arranged in a conveyance direction of the medium. Each of the image formation sections 10K, 10Y, 10M, and 10C are an example of a "development device".

The image formation sections 10K, 10Y, 10M, and 10C include image formation units 100K, 100Y, 100M, and 100C, developer containers 30K, 30Y, 30M, and 30C as developer containers, and holding units 20K, 20Y, 20M, and 20C as developer container holders or developer container holding parts to hold the developer containers, respectively.

The image formation sections 10K, 10Y, 10M, and 10C may be referred to as image formation sections 10 when there is no need to distinguish between them. The image formation units 100K, 100Y, 100M, 100C may be referred to as image formation units 100 when there is no need to distinguish between them. The developer containers 30K, 30Y, 30M, and 30C may be referred to as developer containers 30 when there is no need to distinguish between them. The holding units 20K, 20Y, 20M, and 20C may be referred to as holding units 20 when there is no need to distinguish between them.

Figure 2:
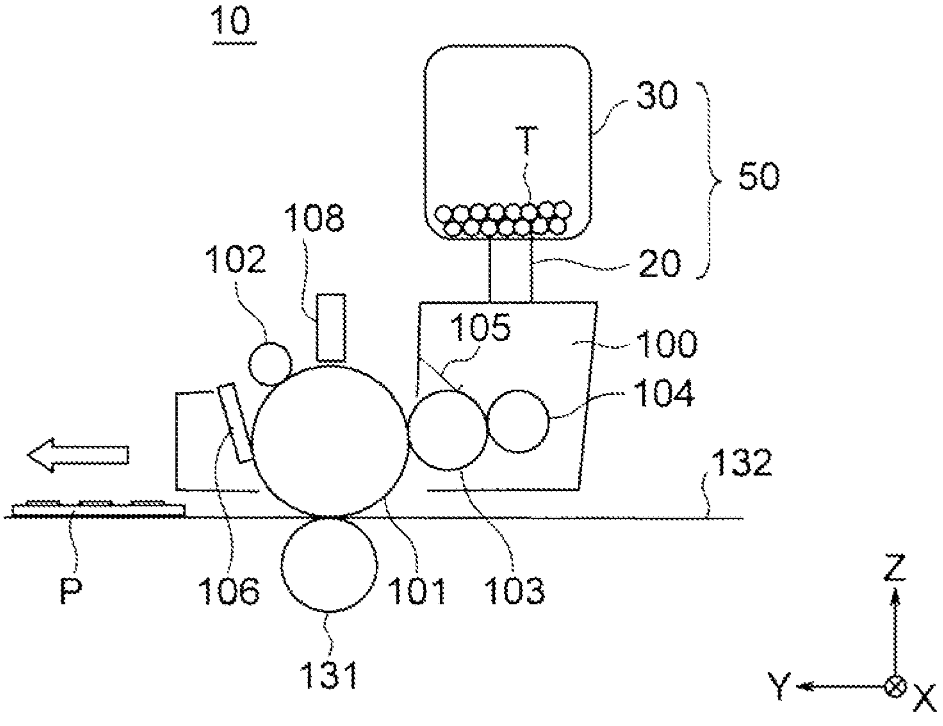
FIG. 2 is a diagram illustrating a basic configuration of an image formation section of the image formation apparatus according to a first embodiment.

FIG. 2 is a diagram illustrating a basic configuration of the image formation section 10. As illustrated in FIG. 2, the image formation section 10 as a development device includes the image formation unit 100, the developer container 30 as the developer container and the holding unit 20 as the developer container holder (or the developer container holding part).

The image formation unit 100 includes a photosensitive drum 101 as an image carrier, a charging roller 102 as a charging member, a development roller 103 as a developer carrier, a supply roller 104 as a feeding member, a development blade 105 as a layer regulating member, and a cleaning member 106.

The photosensitive drum 101 is a cylindrical member with a photosensitive layer formed on a surface of a conductive support. The photosensitive layer includes a stack of a charge generation layer and a charge transport layer. The photosensitive drum 101 rotates clockwise in FIG. 2.

An exposure head 108 as an exposure device is located so as to be opposed to the photosensitive drum 101. The exposure head 108 includes an array of LEDs (light emitting diodes) as light emitting elements and is configured to irradiate light onto the surface of the photosensitive drum 101 to form an electrostatic latent image thereon. The exposure head 108 is suspended and supported by the top cover 162 (see FIG. 1).

The charging roller 102 is disposed to be in contact with the surface of the photosensitive drum 101 and is configured to rotate along with the rotation of the photosensitive drum 101. The charging roller 102 is applied with a charging voltage to uniformly charge the surface of the photosensitive drum 101.

The development roller 103 is located in contact with the surface of the photosensitive drum 101 and configured to rotate in a direction opposite to that of the photosensitive drum 101 (that is, at a contact portion between the development roller 103 and the photosensitive drum 101, the direction in which the surface of the development roller 103 moves is the same as the direction in which the surface of the photosensitive drum 101 moves). The development roller 103 is applied with a developing voltage and configured to develop the electrostatic latent image on the surface of the photosensitive drum 101 with the developer.

The supply roller 104 is located in contact with the surface of the development roller 103 and configured to rotate in the same direction as the development roller 103 (that is, at a contact portion between the supply roller 104 and the development roller 103, the direction in which the surface of the supply roller 104 moves is opposite to the direction in which the surface of the development roller 103 moves). The supply roller 104 is applied with a supply voltage and configured to supply the developer to the development roller 103.

The development blade 105 is a metal blade located in contact with the development roller 103. The development blade 105 is pressed against the surface of the development roller 103 so as to regulate a thickness of the developer layer on the surface of the development roller 103.

The cleaning member 106 is a roller or a blade formed of an elastic material and removes off the developer remaining on the surface of the photosensitive drum 101.

The developer container 30 is a container that contains therein the developer (indicated by the reference sign T in FIG. 2). The developer container 30 is detachably attached to the holding unit 20 and is configured to supply the developer T to the image formation unit 100.

The holding unit 20 is attached to the housing 161 (FIG. 1) of the image formation apparatus 1 and holds the developer container 30 to be detachable therefrom. The developer container 30 and the holding unit 20 constitute a developer supply device 50 configured to supply the developer to the image formation unit 100.

As illustrated in FIG. 1, the transfer unit 130 includes transfer rollers 131 as transfer members provided so as to be opposed to the photosensitive drums 101, a transfer belt 132 configured to pass between the photosensitive drums 101 and the transfer rollers 131, and a drive roller 133 and a driven roller 134 between which the transfer belt 132 is stretched. The drive roller 133 is driven to rotate to run the transfer belt 132. The driven roller 134 applies the tension to the transfer belt 132.

The transfer rollers 131 are applied with transfer voltages. With this, the developer image formed on the surface of the photosensitive drum 101 is transferred to the medium (indicated by the reference sign P in FIG. 2) on the transfer belt 132 as illustrated in FIG. 2.

The fixation device 140 is arranged on a downstream side of the image formation sections 10 in the conveyance direction of the medium. The fixation device 140 includes a fixation roller 141 and a pressure roller 142. The fixation roller 141 includes a built-in heater, and the pressure roller 142 is pressurized to the fixation roller 141. The fixation roller 141 and the pressure roller 142 apply heat and pressure to the medium to fix the developer image to the medium.

The media discharge section 150 includes a discharge roller pair 151 and a discharge roller pair 152 configured to convey the medium that has passed through the fixation device 140 along the conveyance path 153 and discharge the medium through a discharge port to the outside. The top cover 162 includes a stacker section 154 on which the discharged media are stacked.

In FIG. 1, an axial direction of the photosensitive drum 101 is referred to as an X direction. The X direction is parallel to an axial direction of each roller in the image formation apparatus 1 and also is parallel to a width direction of the medium being conveyed. A movement direction of the medium as the medium passes through the image formation sections 10 is referred to as a Y direction. The direction orthogonal to the X direction and the Y direction is referred to as a Z direction. In this case, the Z direction is the vertical direction.

For the Y direction, the medium conveyance direction when the medium passes through the image formation sections 10 is referred to as a +Y direction, and the opposite direction thereto is referred to as a −Y direction. For the X direction, a right hand direction and a left hand direction as facing along the +Y direction are referred to as a +X direction and a −X direction, respectively. For the Z direction, an upper direction and a lower direction in FIG. 1 are referred to as a +Z direction and a −Z direction, respectively. Note that these X, Y, and Z directions do not limit the orientation of the image formation apparatus 1.

(Developer Container 30 and Holding Unit 20)

Figure 3:
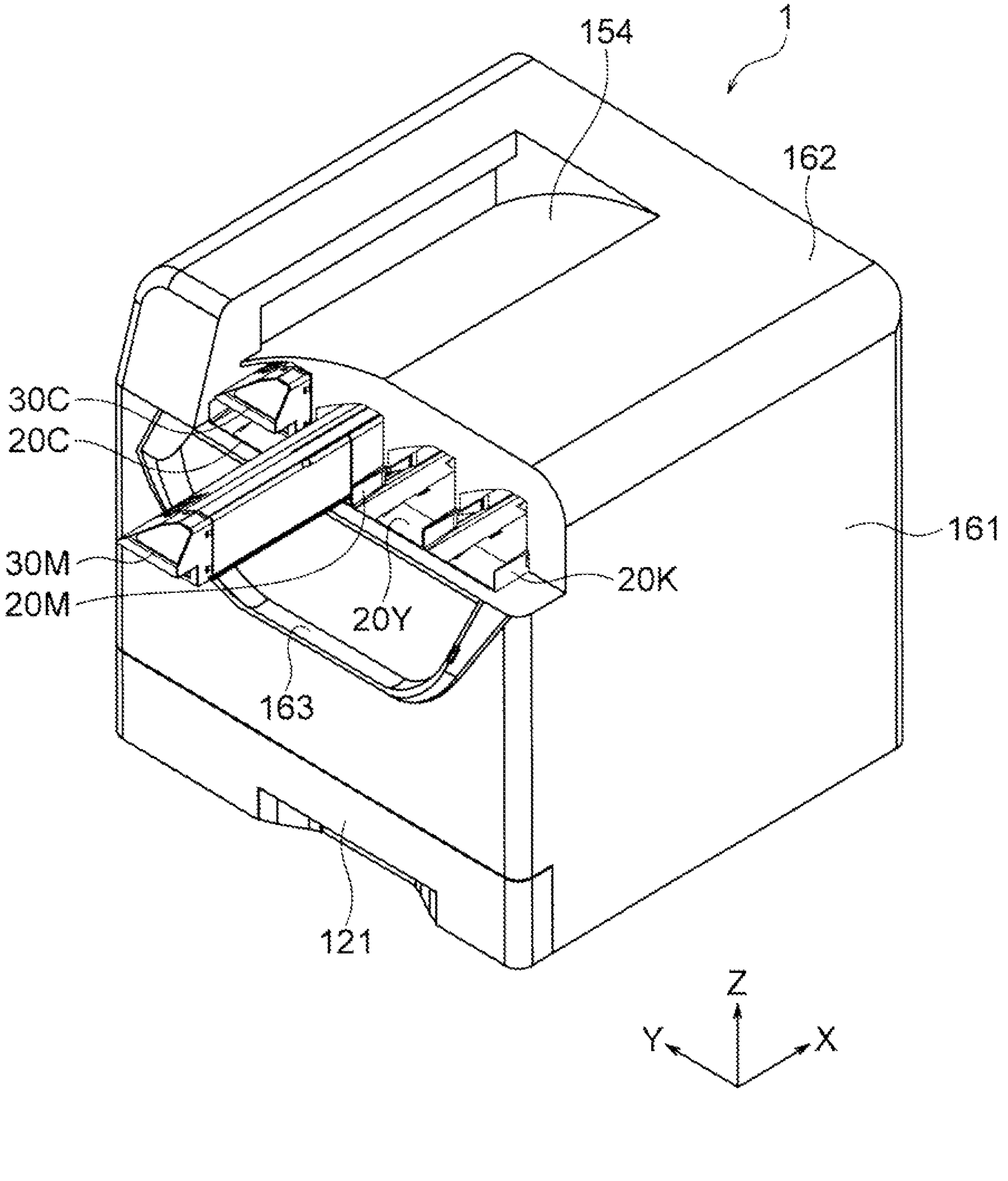
FIG. 3 is a diagram illustrating a perspective view of the image formation apparatus with a front cover being opened according to a first embodiment.

FIG. 3 is a diagram illustrating a perspective view of an exterior of the image formation apparatus 1. The housing 161 of the Image formation apparatus 1 includes walls on both sides in the X direction and wall on both sides in the Y direction. The −X side wall of the housing 161 is provided with a front cover 163 that can be opened and closed with respect to the housing 161. In FIG. 3, the front cover 163 is opened.

Provided in the housing 161 are holding units 20K, 20Y, 20M, and 20K, 20Y, 20M, 20C that hold the developer containers 30K, 30Y, 30M, 30C (FIG. 1), respectively. The holding units 20K, 20Y, 20M, and 20C are all elongated in the X direction, and configured to hold the developer containers 30K, 30Y, 30M, 30C Y, 30M, 30C to be detachable in the X direction.

An end portion of each of the holding units 20K, 20Y, 20M, and 20C on the +X side is covered by the front cover 163. In a state where the front cover 163 is opened, the developer container 30K, 30 Y, 30M, 30C can be attached (installed) and detached (removed). The developer containers 30K, 30Y, 30M, and 30C can be attached (installed) to the holding units 20K, 20Y, 20M, 20C in the +X direction and can be detached from the holding units 20K, 20Y, 20M, 20C in the −X direction.

In the state illustrated in FIG. 3, the developer container 30C is the holding unit 20C, and the developer container 30M is being attached (installed) halfway to the holding unit 20M. The developer containers 30K and 30Y have not yet been attached (installed) to the holding unit 20K and 20Y.

Figure 4:
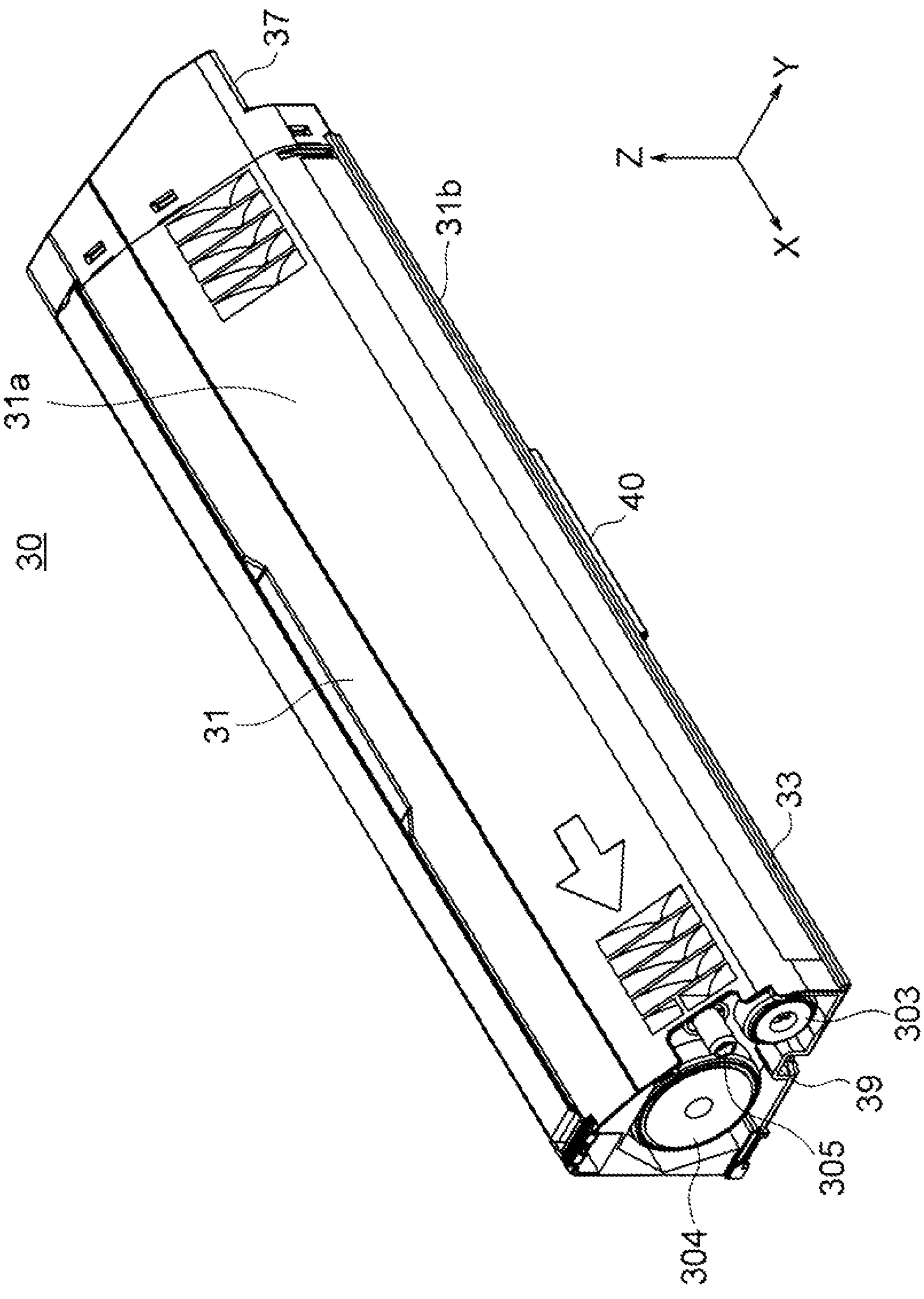
FIG. 4 is a diagram illustrating a perspective view of the developer container according to a first embodiment, viewed obliquely from above.

FIG. 4 is a diagram illustrating a perspective view of the developer container 30 viewed from above. As illustrated in FIG. 4, the developer container 30 includes a housing 31 that forms an outer shell thereof. An inside of the housing 31 is a developer storage space or a developer storage portion where the developer is stored.

The housing 31 is elongated in the X direction and includes an outer wall 31*a* and a bottom 31*b*. The outer wall 31*a* has an approximately triangular shape in a cross-section thereof orthogonal to the X direction. The bottom 31*b* of the housing 31 is flat. However, the shape of the housing 31 is not limited to this shape. At an end of the outer wall 31*a* of the housing 31 on the −X side, a gripping portion 37 is formed for the user to grasp the developer container 3 when the user detaches (removes) the developer container 30.

Figure 5:
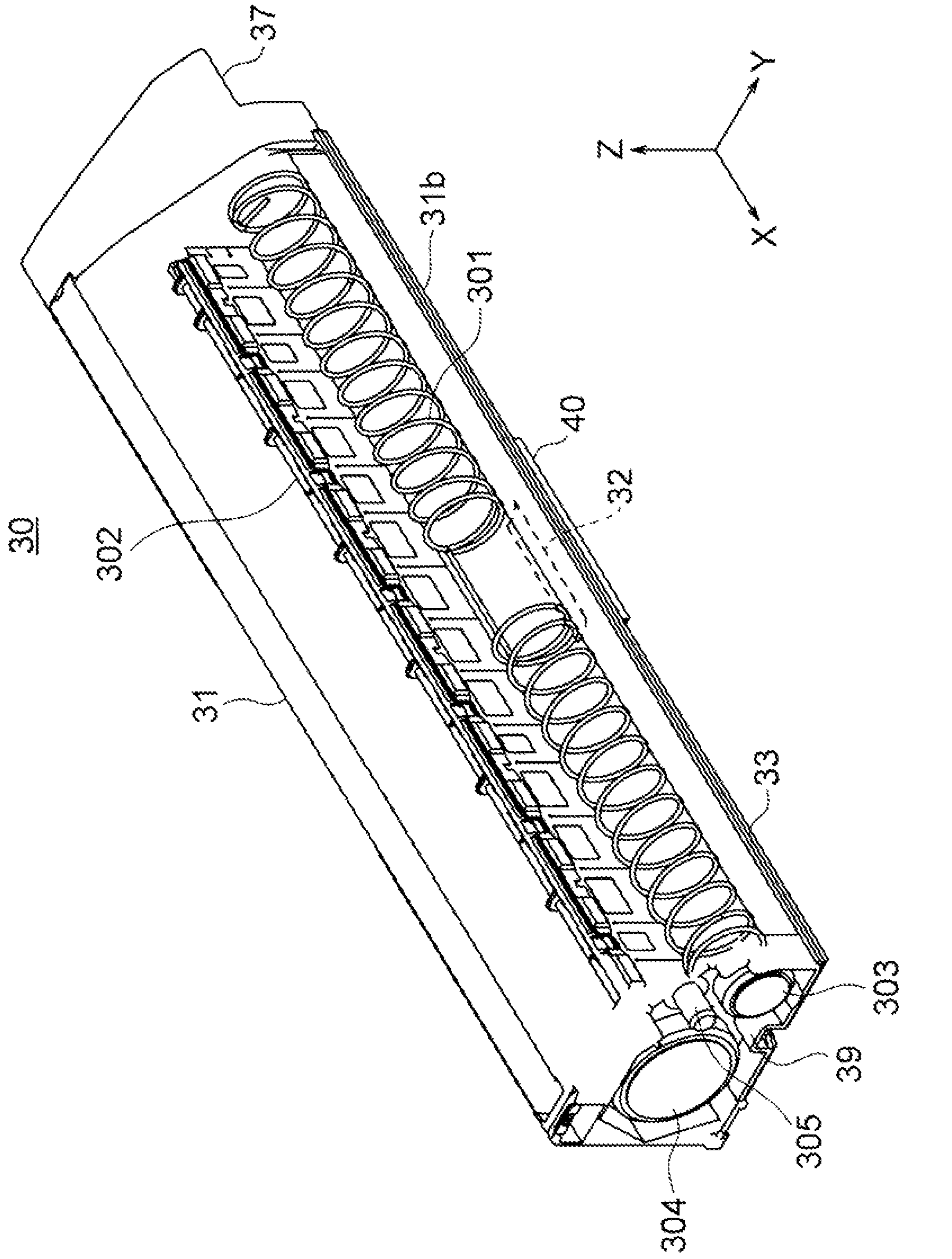
FIG. 5 is a diagram illustrating a perspective view of the developer container according to a first embodiment, with a portion of an outer wall removed.

FIG. 5 is a diagram illustrating a perspective view of the developer container 30 with a portion of the outer wall removed. As illustrated in FIG. 5, the bottom 31*b* of the housing 31 includes a supply port 32 through which the developer in the developer storage space is supplied to the outside of the housing 31. In this example, the supply port 32 is formed at the center portion of the housing 31 in the X direction and closer to the end of the housing in the +Y direction. However, the position of the supply port 32 is not limited to this example. The supply port 32 is covered by a shutter 40 as an opening/closing member movable in the X direction.

A transporting member 301 and an agitating member (a stirring member) 302 are provided in the housing 31. The transporting member 301 transports the developer toward the supply port 32. For example, the transporting member is formed of a spiral member that rotates about a rotation axis thereof extending in the X direction. The agitating member 302 agitates the developer in the developer container 30. For example, the agitating member 302 is formed of an agitating bar that rotates about a rotation axis thereof extending in the X direction.

At an end of the housing 31 on the +X side, a gear 303 and a gear 304 are provided that are respectively connected to the transporting member 301 and the agitating member 302. The gears 303 and 304 receive rotational transmission from a drive gear (not illustrated) located in the image formation apparatus 1.

In addition, a positioning post 305 is formed between the gears 303 and 304. The positioning post 305 is a shaft member that fits into a fitting portion formed at an axis (rotation center) of the drive gear provided in the image formation apparatus 1.

The end of the housing 31 on the +X side also includes a locating groove 39. When the developer container 30 is mounted to a predetermined position, the positioning groove 39 is engaged with a positioning protrusion 29 (see FIG. 11) of the holding unit 20 so as to position the developer container 30.

Figure 6:
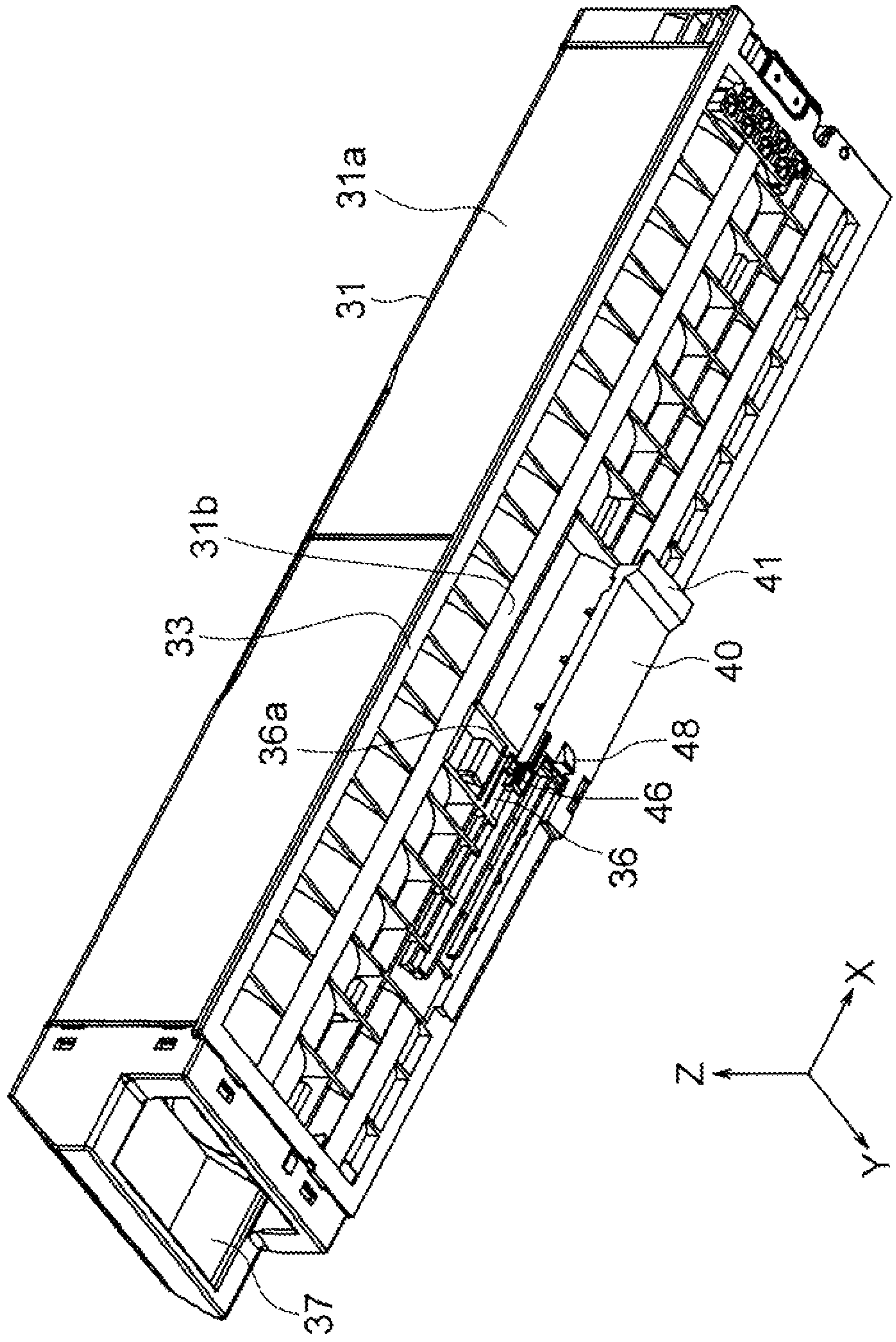
FIG. 6 is a diagram illustrating a perspective view of the developer container according to a first embodiment, viewed obliquely from below.

FIG. 6 is a diagram illustrating a perspective view of the developer container 30 viewed from below (from the bottom 31*b* side). The bottom 31*b* of the housing 31 of the developer container 30 is formed with peripheral ribs 33 as a first insertion/extraction guide. The peripheral ribs 33 are formed on both sides of the bottom 31*b* in the Y direction and extend in the X direction. The peripheral ribs 33 function as guides when the developer container 30 is mounted on the holding unit 20.

At the bottom 31*b* of the housing 31, a shutter 40 that opens and closes the supply port 32 (FIG. 5) is provided. The shutter 40 is movable in the X direction.

Figure 7:
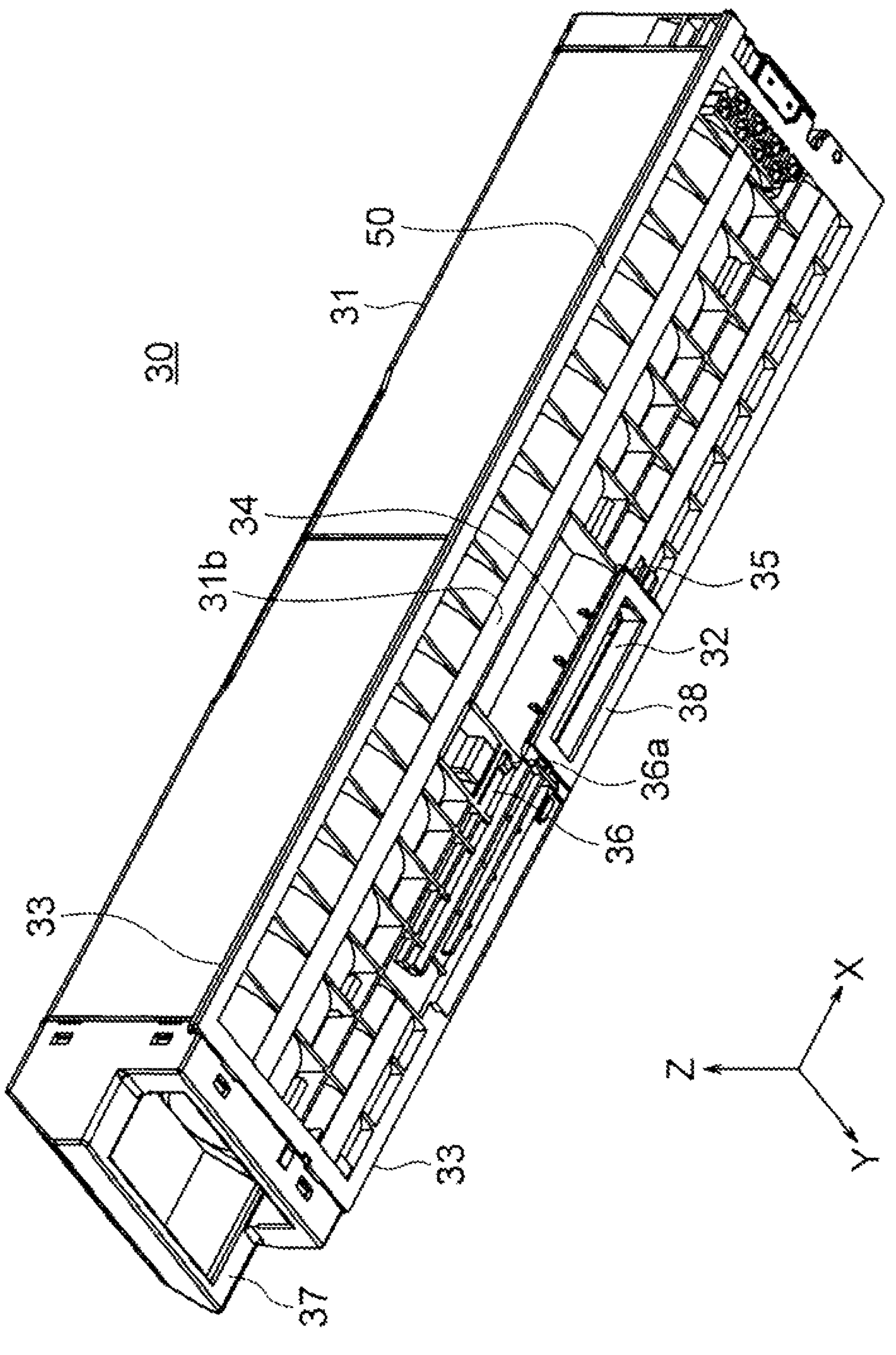
FIG. 7 is a diagram illustrating a perspective view of the developer container according to a first embodiment with a shutter removed.
Figure 8:
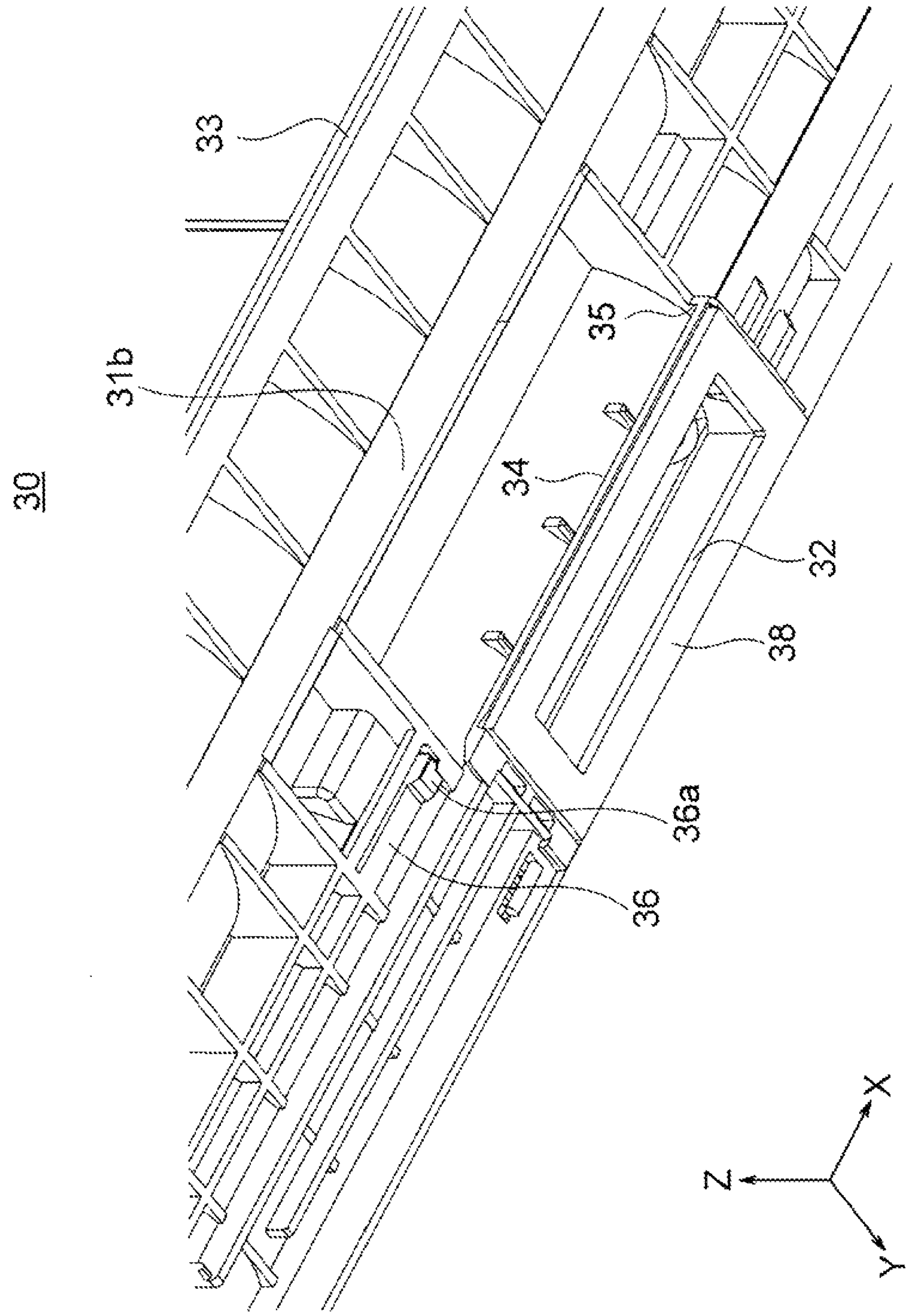
FIG. 8 is a diagram illustrating an enlarged perspective view of a supply port of the developer container and the surroundings of the supply port according to a first embodiment.

FIG. 7 is a diagram illustrating a perspective view of the developer container 30 illustrated in FIG. 6 with the shutter 40 removed. FIG. 8 is a diagram illustrating an enlarged perspective view of an area around the supply port 32 illustrated in FIG. 7. As illustrated in FIG. 8, the developer container 30 includes shutter rails 34 as first opening/closing guides elongated in the X direction and provided on both sides of the supply port 32 in the Y direction. The shutter rail 34 engages a later-described slide portion 45 (FIG. 9) of the shutter 40.

The developer container 30 also includes a sealing member 38 as an elastic member surrounding the supply port 32. The sealing member 38 is made of an elastic material such as a sponge or the like and is fixed to an underside of the shutter rail 34. The sealing member 38 extends around the supply port 32 and has a thickness in the Z direction.

The developer container 30 also includes a stopper 35 provided at an end of the shutter rail 34 on the +X side and configured to regulate the movement of the shutter 40 in the +X direction. The stopper 35 is formed of, for example, a bend portion bent toward the +Z direction from the +X side end of shutter rail 34.

A latch 36 as a first positioning section is adjacent to and provided on the −X side of the supply port 32. The latch 36 is provided at the bottom 31*b* of the housing 31 as a long cantilever beam extending in the X direction. An end of the latch 36 on the −X side is connected to the bottom 31*b*, and an end (a free end) of the latch 36 on the +X side is formed with a contact portion 36*a*.

Figure 9:
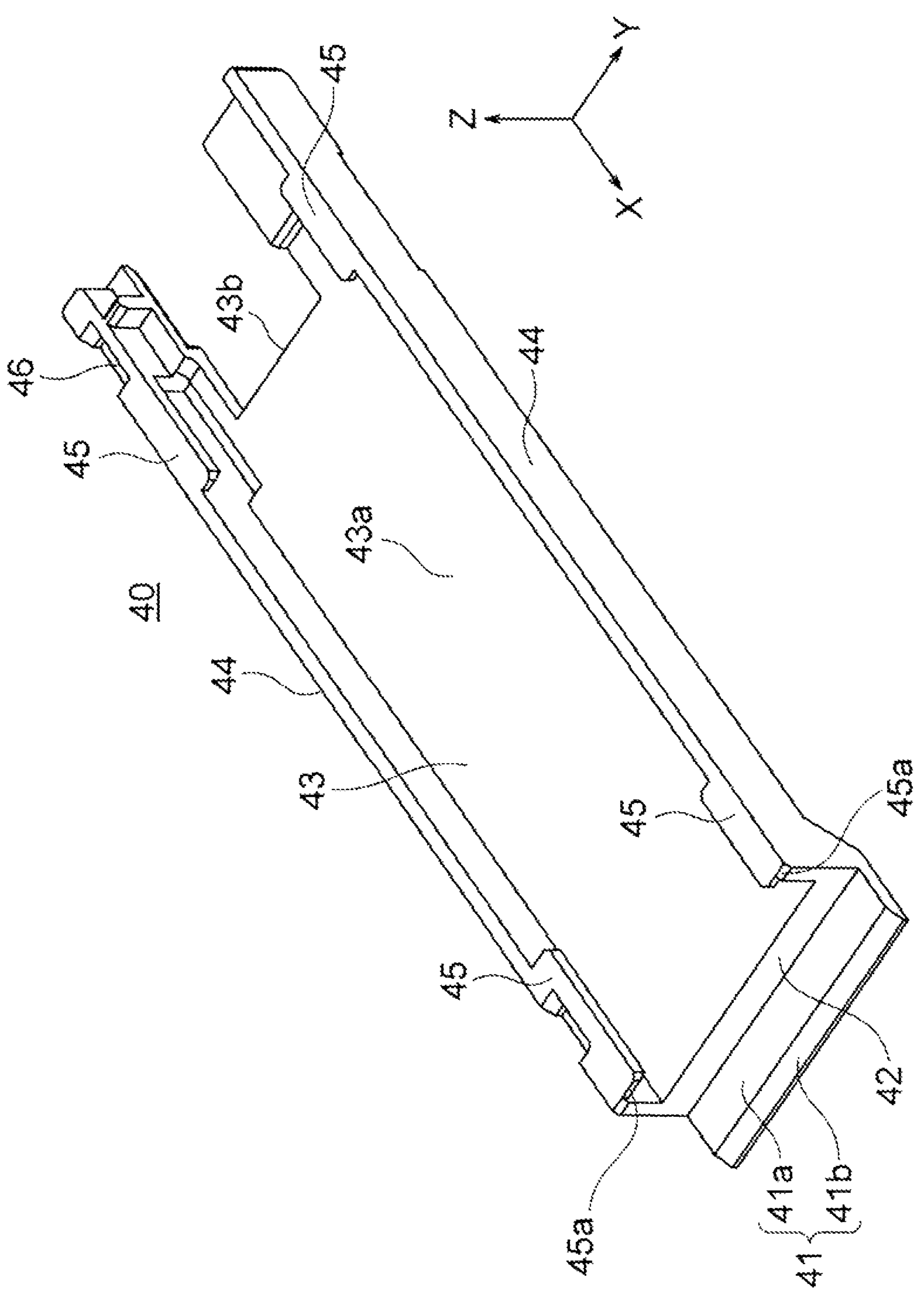
FIG. 9 is a diagram illustrating a perspective view of the shutter according to a first embodiment, viewed from above.
Figure 10:
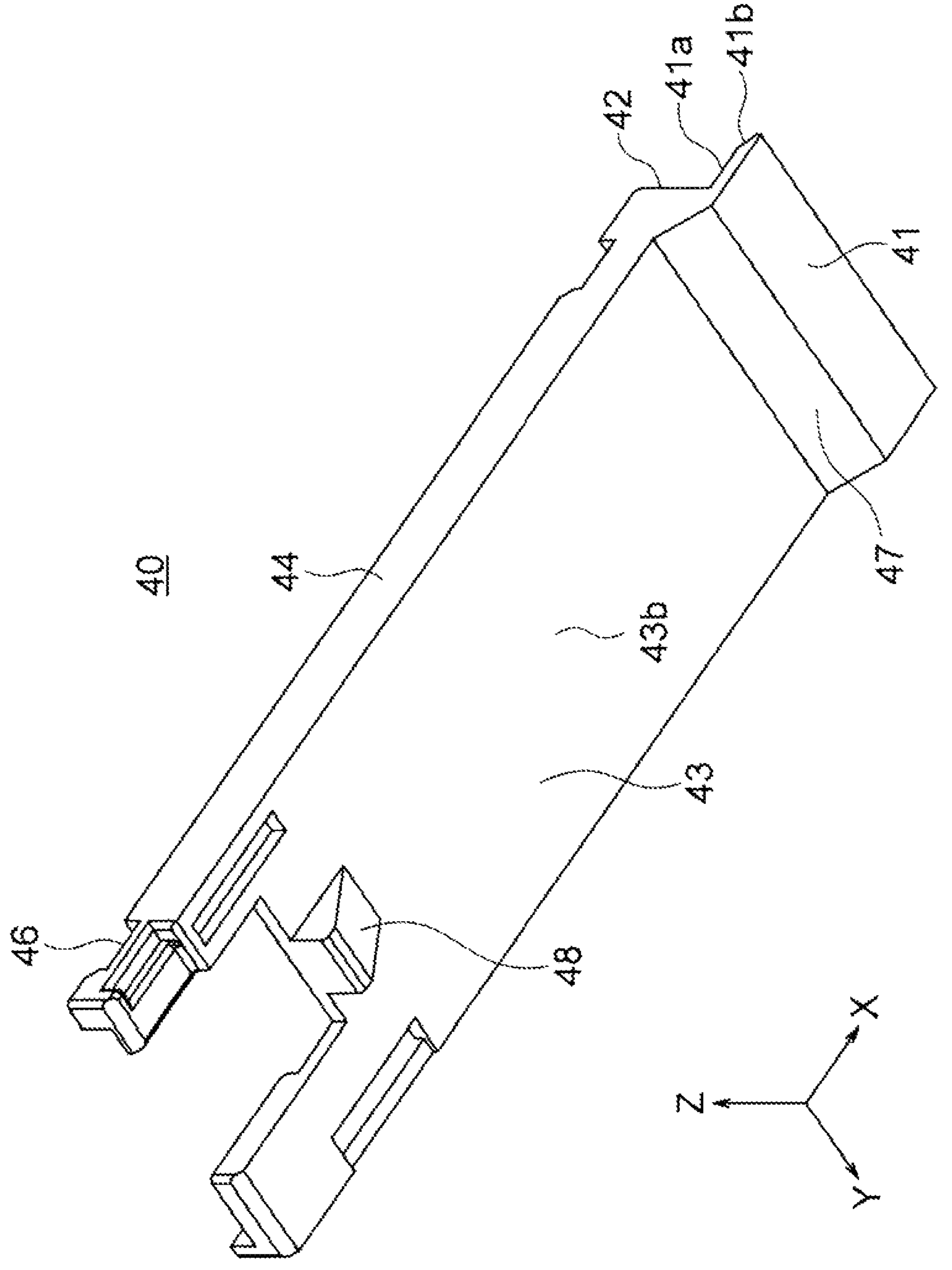
FIG. 10 is a diagram illustrating a perspective view of the shutter according to a first embodiment, viewed from below.

FIG. 9 is a diagram illustrating a perspective view of the shutter 40 as viewed from above. FIG. 10 is a diagram illustrating a perspective view of the shutter 40 as viewed from below. As illustrated in FIG. 9, the shutter 40 includes a cover portion 43 configured to cover (close) the supply port 32 (FIG. 5), and a pair of side walls 44 formed on both sides of the cover portion 43 in the Y direction and extending in the X direction. An upper surface of the cover portion 43 (the surface of the cover portion 43 facing the housing 31), i.e., the surface of the cover portion 43 facing the supply port 32 (FIG. 5), is referred to as a cover surface 43*a*.

The side walls 44 are formed with slide portions 45 as second opening/closing guides to be engaged with the shutter rails 34 (FIG. 8) of the housing 31. By the engagement of the slide portions 45 with the shutter rails 34, the shutter 40 is attached to the housing 31 so as to be movable in the X direction. Each of the side walls 44 includes two of the slide portions 45. One of the two slide portions 45 that is located on the +X side is formed with a stopper surface 45*a* at the +X side end thereof.

In addition, one of the pair of the side walls 44 that is located in the −Y side is formed with a recess 46 in the vicinity of an end of the side wall 44 on the −X side. The recess 46 functions as a second positioning portion to be engaged with the latch 36 of the housing 31. By the engagement between the recess 46 of the shutter 40 and the latch 36 (FIG. 8) of the housing 31, the shutter 40 is locked in the position that closes the supply port 32.

At an end of the shutter 40 on the +X side, a shutter side contact portion 42 (a contact portion 42 of the shutter 40) is formed as a first contact portion (or a first movement restriction portion). For example, the shutter side contact portion 42 is an end face orthogonal to the X direction.

The +X side end of the shutter 40 also includes a protrusion 41 as a protrusion portion. The protrusion 41 is adjacent to and provided on the −Z side of the shutter side contact portion 42 and is protruded in the +X direction further than the shutter side contact portion 42.

The protrusion 41 includes a flat portion 41*a*, which is an upper surface of the protrusion 41 (i.e., a surface of the protrusion 41 on the side of the housing 31), and a sloped portion 41*b*, which is inclined with respect to the flat portion 41*a*. The inclined portion 41*b* extends from the flat portion 41*a* in the +X direction. The inclined portion 41*b* is inclined so that the inclined portion 41*b* extends away from the cover surface 43*a* in the Z direction (in other words, away from the housing 31 in the Z direction) as advancing in the +X direction.

As illustrated in FIG. 10, the shutter 40 includes an inclined portion 47 adjacent to and provided on the −X side of the protrusion 41. Similar to the inclined portion 41*b* of the protrusion 41, the inclined portion 47 is inclined such that the inclined portion 47 extends away from the cover surface 43*a* in the Z direction (in other words, away from the housing 31 in the Z direction) as advancing in the +X direction.

In addition, an engagement projection 48 is formed on a back surface 43*b* of the cover portion 43 opposite the cover surface 43*a* (FIG. 9) of the cover portion 43. The engagement projection 48 is formed in the vicinity of an end portion of the cover portion 43 on the −X side. The engagement projection 48 has an inclined surface that is inclined away from the back surface 43*b* in the Z direction (in other words, away from the housing 31 in the Z direction) as advancing in the −X direction, and an end face (vertical plane) formed at a −X side end of the inclined surface and extending in a direction orthogonal to the X direction. The engagement projection 48 functions as a portion configured to come in contact with a plate spring 23 (described later) upon attaching (installing) or detaching (removing) the developer container 30.

Figure 11:
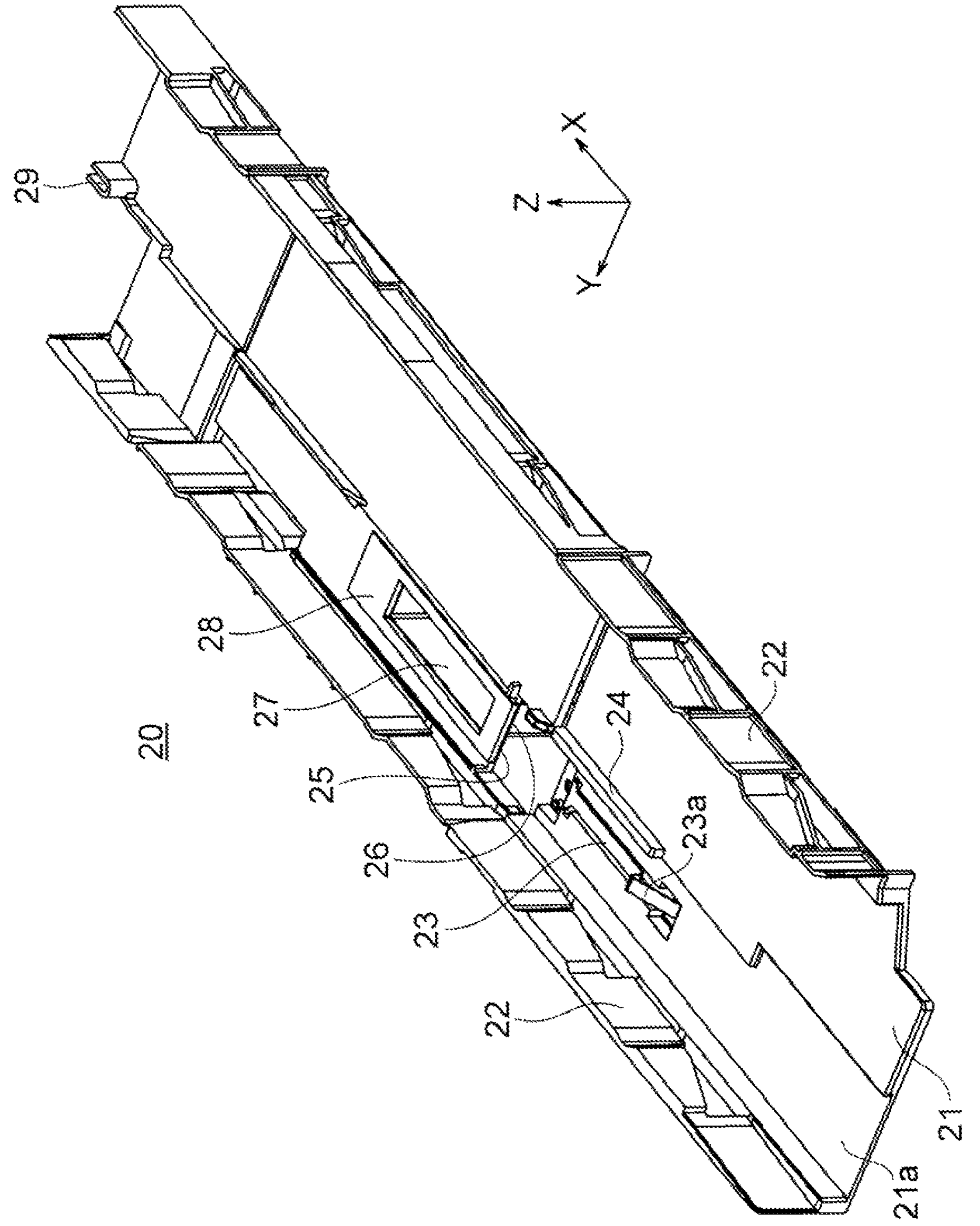
FIG. 11 is a diagram illustrating a perspective view of a holding unit according to a first embodiment.
Figure 12:
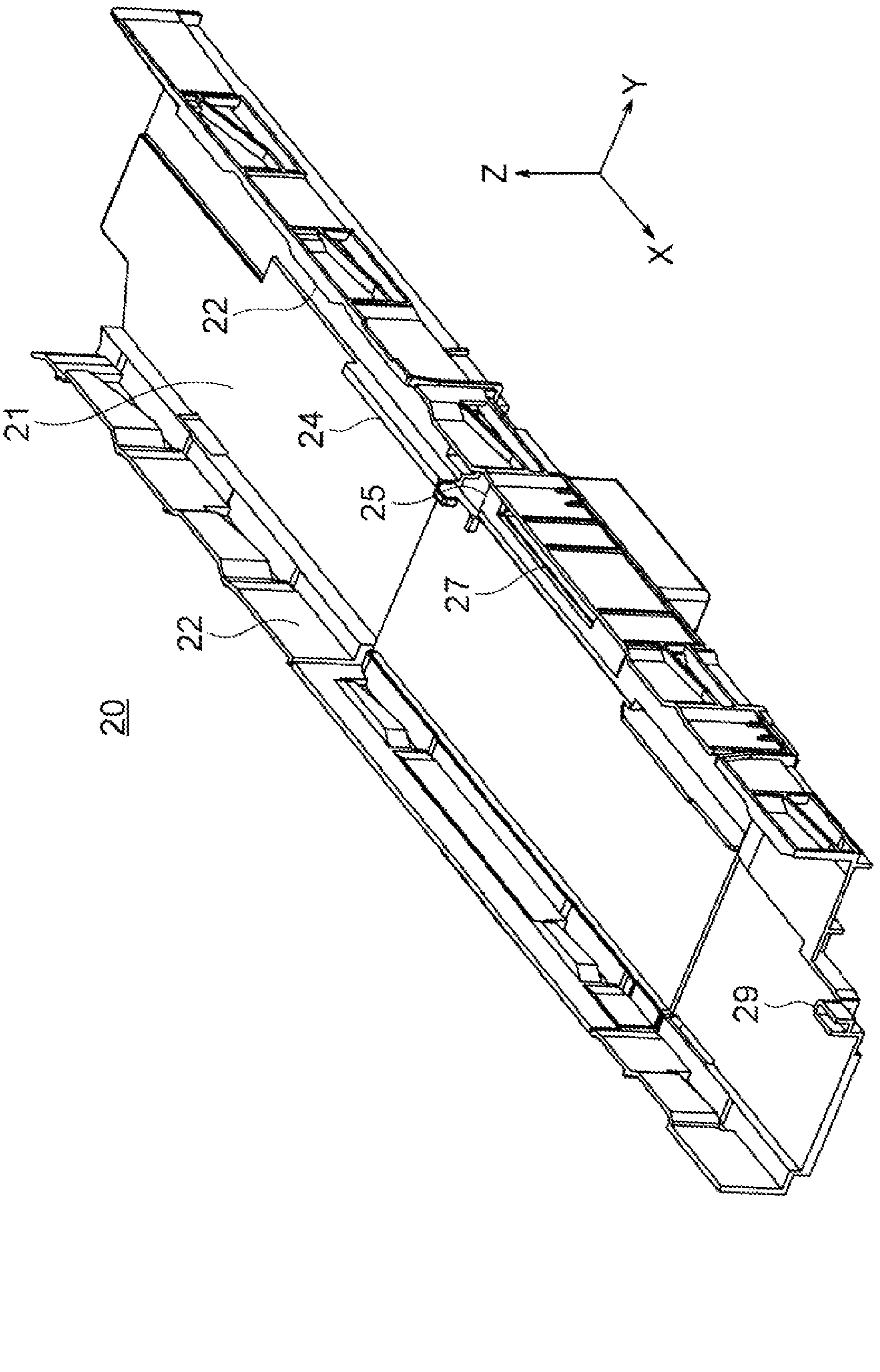
FIG. 12 is a diagram illustrating a perspective view of the holding unit according to a first embodiment, viewed from a direction different from that of FIG. 11.

FIG. 11 is a diagram illustrating a perspective view of the holding unit 20. FIG. 12 is a diagram illustrating a perspective view of the holding unit 20 viewed from a direction different from that of FIG. 11. As illustrated in FIGS. 11 and 12, the holding unit 20 includes a tray 21 as a support surface on which the developer container 30 is placed. A pair of guide walls 22 as second insertion/extraction guides are provided on both sides of the tray 21 in the Y direction. The peripheral ribs 33 (see FIGS. 5-7) of the developer container 30) are engaged with the insides of the pair of guide walls 22, respectively.

As illustrated in FIG. 11, approximately at the center of the tray 21 of the holding unit 20 in the X direction, a reception port 27 (inlet port) is formed to receive the developer supplied from the supply port 32 of the developer container 30. The reception port 27 is connected to the image formation unit 100 via a developer transfer path (a developer supply path). The supply of the developer from the reception port 27 to the image formation unit 100 can be done by drop feeding or by using some kind of conveying member.

The holding unit 20 also includes a sealing member 28 attached to the tray 21 and surrounding the reception port 27. The sealing member 28 is formed of an elastic material such as a sponge. The sealing member 28 extends around the reception port 27 and has a thickness in the Z direction.

The holding unit 20 also includes a unit side contact portion 25 (a contact portion 25 of the holding unit 20) serving as a second contact portion (or a second movement restriction portion) adjacent to and provided on the −X side of the reception port 27. For example, the unit side contact portion 25 is an end face orthogonal to the X direction. The unit side contact portion 25 is configured to come in contact with the shutter side contact portion 42 of the shutter 40 so as to restrict the movement of the shutter 40 in the +X direction.

An engagement recess 26 as an engagement portion is formed below (on the −Z side of) the unit side contact portion 25. An inside of the recess 26 is a space into which the protrusion 41 of the shutter 40 enters.

The holding unit 20 also includes the plate spring 23 as an opening/closing anchorage part provided on the −X side of the recess 26 of the tray 21. The plate spring 23 is an elongate member in the X direction. An end of the plate spring 23 on the +X side is fixed to the tray 21. An end (free end) of the plate spring 23 on the −X side is formed with a protrusion (described later) protruding in the +Z direction.

In addition, an area 21*a* of the tray 21 in which the plate spring 23 is located is formed in height lower than the other areas of the tray 21 in order to secure a movement range of the protrusion 41 (FIG. 10) of the shutter 40.

The holding unit 20 also includes a lock release post 24, which is a protrusion. The lock release post 24 is located adjacent to and provided on the −Y side of the plate spring 23 in the tray 21. The lock release post 24 is configured to come in contact with the contact portion 36*a* of the latch 36 of the developer container 30*a* (FIGS. 6-8) to bend (deform) the latch 36, thereby disengaging the latch 36 from the recess 46 of the shutter 40.

Note that in the state (FIG. 6) where the latch 36 of the developer container 30 is engaged with the recess 46 of the shutter 40, the latch 36 protrudes beyond the recess 46 in the −Y direction so that the lock release post 24 can come in contact with the latch 36.

The holding unit 20 also includes a positioning protrusion 29 that is configured, when the developer container 30 is mounted to the predetermined position, to engaged with the positioning groove 39 of the developer container 30 (FIG. 4). In this example, the positioning protrusion 29 is formed at an end portion of the tray 21 on the +X side.

Figure 13A:
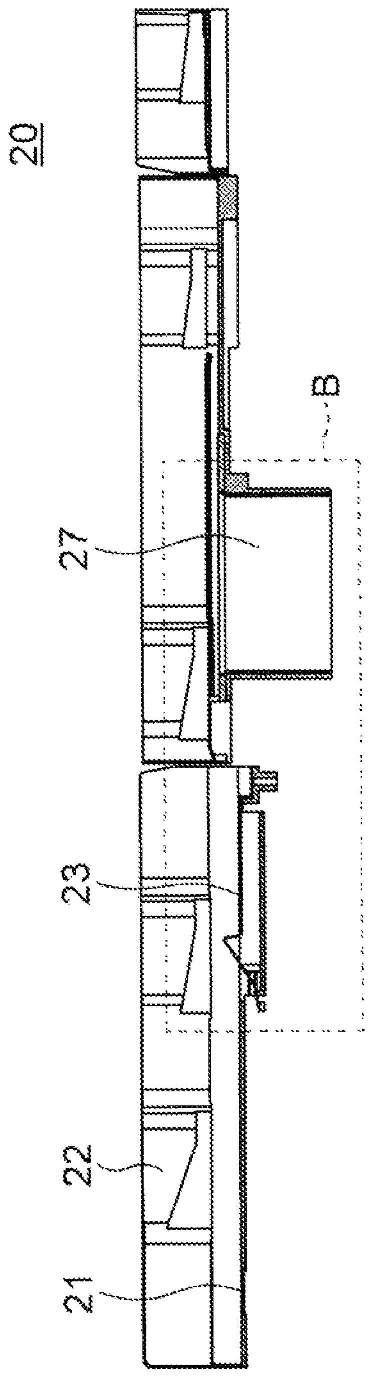
FIGS. 13A and 13B are diagrams illustrating a cross sectional view and an enlarged cross sectional view of the holding unit before the developer container is mounted according to a first embodiment.
Figure 13B:
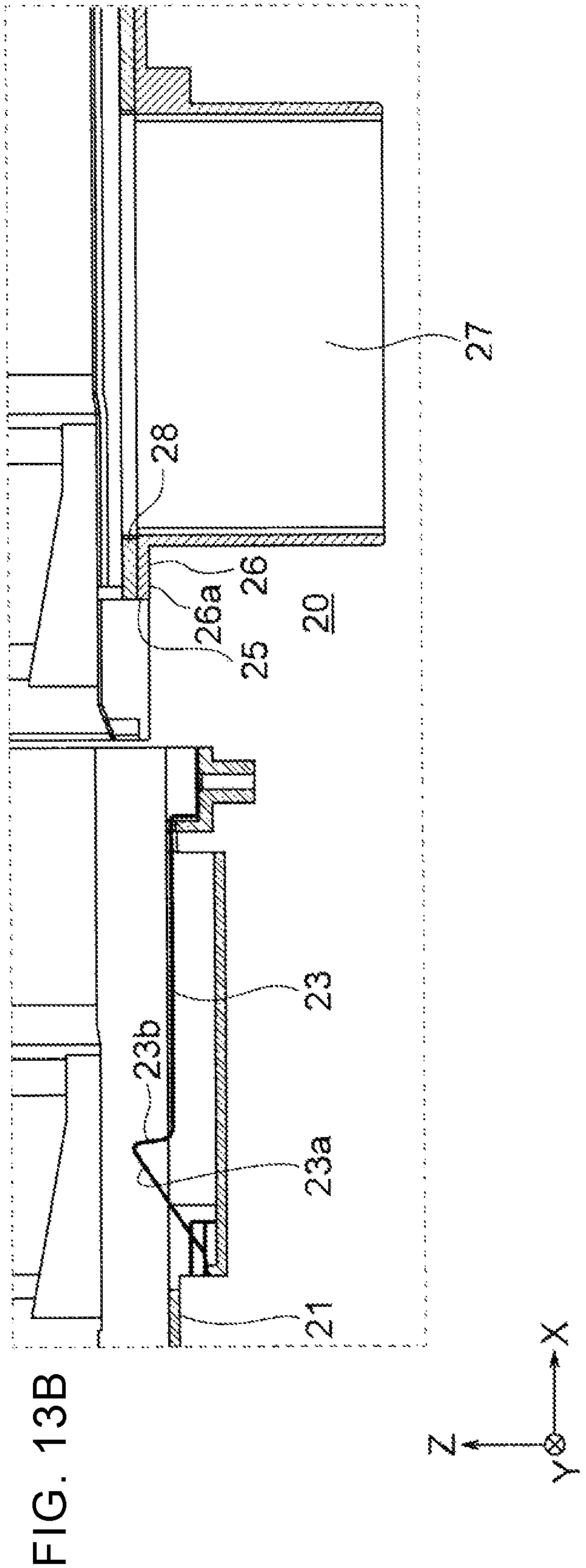

FIG. 13A is a diagram illustrating a cross sectional view of the holding unit 20 before the developer container 30 is attached (installed). FIG. 13B is a diagram illustrating an enlarged view of an area enclosed by a dashed line B in FIG. 13A. As described above, the unit side contact portion 25 is provided adjacent to the −X side of the reception port 27, and the recess 26 is provided below (on the −Z side of) the unit side contact portion 25.

An upper surface (a +Z side surface) of the recess 26 is referred to as a top surface 26*a*. The unit side contact portion 25 and the top surface 26*a* are adjacent to each other with a corner therebetween. A part of the sealing member 28 surrounding the reception port 27 is located above the top surface 26*a* (in the +Z direction).

The plate spring 23 is provided on the −X side with respect to the unit side contact portion 25 and the recess 26. The plate spring 23 extends in the X direction and an end of the plate spring 23 on the +X side is fixed to the tray 21.

The plate spring 23 includes, at the −X side end thereof, an inclined portion 23*a*. The inclined portion 23*a* is inclined so as to be displaced in the +Z direction as advancing in the +X direction.

The plate spring 23 includes a stopper portion 23*b* adjacent to and provided on the +X side of the inclined portion 23*a*. The stopper portion 23*b* extends approximately in the Z direction, but is slightly inclined in a direction opposite to that of the inclined portion 23*a*.

(Printing Operation of Image Formation Apparatus)

Next, a printing operation of the image formation apparatus 1 is described with reference to FIG. 1. When a controller or a controller of the image formation apparatus 1 receives a print command and print data from a host device or an external device, the controller starts the printing operation (an image forming operation).

When the printing operation is started, the pickup roller 122 and the feed roller 123 of the media feeder 120 are driven to rotate to feed the media in the media cassette 121 one sheet at a time to the conveyance path 126. The resist roller 125 and the conveyance roller 127 rotate to convey the medium along the conveyance path 126.

In each of the image formation sections 10, a charging voltage, a developing voltage and a supply voltage are applied to the charging roller 102, the development roller 103 and the supply roller 104, respectively. Also, in each of the image formation sections 10, the photosensitive drum 101 rotates, and along with this, the charging roller 102, the development roller 103, and the supply roller 104 also rotate. The charging roller 102 uniformly charges the surface of the photosensitive drum 101. The exposure head 108 exposes the surface of the photosensitive drum 101 with lights to thereby form an electrostatic latent image on the surface of the photosensitive drum 101.

The electrostatic latent image formed on the surface of the photosensitive drum 101 is developed by the developer adhered to the development roller 103, so that a developer image is formed on the surface of the photosensitive drum 101. The developer image formed on the surface of the photosensitive drum 101 is transferred to the medium on the transfer belt 132 by the transfer voltage applied to the transfer roller 131.

The medium having the developer images transferred thereon from the photosensitive drums of the image formation sections 10K, 10Y, 10M, and 10C is conveyed to the fixation device 140 by the transfer belt 132.

In the fixation device 140, the fixation roller 141 and the pressure roller 142 rotate with a fixation nip therebetween while the fixation roller 141 is heated to a predetermined fixation temperature (or a predetermined fusing temperature). When the medium passes through the fixation nip between the fixation roller 141 and the pressure roller 142, the developer image is fixed to the medium by the heat and pressure applied from the fixation roller 141 and the pressure roller 142.

After the developer image is fixed in the fixation device 140, the medium is conveyed to the media discharge section 150. In the media discharge section 150, the medium is conveyed by the discharge roller pair 151, 152 so as to be discharged from the discharge port to the outside. The discharged media P are stacked on the stacker 154. This completes the printing operation.

(Attaching Operation of Developer Container 30)

Figure 14A:
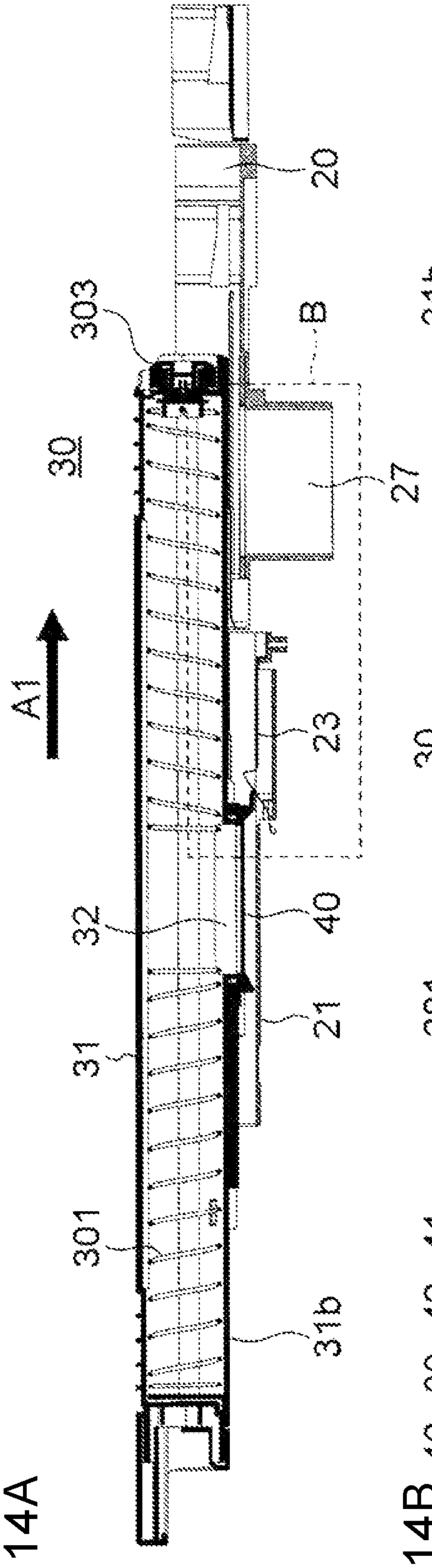
FIGS. 14A and 14B are diagrams of a cross sectional view and an enlarged cross sectional view illustrating a first stage of an attaching operation of the developer container according to a first embodiment.
Figure 14B:
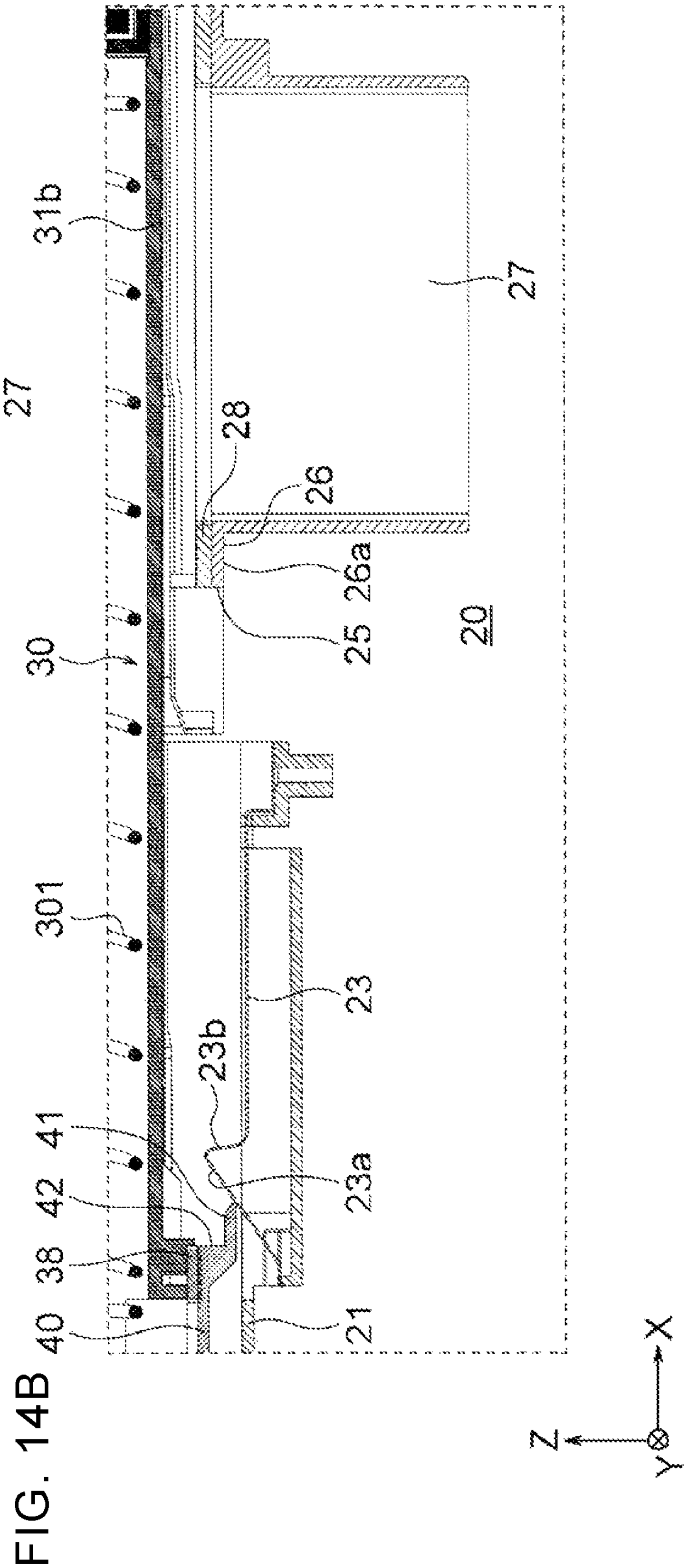

Next, an attaching operation of the developer container 30 to the holding unit 20 is described. FIG. 14A is a diagram illustrating a cross sectional view of a first stage of the attaching operation of the developer container 30. FIG. 14B is an enlarged view of an area enclosed by a dashed line B in FIG. 14A.

As illustrated in FIG. 14A, the shutter 40 is secured (locked) to the housing 31 of the developer container 30 by the engagement between the latch 36 (FIG. 8) of the developer container and the recess 46 (FIG. 9) of the shutter 40 and thus is positioned at a closing position where the shutter 40 closes the supply port 32. The developer container 30 is attached to the holding unit 20 in the +X direction while the peripheral rib 33 (FIG. 6) of the developer container 30 is guided by the guide walls 22 of the holding unit 20 (FIG. 11). The +X direction is also referred to as the attaching direction (or a first direction) and is indicated by an arrow A1 in figures.

As illustrated in FIG. 14B, when the developer container 30 is attached, the protrusion 41 of the shutter 40 contacts the inclined portion 23*a* of the plate spring 23 of the holding unit 20.

Figure 15A:
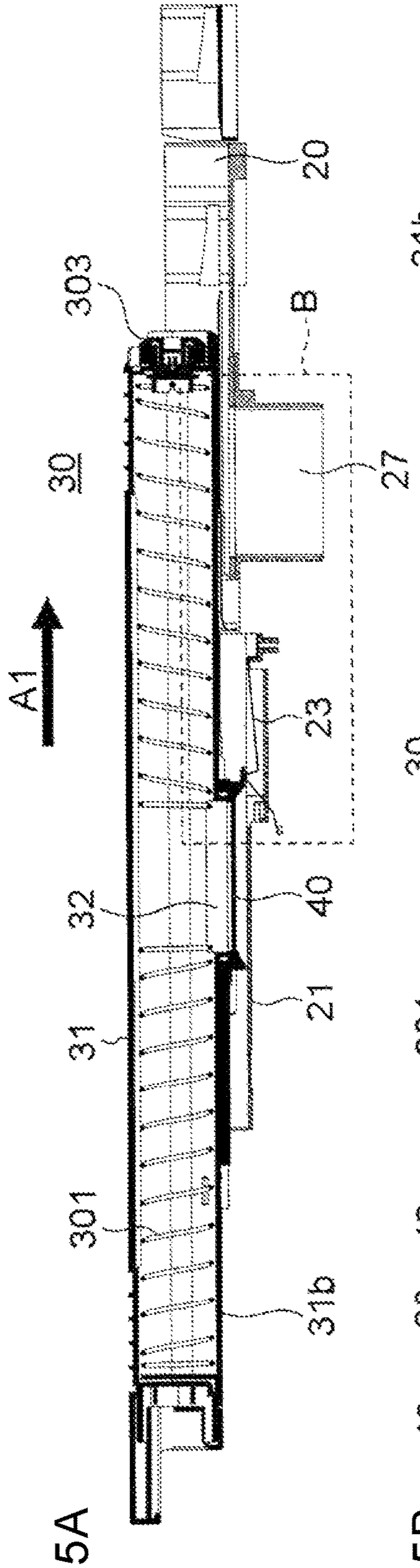
FIGS. 15A and 15B are diagrams of a cross sectional view and an enlarged cross sectional view illustrating a second stage of the attaching operation of the developer container according to a first embodiment.
Figure 15B:
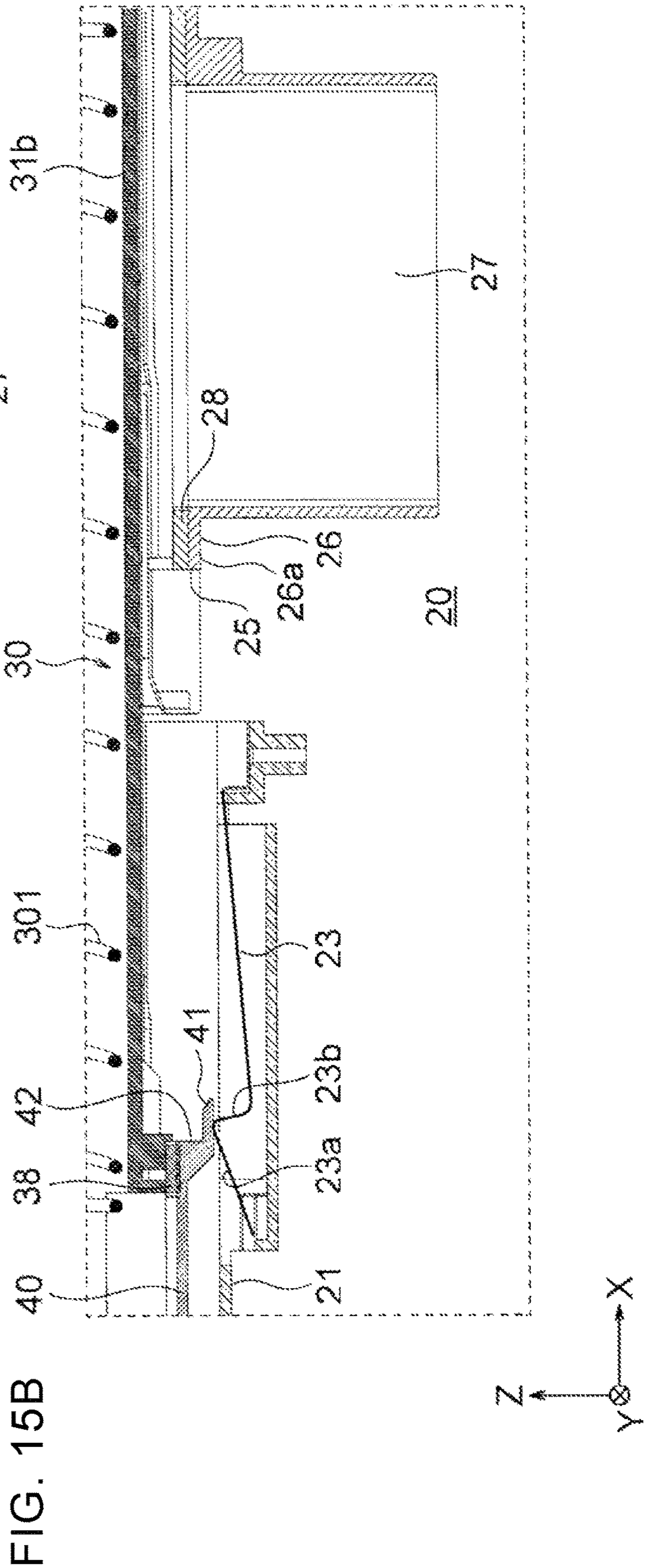

FIG. 15A is a diagram illustrating a cross sectional view of a second stage of the attaching operation of the developer container 30. FIG. 15B is a diagram illustrating an enlarged view of an area enclosed by a dashed line B in FIG. 15A. When the developer container 30 is moved further in the +X direction, the protrusion 41 of the shutter 40 presses the inclined portion 23*a* of the plate spring 23, which causes the plate spring 23 to be deflected in the −Z direction.

Figure 16A:
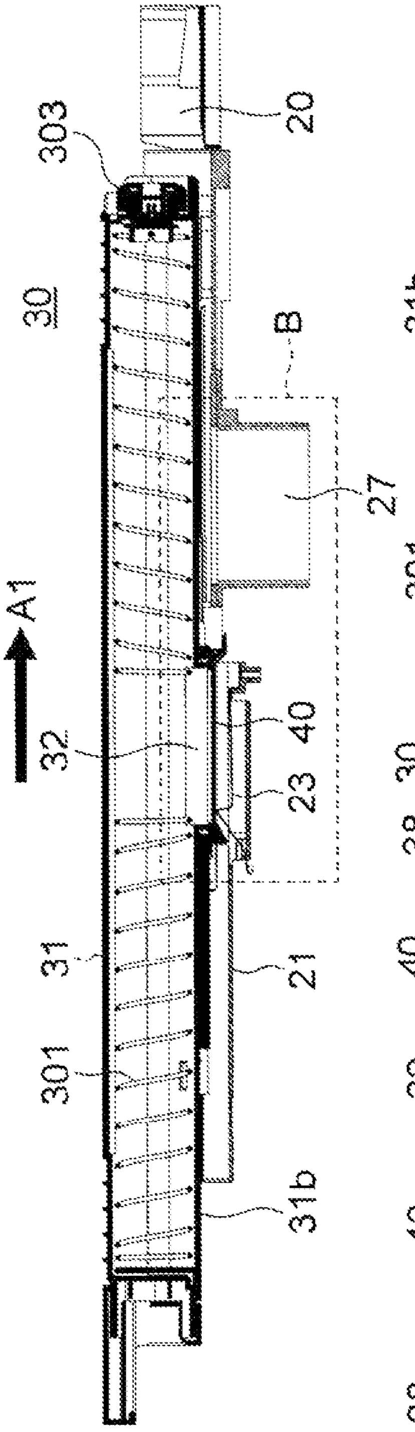
FIGS. 16A and 16B are diagrams of a cross sectional view and an enlarged cross sectional view illustrating a third stage of the attaching operation of the developer container according to a first embodiment.
Figure 16B:
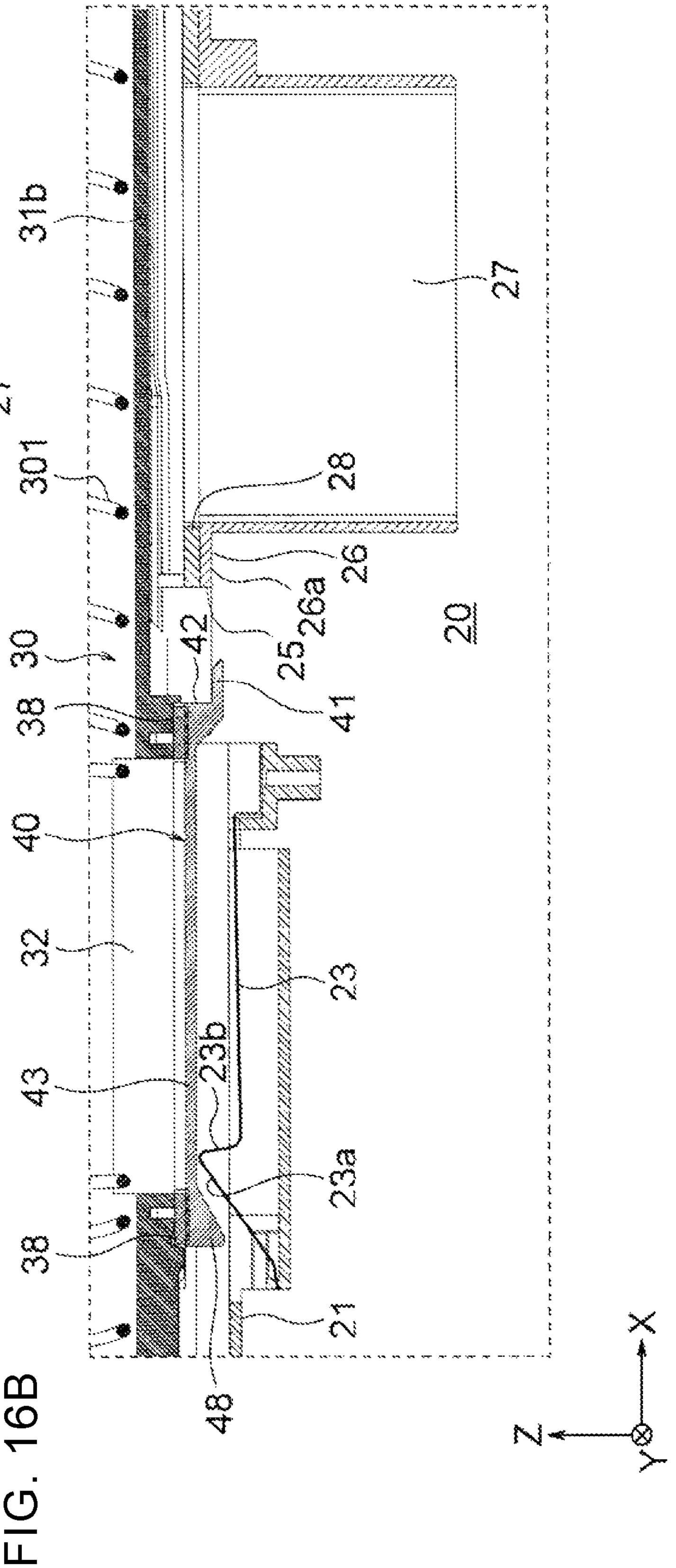

FIG. 16A is a diagram illustrating a cross sectional view of a third stage of the attaching operation of the developer container 30. FIG. 16B is a diagram illustrating an enlarged view of an area enclosed by a dashed line B in FIG. 16A. When the developer container 30 is moved further in the +X direction, the protrusion 41 of the shutter 40 passes through the inclined portion 23*a* and the stopper portion 23*b* of the plate spring 23. As a result, the plate spring 23 returns to the state before being bent in the −Z direction (the original state of the plate spring 23).

Figure 17A:
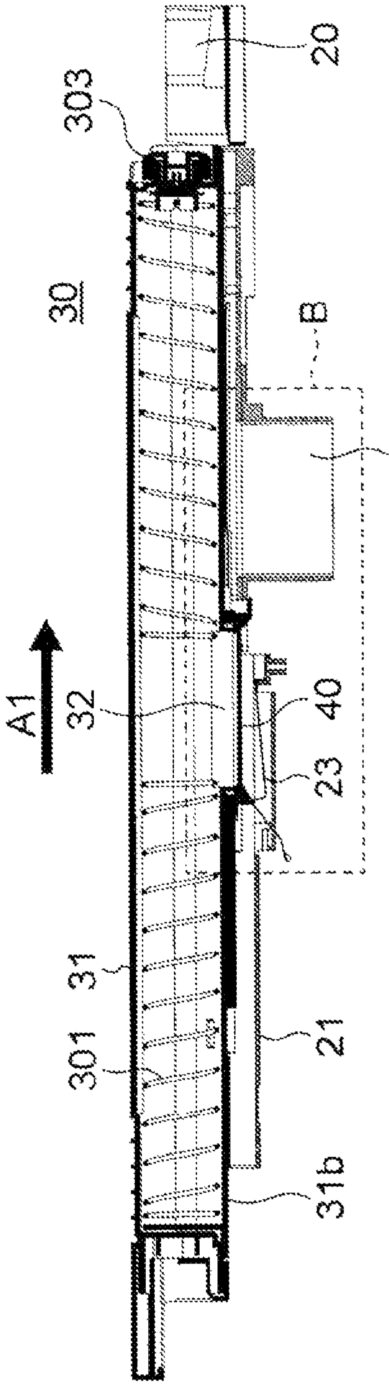
FIGS. 17A and 17B are diagrams of a cross sectional view and an enlarged cross sectional view illustrating a fourth stage of the attaching operation of the developer container according to a first embodiment.
Figure 17B:
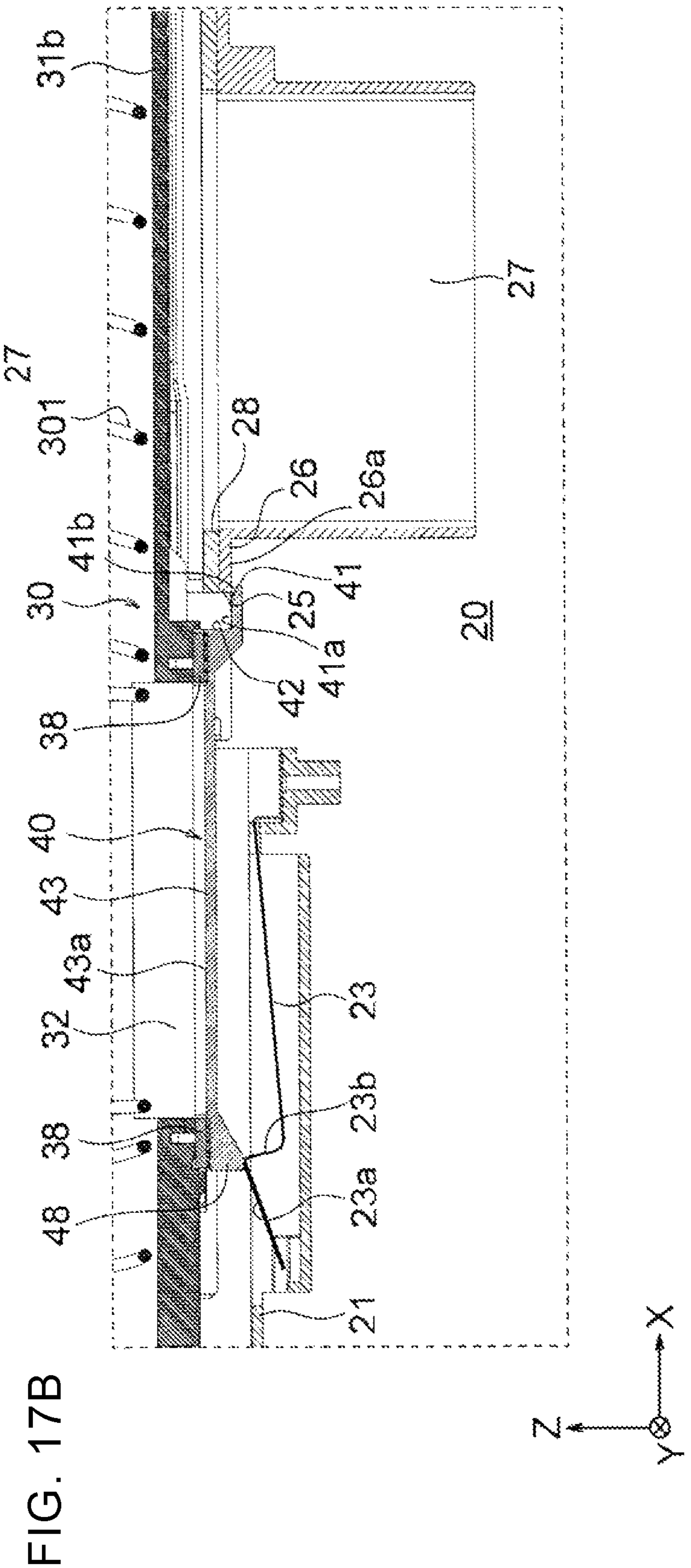

FIG. 17A is a diagram illustrating a cross sectional view of a fourth stage of the attaching operation of the developer container 30. FIG. 17B is a diagram illustrating an enlarged view of an area enclosed by a dashed line B in FIG. 17A. When the developer container 30 is moved further in the +X direction, the inclined portion 41*b* of the protrusion 41 of the shutter 40 contacts the corner in front of the recess 26 and thus the protrusion 41 is guided into the recess 26.

In addition, the inclined portion of the engagement projection 48 of the shutter 40 contacts the inclined portion 23*a* of the plate spring 23, causing the plate spring 23 to be deflected in the −Z direction.

Figure 18A:
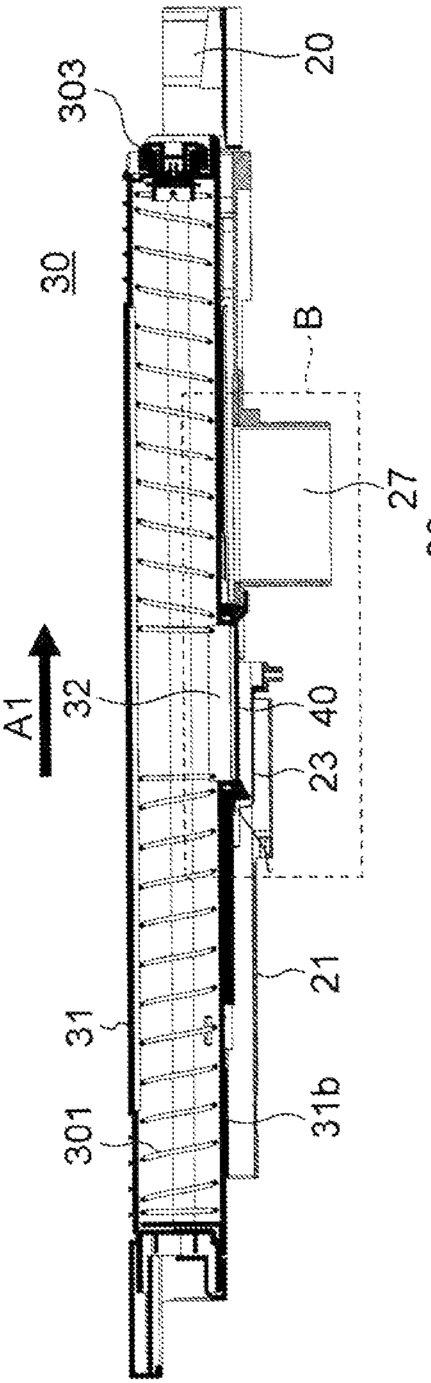
FIGS. 18A and 18B are diagrams of a cross sectional view and an enlarged cross sectional view illustrating a fifth stage of the attaching operation of the developer container according to a first embodiment.
Figure 18B:
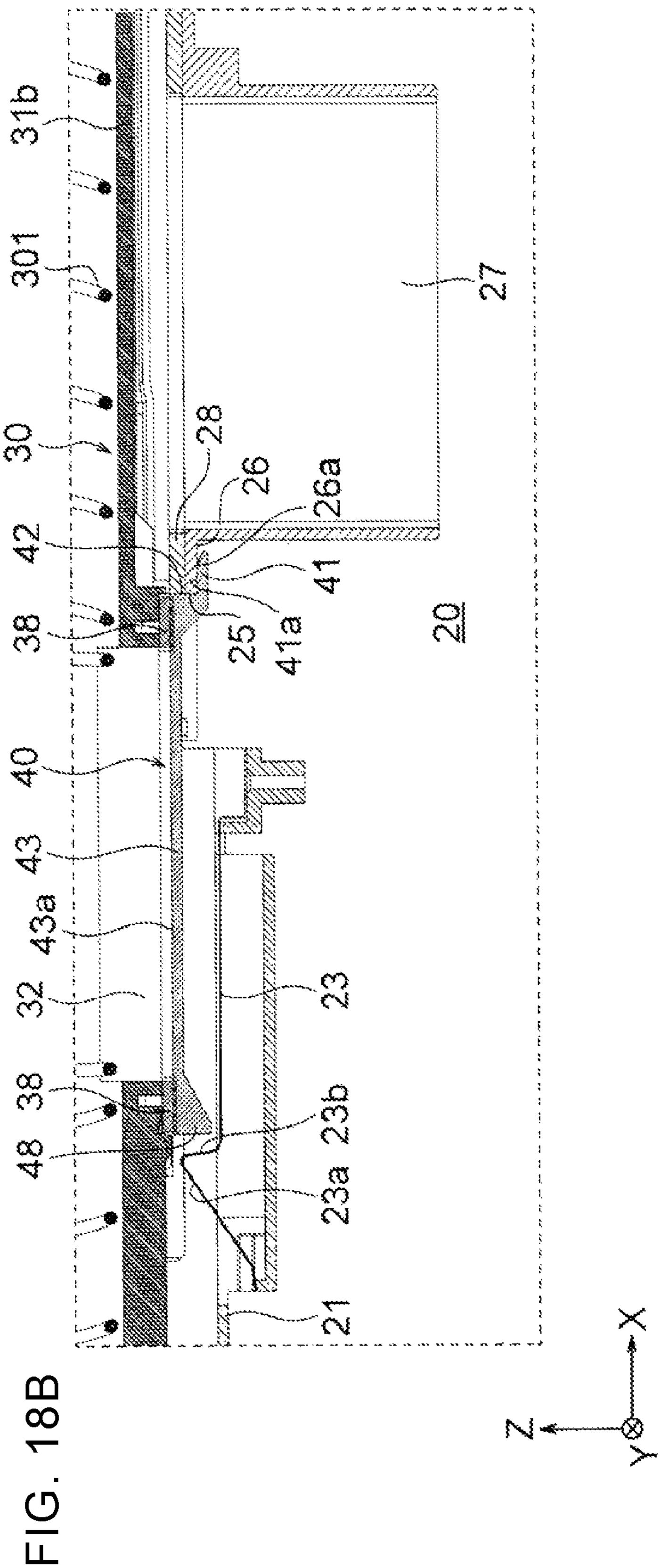

FIG. 18A is a diagram illustrating a cross sectional view of a fifth stage in the attaching operation of the developer container 30. FIG. 18B is an enlarged view of an area enclosed by a dashed line B in FIG. 18A. When the developer container 30 is moved further in the +X direction, the contact portion 42 of the shutter 40 contacts the contact portion 25 of the holding unit 20. This restricts the movement of the shutter 40 in the +X direction.

In addition, the protrusion 41 of the shutter 40 enters into the recess 26 of the holding unit 20, and the flat portion 41*a* of the protrusion 41 contacts the top surface 26*a* of the recess 26. In addition, the engagement projection 48 of the shutter 40 passes through the inclined portion 23*a* and the stopper portion 23*b* of the plate spring 23. As a result, the plate spring 23 returns to the state before being deflected in the −Z direction (the original state of the plate spring 23).

Furthermore, the lock release post 24 (FIG. 11) of the holding unit 20 contacts the contact portion 36*a* (FIG. 8) of the latch 36 of the developer container 30, causing the latch 36 to be deflected. This disengages the latch 36 of the developer container 30 and the recess 46 (FIG. 9) of the shutter 40, allowing the shutter 40 can move in the X direction with respect to the developer container 30.

Figures 19A, 19B:
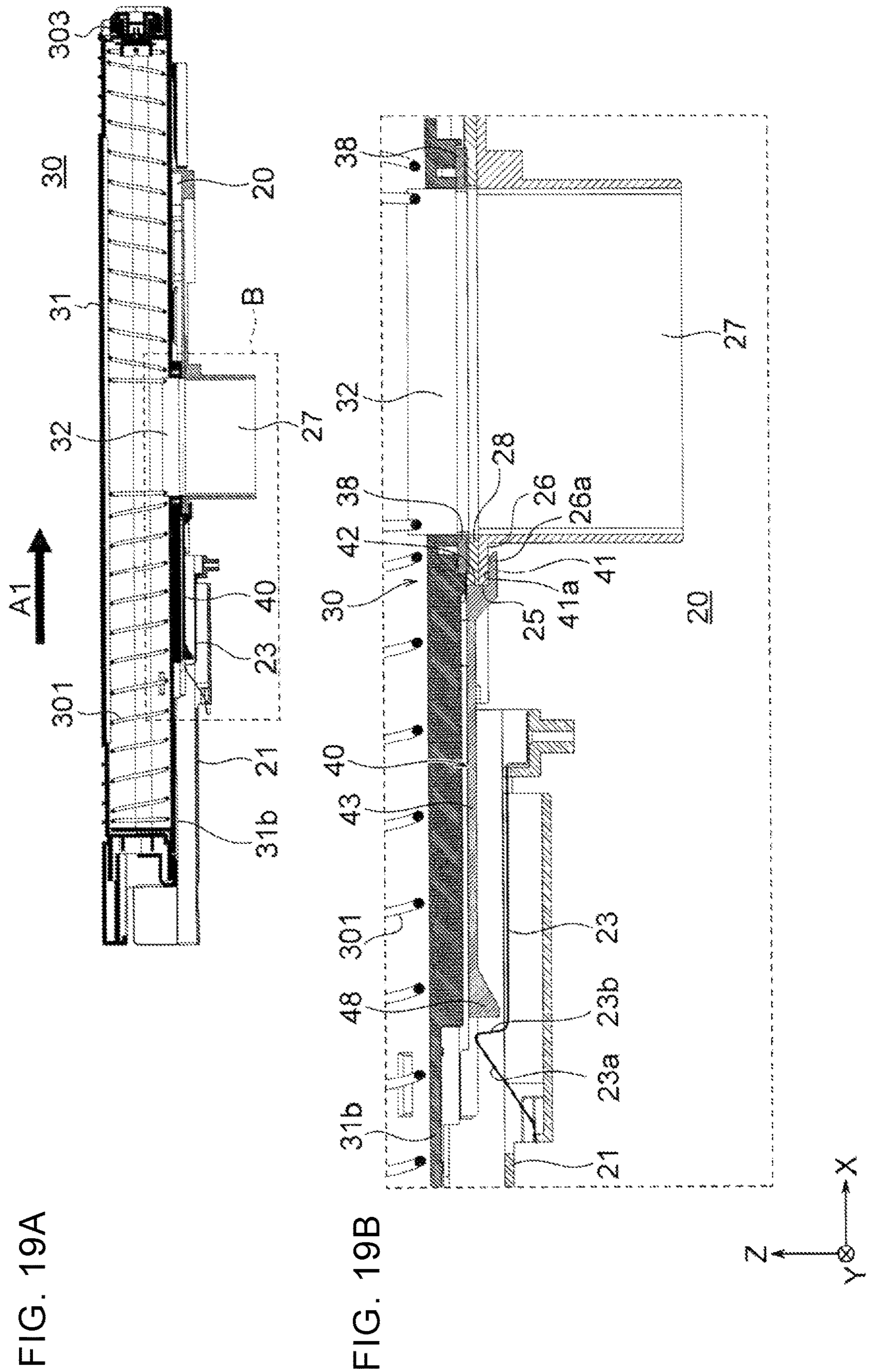
FIGS. 19A and 19B are diagrams of a cross sectional view and an enlarged cross sectional view illustrating a sixth stage of the attaching operation of the developer container according to a first embodiment.

FIG. 19A is a diagram illustrating a cross sectional view of a sixth stage in the attaching operation of the developer container 30. FIG. 19B is a diagram illustrating an enlarged view of an area enclosed by a dashed line B in FIG. 19A. At this sixth stage, the movement of the shutter 40 in the +X direction is restricted by the contact between the shutter side contact portion 42 and the unit side contact portion 25. Therefore, when the developer container 30 is moved further in the +X direction with respect to the holding unit 20, the housing 31 of the developer container 30 moves in the +X direction leaving the shutter 40. In other words, the shutter 40 is moved relative to the housing 31 of the developer container 30 in the −X direction, so as to open the supply port 32 of the developer container 30.

When the developer container 30 reaches the limit of the movement in the +X direction (i.e., an installed position or an attachment position), the positioning groove 39 (FIG. 5) of the developer container 30 is engaged with the positioning protrusion 29 (FIG. 11) of the holding unit 20, and thus the developer container 30 is positioned with respect to the holding unit 20. In addition, the positioning post 305 (FIG. 5) of the developer container 30 is engaged with a fitting hole of the drive gear (not illustrated) provided in the image formation apparatus 1, and the drive gear of the image formation apparatus is engaged with the gears 303 and 304 (FIG. 5) of the developer container 30.

In this state, the shutter 40 completely opens the supply port 32, and thus the supply port 32 of the developer container 30 and the reception port 27 of the holding unit 20 are connected to each other. As a result, the developer in the developer container 30 can be supplied from the supply port 32 to the reception port 27.

In addition, the gears 303 and 304 (FIG. 5) of the developer container 30 are rotated by the gear in the image formation apparatus 1, causing the transporting member 301 and the agitating member 302 to rotate. With this, the developer in the developer container 30 is transported toward the supply port 32 in the developer container 30 with being agitated and then is supplied from the supply port 32 to the reception port 27. The developer transported to the reception port 27 is supplied to the image formation unit 100 (FIG. 2). In other words, the image formation apparatus 1 becomes ready for performing a printing operation with the developer.

(Detaching Operation of Developer Container 30)

Figure 20A:
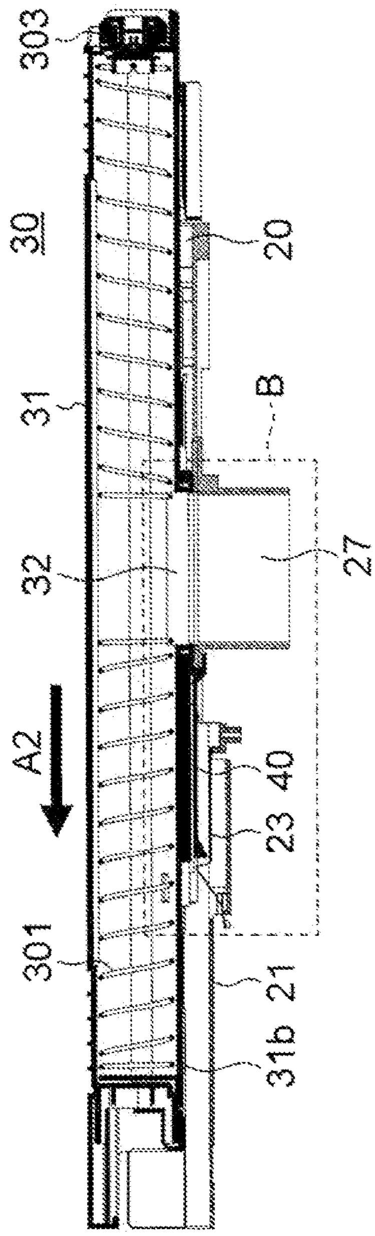
FIGS. 20A and 20B are diagrams of a cross sectional view and an enlarged cross sectional view illustrating a first stage of a detaching operation of the developer container according to a first embodiment.
Figure 20B:
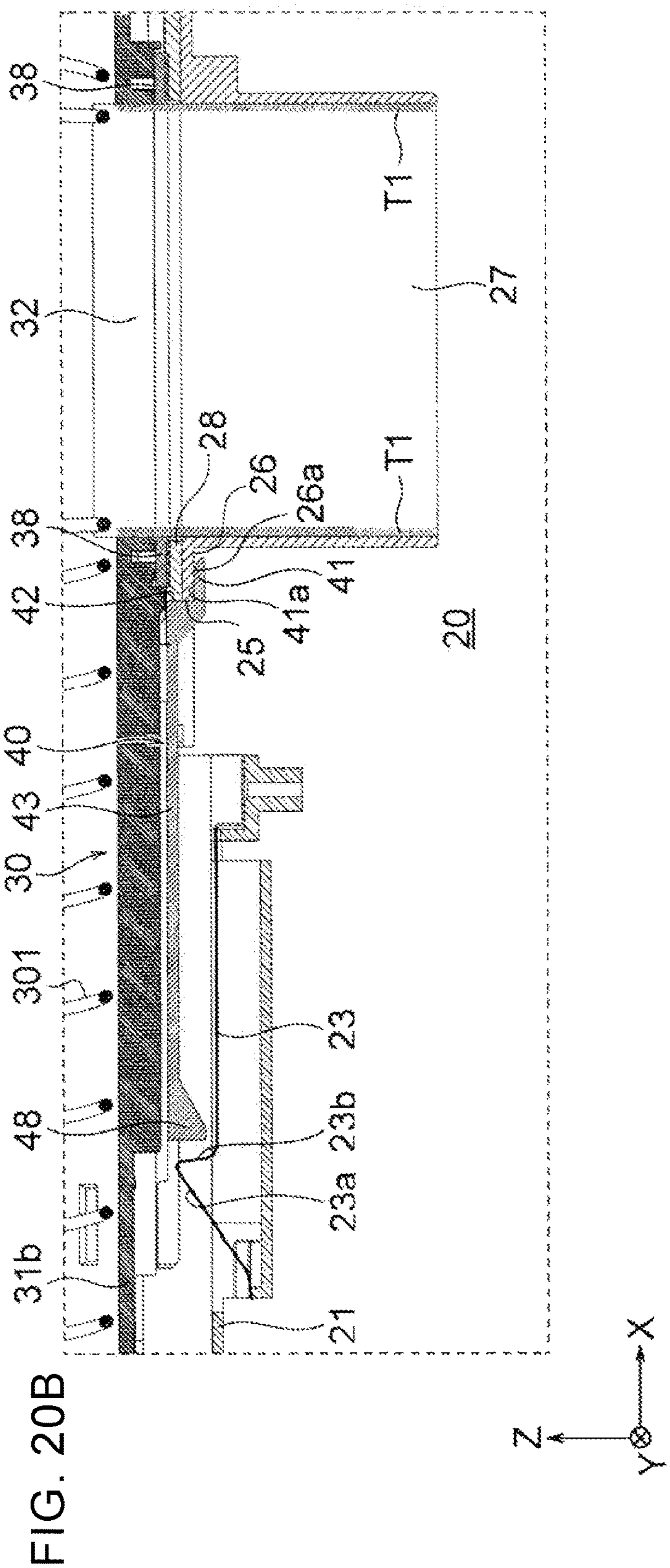

Next, a detaching operation of the developer container 30 that is used up from the holding unit 20 is described. FIG. 20A is a diagram illustrating a cross sectional view of a first stage of the detaching operation of the developer container 30. FIG. 20B is a diagram illustrating an enlarged view of an area enclosed by a dashed line B in FIG. 20A.

In a state where the developer container 30 is used up, i.e., when all the developer in the developer container 30 has been discharged, the developer is adhered to the inner wall surface of each of the reception port 27, the sealing member 38, and the supply port 32, as illustrated by the reference sign T1 in FIG. 20B.

From the state (the installed position) illustrated in FIGS. 20A and 20B, the user tries to detach (remove) the developer container 30 in the −X direction. Note that the −X direction is also referred to as a detaching direction (or a second direction) and is indicated by an arrow A2 in the figures.

At this state illustrated in FIGS. 20A and 20B, by the contact between the engagement projection 48 of the shutter 40 and the stopper portion 23*b* of the plate spring 23 of the holding unit 20, the movement of the shutter 40 in the −X direction is restricted. Therefore, when the developer container 30 is pulled out in the −X direction, the housing 31 of the developer container 30 moves in the −X direction, leaving the shutter 40. In other words, the shutter 40 moves in the +X direction relative to the housing 31 of the developer container 30.

Figure 21A:
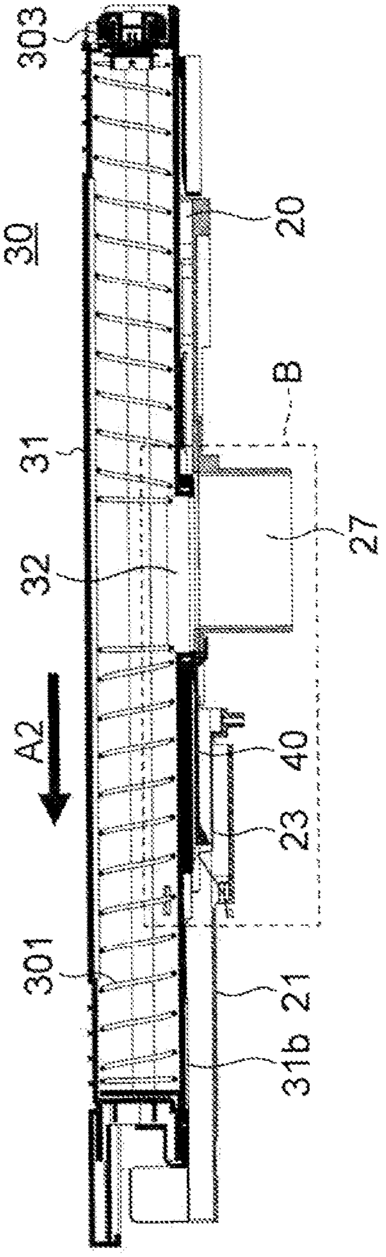
FIGS. 21A and 21B are diagrams of a cross sectional view and an enlarged cross sectional view illustrating a second stage of the detaching operation of the developer container according to a first embodiment.
Figure 21B:
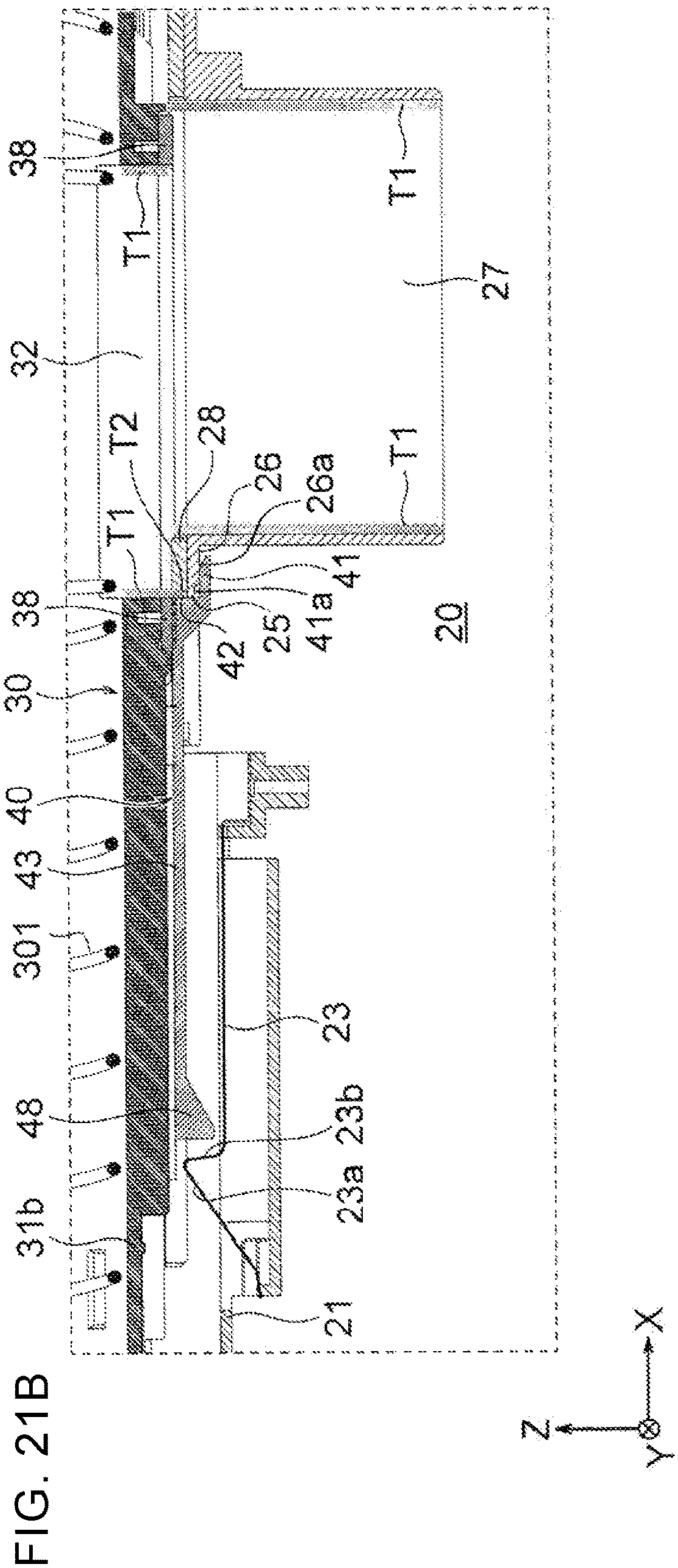

FIG. 21A is a diagram illustrating a cross sectional view of a second stage of the detaching operation of the developer container 30. FIG. 21B is a diagram illustrating an enlarged view of an area enclosed by a dashed line B in FIG. 21A. When the developer container 30 is moved in the −X direction from the state illustrated in FIGS. 20A and 20B, the inner wall surface of the supply port 32 on the −X side passes through the shutter side contact portion 42, as illustrated in FIGS. 21A and 21B. At this time, the developer that is adhered to the inner wall of the supply port 32 is scraped off by the shutter side contact portion 42 and thus is adhered to the shutter side contact portion 42 as illustrated by the reference sign T2 in the figures.

Figure 22A:
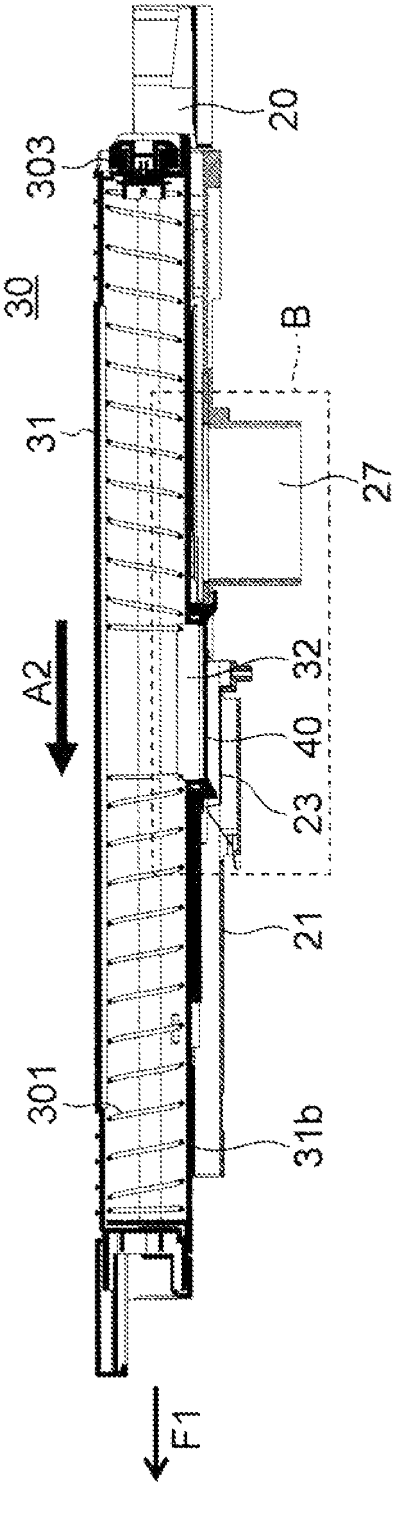
FIGS. 22A and 22B are diagrams of a cross sectional view and an enlarged cross sectional view illustrating a third stage of the detaching operation of the developer container according to a first embodiment.
Figure 22B:
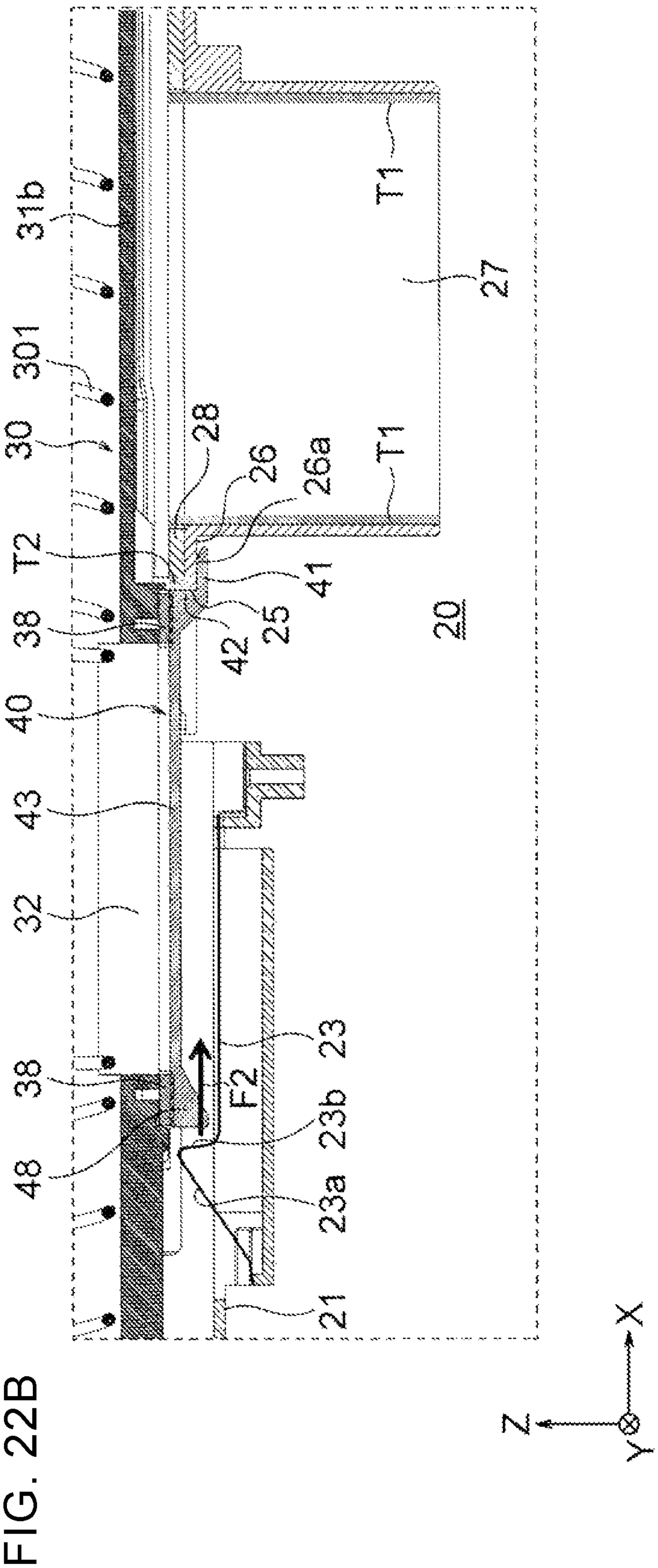

FIG. 22A is a diagram illustrating a cross sectional view of a third stage of the detaching operation of the developer container 30. FIG. 22B is a diagram illustrating an enlarged view of an area enclosed by a dashed line B in FIG. 22A. When the developer container 30 is further moved in the −X direction, the shutter 40 reaches the closing position where the shutter 40 closes the supply port 32. When the shutter 40 reaches the closing position as illustrated in FIGS. 20A and 20B, the shutter side contact portion 42 has scraped off the developer from the inner wall surfaces of the −X side and the +X side of the supply port 32. Thus, the developer is adhered to the shutter side contact portion 42 as illustrated by the reference sign T2.

When the shutter 40 reaches the closing position, the latch 36 (FIG. 8) of the developer container 30 is engaged with the recess 46 (FIG. 9) of the shutter 40, and the stopper 35 (FIG. 8) of the developer container 30 and the stopper surface 45*a* (FIG. 9) of the shutter 40 are in contact with each other. This regulates the movement of the shutter 40 relative to the housing 31 of the developer container 30. In other words, the shutter 40 moves integrally with the housing 31 of the developer container 30.

In addition, the engagement projection 48 of the shutter 40 is in contact with the stopper portion 23*b* of the plate spring 23. However, since the force F1 applied by the user to pull the developer container 30 exceeds the maximum value of the resistance force F2 that the engagement projection 48 receives from the plate spring 23 (F1>F2), the plate spring 23 is deflected in the −Z direction as explained below.

Figure 23A:
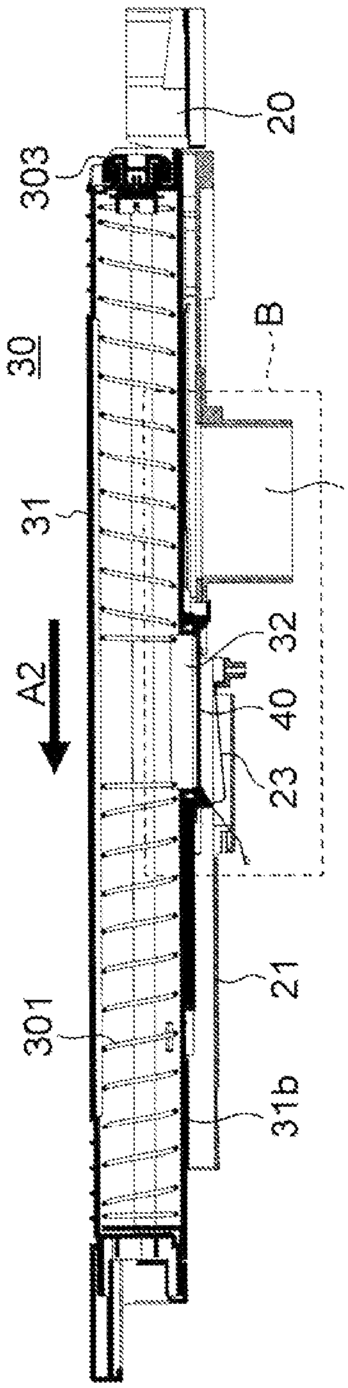
FIGS. 23A and 23B are diagrams of a cross sectional view and an enlarged cross sectional view illustrating a fourth stage of the detaching operation of the developer container according to a first embodiment.
Figure 23B:
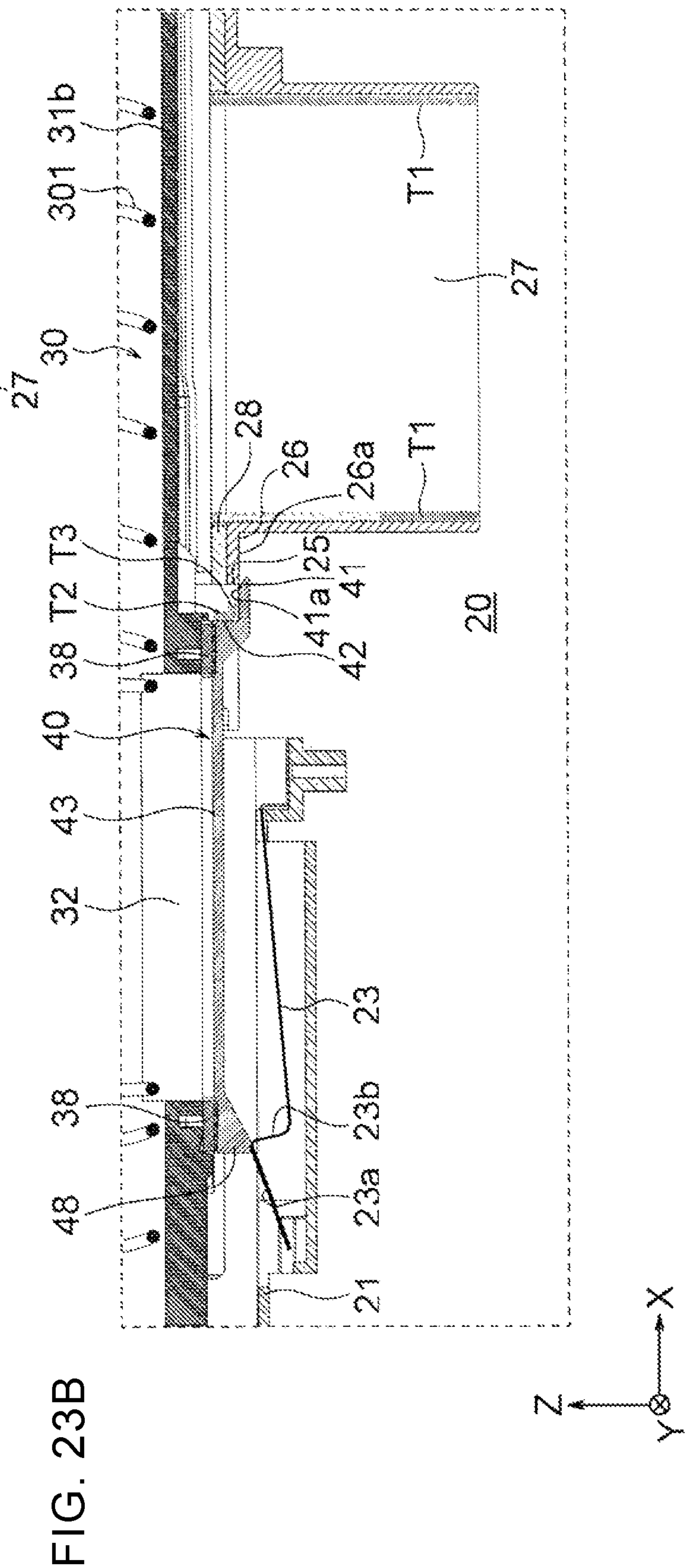

FIG. 23A is a diagram illustrating a cross sectional view of a fourth stage of the detaching operation of the developer container 30. FIG. 23B is a diagram illustrating an enlarged view of an area enclosed by a dashed line B in FIG. 23A. When the developer container 30 is moved further in the −X direction, the shutter 40 moves integrally with the housing 31 of the developer container 30 in the −X direction, and the plate spring 23 of the holding unit 20 is pressed by the engagement projection 48 of the shutter 40, which causes the plate spring 23 to be deflected in the −Z direction. With this, the developer container 30 can be further moved in the −X direction.

When the developer container 30 moves further in the −X direction, the shutter side contact portion 42 of the shutter 40 is moved away from the unit side contact portion 25 of the holding unit 20 in the −X direction, and thus the protrusion 41 of the shutter 40 comes out of the recess 26 of the holding unit 20 in the −X direction. At this time, a part of the developer T2 that was adhered to the shutter side contact portion 42 falls and is then adhered onto the flat portion 41*a* of the protrusion 41 as illustrated by the reference sign T3.

Figure 24A:
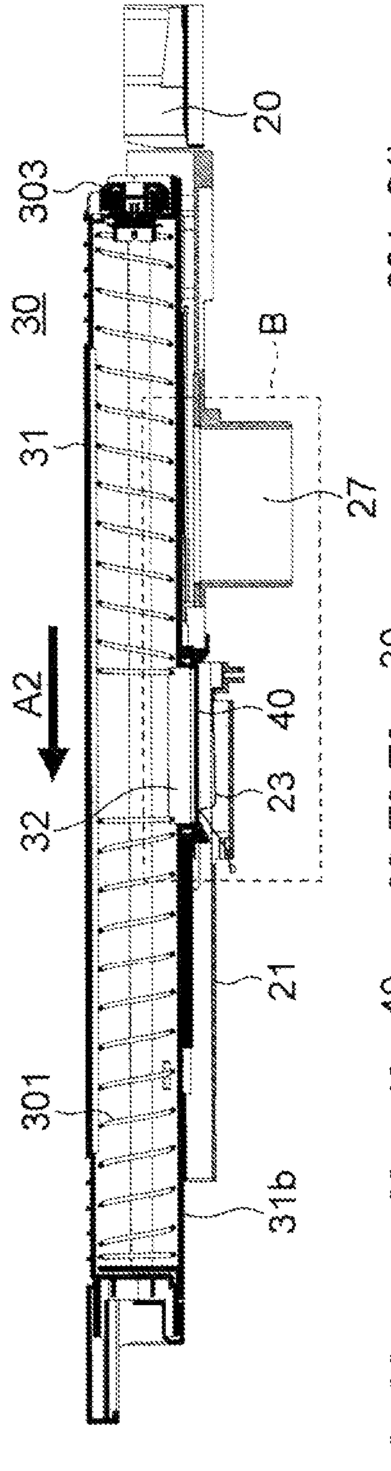
FIGS. 24A and 24B are diagrams of a cross sectional view and an enlarged cross sectional view illustrating a fifth stage of the detaching operation of the developer container according to a first embodiment.
Figure 24B:
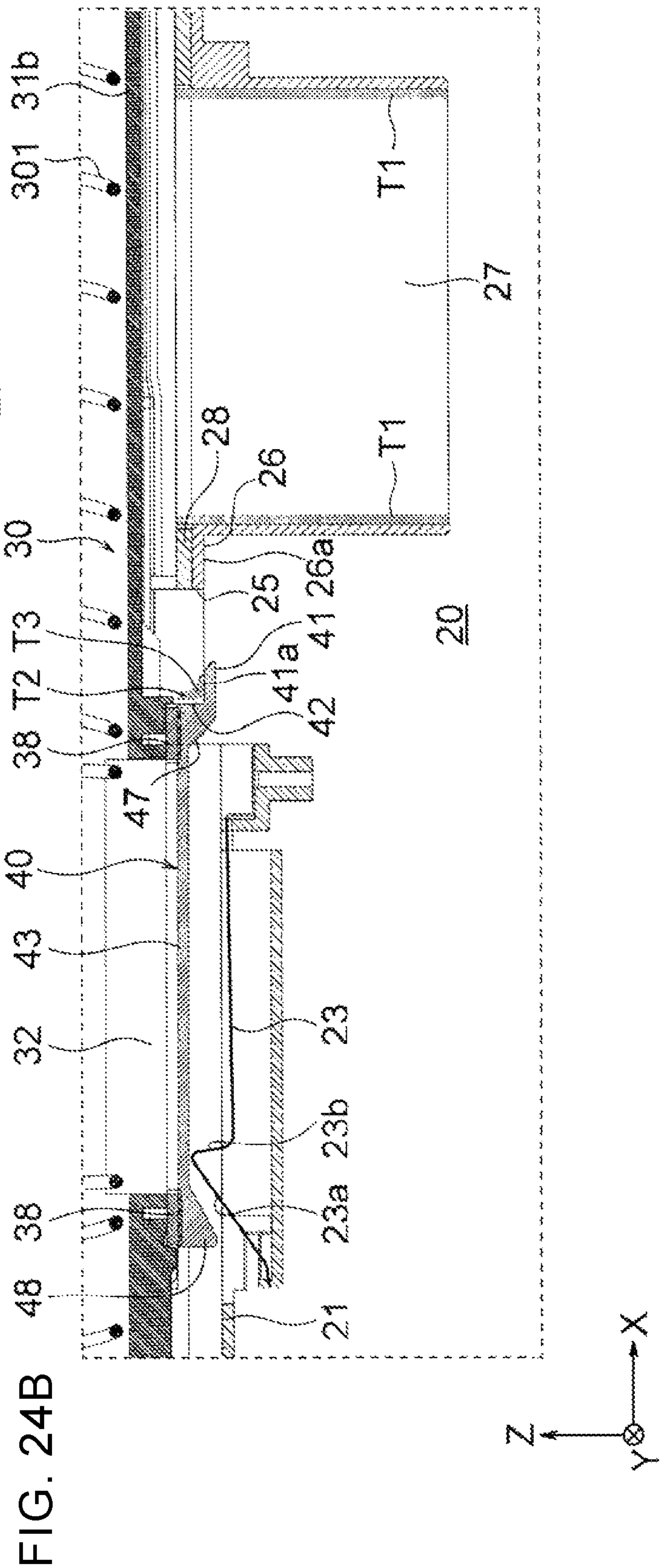

FIG. 24A is a diagram illustrating a cross sectional view of a fifth step in the detaching operation of the developer container 30. FIG. 24B is a diagram illustrating an enlarged view of an area enclosed by a dashed line B in FIG. 24A. When the developer container 30 is further moved in the −X direction, the developer container 30 is removed from the holding unit 20 with the developer T2 being adhered to the shutter side contact portion 42 and the developer T3 being adhered to the flat portion 41*a* of the protrusion 41.

Note that when the developer container 30 is further moved in the −X direction from the state illustrated in FIGS. 24A and 24B, the inclined portion 47 of the shutter 40 comes in contact with the stopper portion 23*b* of the plate spring 23, causing the plate spring 23 to be deflected in the −Z direction, so that the developer container 30 can be removed out of the holding unit 20 in the −X direction.

In the state where the developer container 30 is removed out of the holding unit 20, the developer T2 keeps being adhered to the shutter side contact portion 42 and the developer T3 keeps being adhered to the flat portion 41*a* of the protrusion 41. With this, the area around the developer container 30 is prevented from becoming contaminated with the developer.

(Attaching Operation of New Developer Container 30)

Next, an operation of attaching a new developer container 30 to the holding unit 20 from which at least one used developer container 30 has been removed is described.

Figure 25A:
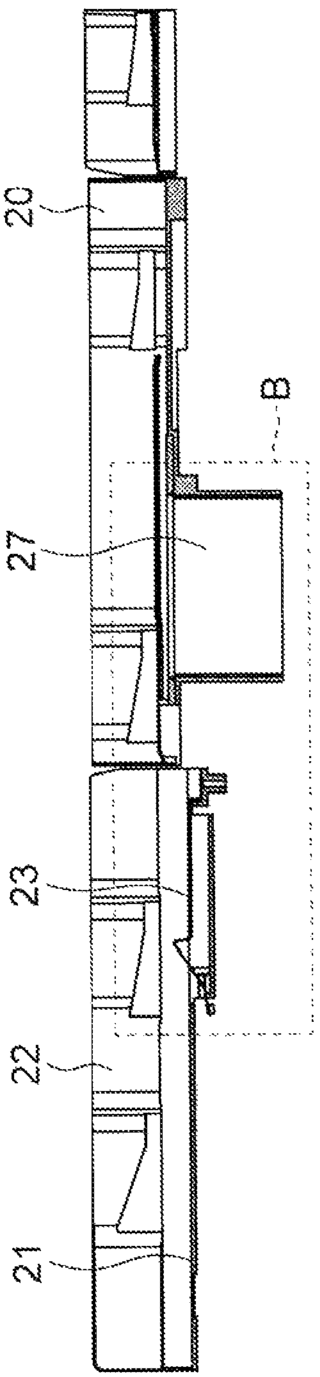
FIGS. 25A and 25B are diagrams illustrating a cross sectional view and an enlarged cross sectional view of the holding unit after the developer container is detached according to a first embodiment.
Figure 25B:
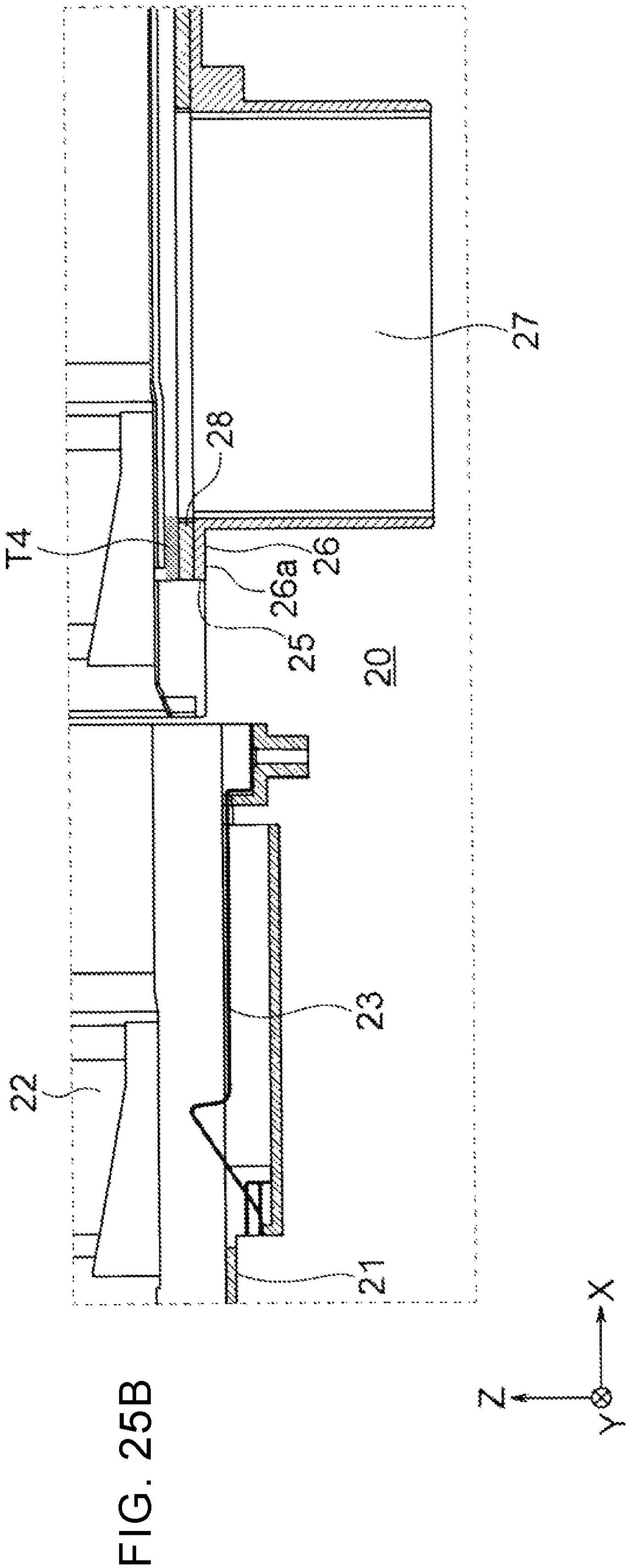

FIG. 25A is a cross sectional view of the holding unit 20 after the used developer container 30 has been removed. FIG. 25B is a diagram illustrating an enlarged view of an area enclosed by a dashed line B in FIG. 25A.

After the used developer container 30 is removed, the developer T4 is adhered to the area around the reception port 27 of the holding unit 20 (e.g., the area on the sealing member 28). This developer T4 is the developer that has fallen from the inner wall of the supply port 32 of the developer container 30 when the developer container 30 is removed.

Figure 26A:
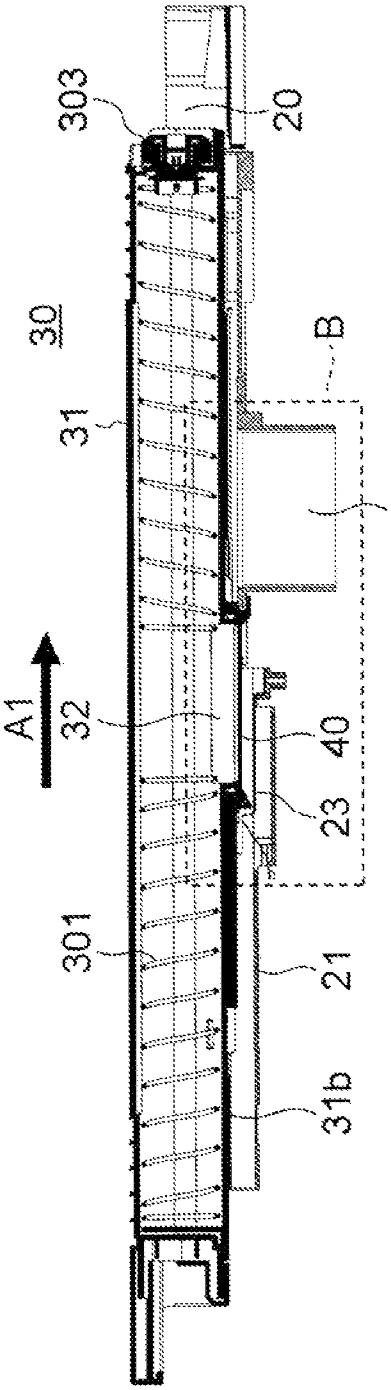
FIGS. 26A and 26B are diagrams of a cross sectional view and an enlarged cross sectional view illustrating an operation of attaching a new developer container to the holding unit after a developer container is detached according to a first embodiment.
Figure 26B:
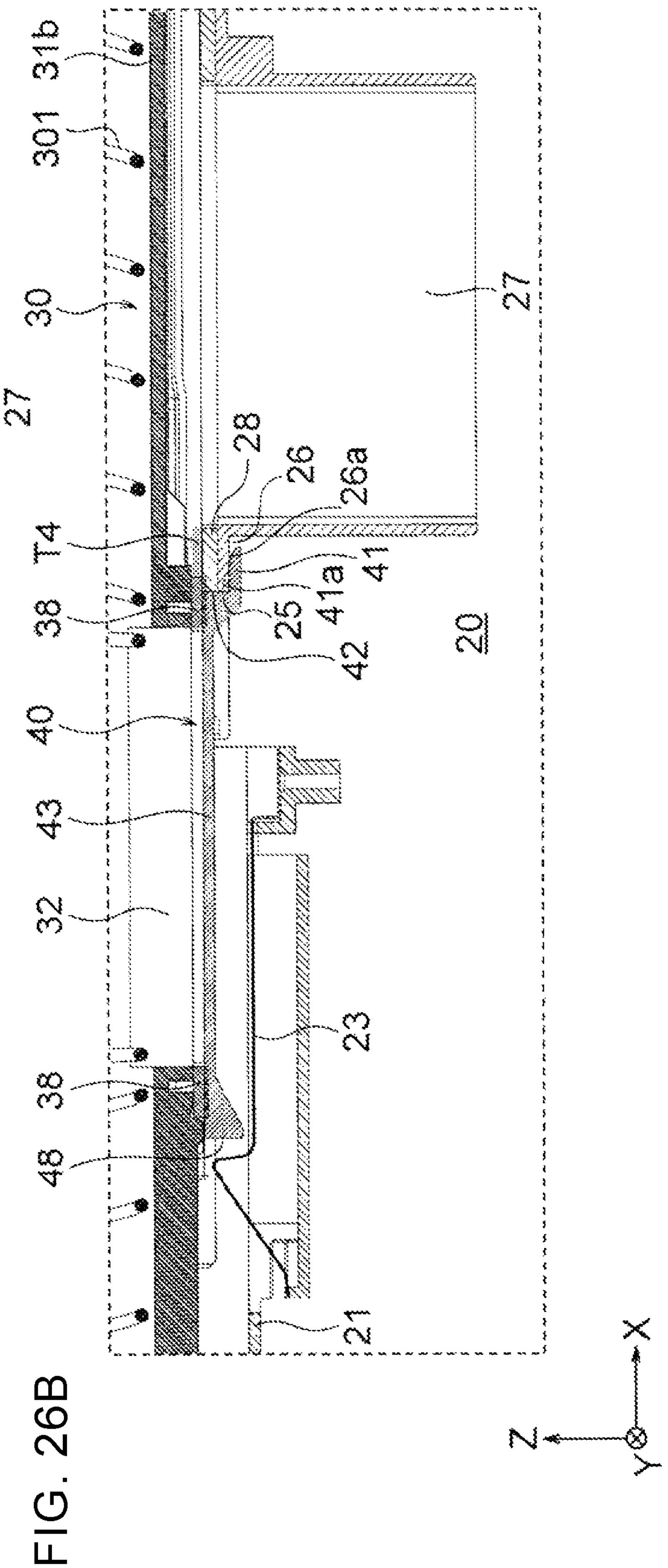

FIG. 26A illustrates a cross sectional view of the attachment operation of the developer container 30 to the holding unit 20. FIG. 26B is a diagram illustrating an enlarged view of an area enclosed by a dashed line B in FIG. 26A. The attaching operation (the installation operation) of the developer container 30 is performed as described in FIGS. 14A through 18B.

By the movement of the developer container 30 in the +X direction, the protrusion 41 of the shutter 40 enters into the recess 26 of the holding unit 20 and the shutter side contact portion 42 of the shutter 40 comes in contact with the unit side contact portion 25 of the holding unit 20.

At this time, since the flat portion 41*a* of the protrusion 41 contacts the top surface 26*a* of the recess 26, so that the sealing member 38 passes over the holding unit 20 (e.g., over the sealing member 28) in a state where the sealing member 38 is pressed between the developer container 30 and the holding unit 20. Therefore, the developer T4 remaining on the holding unit 20 is pushed by the sealing member 38 of the developer container 30 and is thus moved in the +X direction.

Figure 27A:
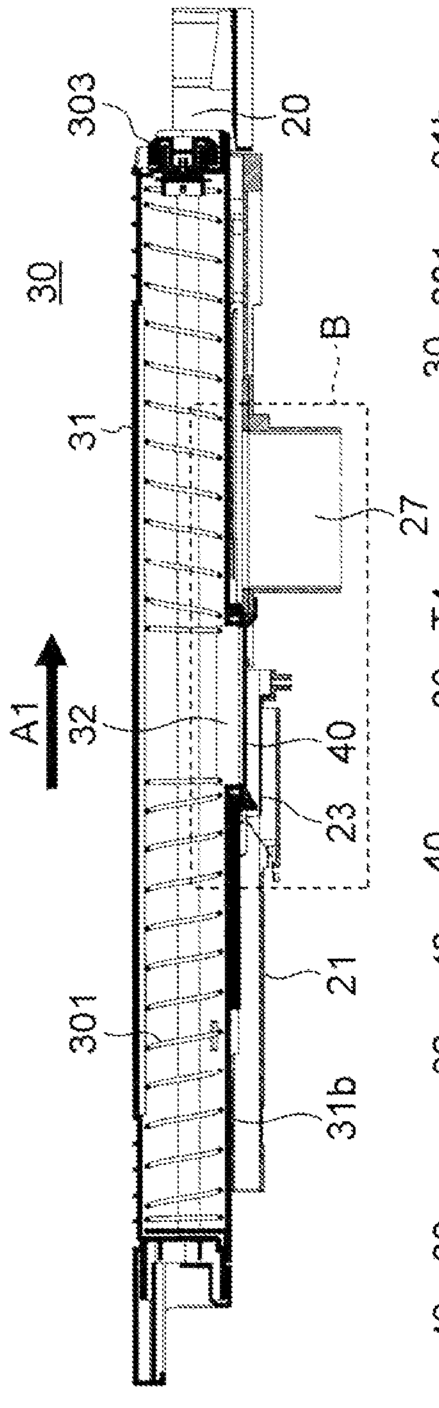
FIGS. 27A and 27B are diagrams of a cross sectional view and an enlarged cross sectional view illustrating an operation of attaching a new developer container to the holding unit after a developer container is detached according to a first embodiment.
Figure 27B:
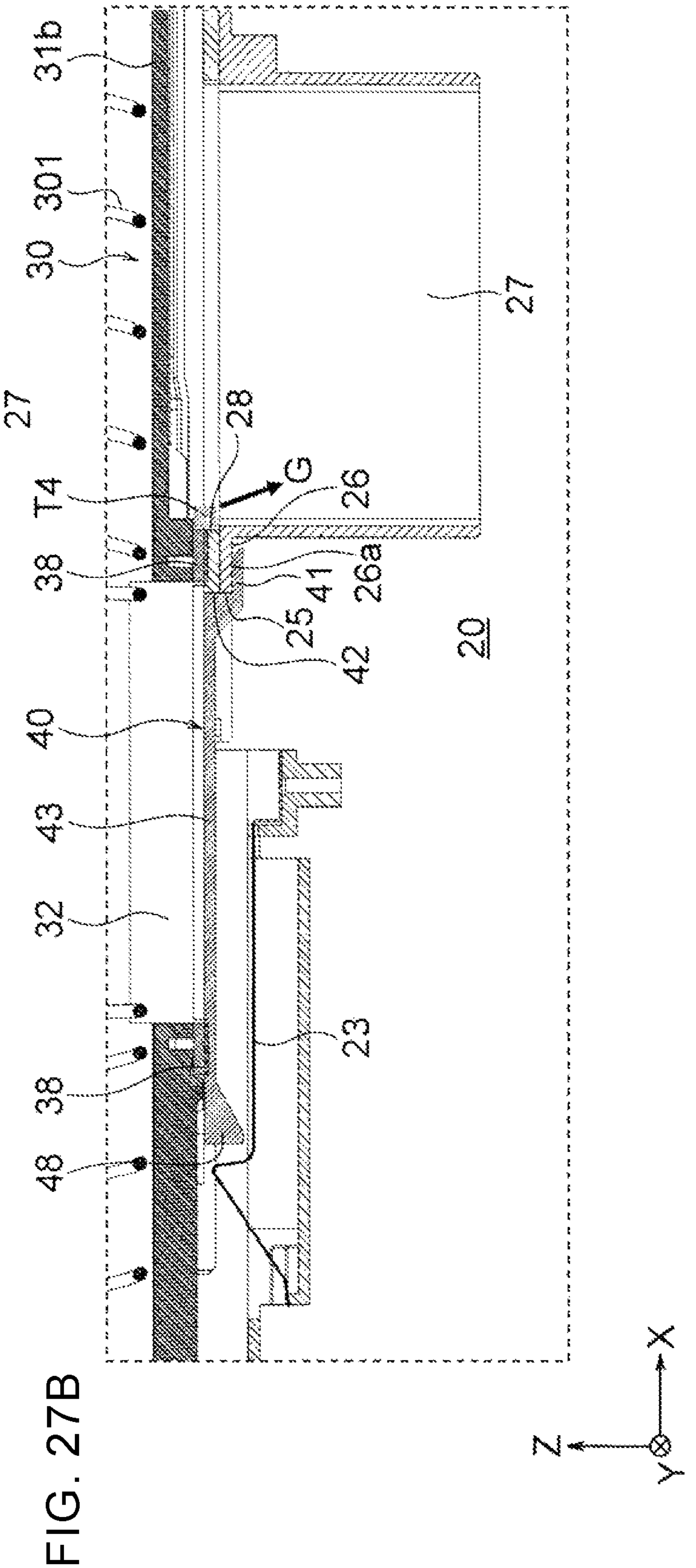

FIG. 27A is a diagram illustrating a cross sectional view of a state where the developer container 30 is further moved in the +X direction. FIG. 27B is a diagram illustrating an enlarged view of an area enclosed by a dashed line B in FIG. 27A. As described above, since the sealing member 38 of the developer container 30 passes over the holding unit 20 in the pressed state, the developer T4 remaining on the holding unit 20 is pressed by the sealing member 38 and falls into the reception port 27 as illustrated by the arrow G. With this, the area around the reception port 27 of the holding unit 20 is cleaned by the sealing member 38.

(Actions)

Figure 28A:
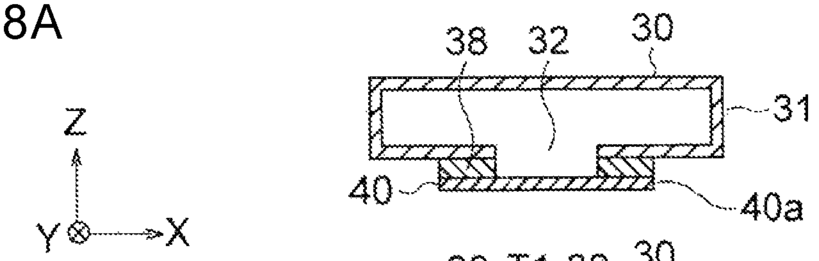
FIGS. 28A to 28F are schematic diagrams illustrating a detaching operation of a developer container according to a comparative example.

Next, actions of a first embodiment are described. First, a comparative example to be compared with a first embodiment is described. FIGS. 28A to 28F are schematic diagrams illustrating a detaching operation of a developer container 30 in the comparative example. As illustrated in FIG. 28A, the developer container 30 according to the comparative example differs from the developer container 30 according to a first embodiment in that the developer container 30 according to the comparative example does not include the protrusion 41 at the end portion 40*a* of the shutter 40 on the +X side.

Figure 28B:
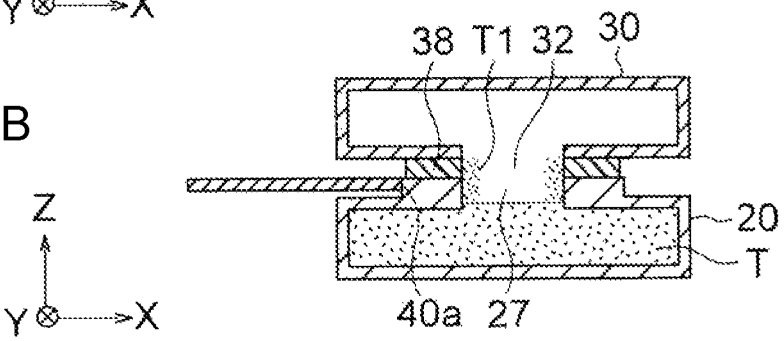

As illustrated in FIG. 28B, in a state where the supply of the developer T from the developer container 30 to the holding unit 20 is completed, some of the developer (indicated by the reference sign T1) is adhered to the inner wall surfaces of the supply port 32 of the developer container 30 and the reception port 27 of the holding unit 20.

Figure 28C:
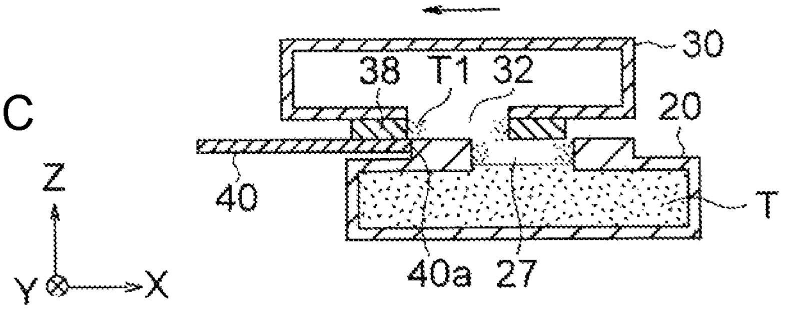

As illustrated in FIG. 28C, when the developer container 30 of the comparative example is moved in the −X direction, the −X side inner wall surface of the supply port 32 of the developer container 30 passes through the +X side end portion 40*a* of the shutter 40 while some of the developer T1 that is adhered to the −X side inner wall surface is being scraped off.

Figure 28D:
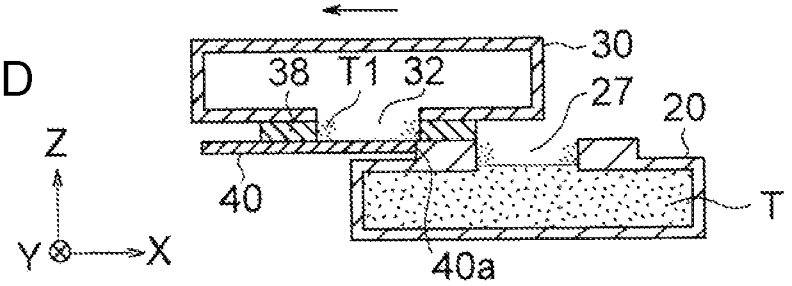

As illustrated in FIG. 28D, when the developer container 30 is further moved in the −X direction, the +X side inner wall surface of the supply port 32 of the developer container 30 passes through the +X side end portion 40*a* of the shutter 40 while some of the developer T1 that is adhered to the +X side inner wall surface is being scraped off.

Figure 28E:
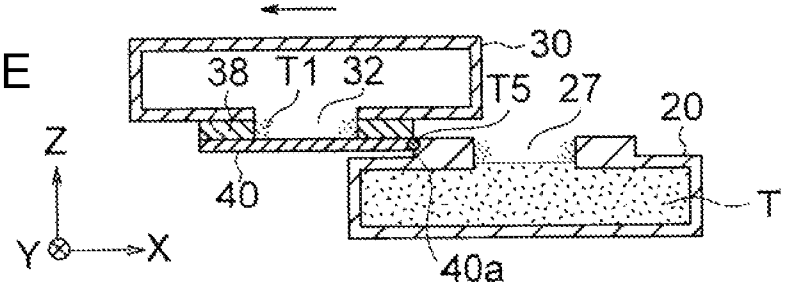

As illustrated in FIG. 28E, the developer container 30 is then removed in the −X direction in a state where the developer (indicated by the reference sign T5) that has been fallen from the inner wall surfaces of the supply port 32 is adhered to the +X side end portion 40*a* of the shutter 40.

Figure 28F:
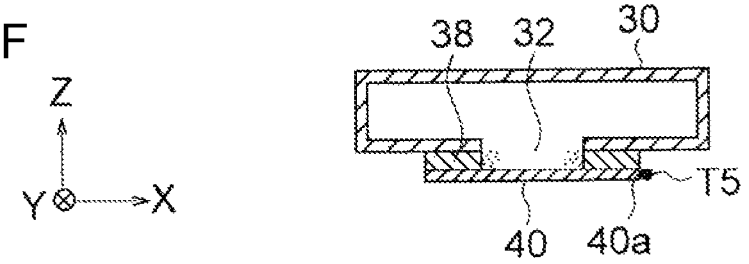

As illustrated in FIG. 28F, in a state where the developer container 30 is removed from the holding unit 20, the developer T5 is adhered to the end portion 40*a* of the shutter 40. As a result, the developer T5 may spill out from the end portion 40*a* of the shutter 40 and may contaminate the surroundings of the developer container 30 (e.g., on a desk on which the developer container 30 is placed).

Figure 29:
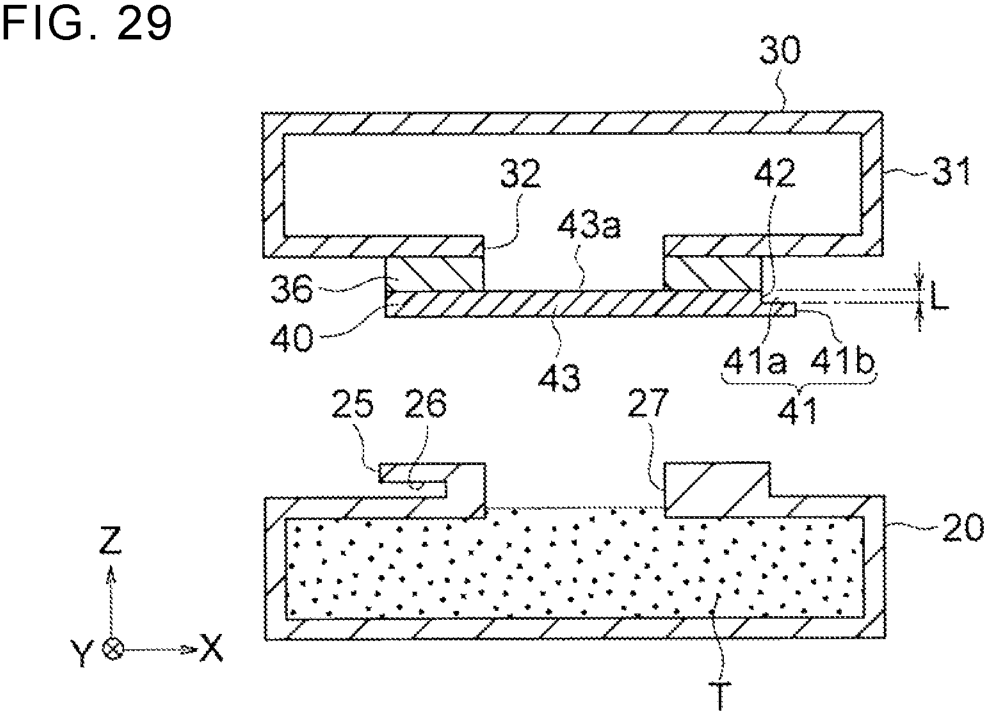
FIG. 29 is a conceptual diagram illustrating the developer container and the holding unit according to a first embodiment.

FIG. 29 is a conceptual diagram schematically illustrating the developer container 30 and the holding unit 20 according to a first embodiment. In a first embodiment, the shutter 40 of the developer container 30 includes the shutter side contact portion 42 at the end portion thereof in the +X direction (i.e., in the direction of attaching (installing) the developer container 30) and the protrusion 41 on the lower side of the shutter side contact portion 42 (i.e., the side opposite to the housing 31 with respect to the shutter side contact portion 42). In the state where the developer container 30 is installed to the holding unit 20, the protrusion 41 of the shutter 40 enters into the recess 26 of the holding unit 20.

Therefore, the developers T2 and T3 that were scraped off from the inner wall surfaces of the supply port 32 of the developer container 30 or the like during the detaching operation of the developer container 30 described with reference to FIGS. 20A to 24B are held on the protrusion 41 of the shutter 40, as illustrated in FIG. 24B.

Therefore, even after the developer container 30 is removed from the holding unit 20, the protrusion 41 of the shutter 40 holds the developer, preventing the developer from spilling out of the developer container 30. With this, the surroundings of the removed developer container 30 are prevented from becoming contaminated with the developer.

Further, as illustrated in FIG. 19B, in the state where the developer container 30 is installed to the holding unit 20, the protrusion 41 of the shutter 40 enters in the recess 26 of the holding unit 20, with no gap being created on the protrusion 41. This reduces the amount of developer that is adhered onto the protrusion 41 when the developer container 30 is removed.

As schematically illustrated in FIG. 29, it may be preferable that the distance L in the Z direction between the cover surface 43*a* of the cover portion 43 of the shutter 40 and the flat portion 41*a* of the protrusion 41 be 5 mm or less. The reason is that it is difficult to put the user's fingers into the gap between the developer container 30 and the protrusion 41 of the shutter 40, if the distance L is 5 mm or less.

Figure 30:
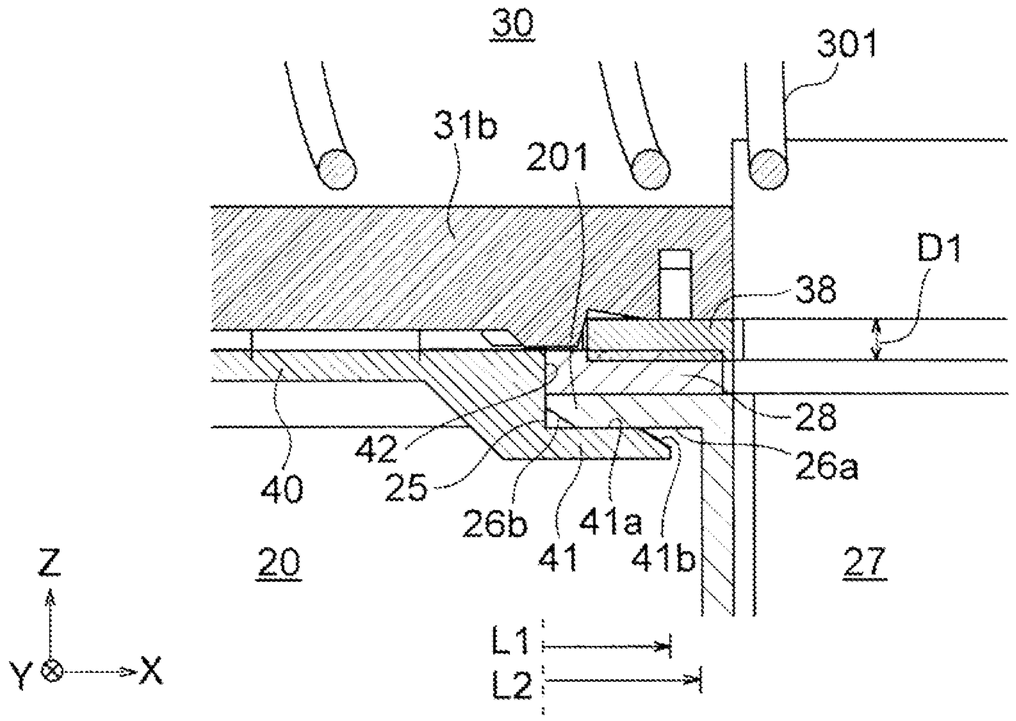
FIG. 30 is a schematic diagram illustrating an enlarged view of an engagement section between the opening/closing member and the holding unit according to a first embodiment.

FIG. 30 is a schematic diagram illustrating the protrusion 41 and the shutter side contact portion 42 of the shutter 40 and the holding unit side contact portion 25 and the recess 26 of the holding unit 20. As illustrated in FIG. 30, when the protrusion 41 of the shutter 40 is engaged with the recess 26 of the holding unit 20, the flat portion 41*a* of the protrusion 41 contacts the top surface 26*a* of the recess 26.

Therefore, the distance between the housing 31 of the developer container 30 and the holding unit 20 is kept constant. As a result, as illustrated in FIGS. 26B to 27B described above, the sealing member 38 passes over the holding unit 20 with the sealing member 38 being pressed between the housing 31 of the developer container 30 and the holding unit 20. Therefore, the developer T4 (FIG. 27B) remaining on the holding unit 20 can be efficiently removed.

The distance L2 by which the recess 26 is recessed in the +X direction from the unit side contact portion 25 is longer than the distance L1 by which the protrusion 41 protrudes in the +X direction from the shutter side contact portion 42. Therefore, with the shutter side contact portion 42 and the unit side contact portion 25 in contact without any gap, the protrusion 41 of the shutter 40 and the recess 26 of the holding unit 20 can be engaged with each other.

Note that it may be preferable that an inclined portion 26*b* (second inclined portion), which corresponds to the inclined portion 41*b* (first inclined portion) of the protrusion 41, is formed between the unit side contact portion 25 of the holding unit 20 and the top surface 26*a* of the recess 26. With this configuration, when the protrusion 41 of the shutter 40 enters in the recess 26 of the holding unit 20, the inclined portion 41*b* of the protrusion 41 comes in contact with the inclined portion 26*b* of the holding unit 20.

The housing 31 of the developer container 30 is pressurized in the +Z direction by the pressure of the sealing member (elastic member) 38, and thus the shutter 40 is also pressurized in the +Z direction through the engagement of the shutter rails 34 and the slide portions 45. As attaching (installing) the developer container 30 to the holding unit 20, the shutter 40 is guided in the −Z direction, by the contact between the inclined portion 41*b* of the protrusion 41 and the inclined portion 26*b* of the holding unit 20. In other words, the developer container 30 is guided in the −Z direction so that the distance between the holding unit 20 and the housing 31 of the developer container 30, which is pressurized in the +Z direction by the pressing force of the sealing member 38, becomes a predetermined distance.

As a result, the sealing member 38 between the portion 201 of the holding unit 20 and the housing 31 is compressed and thus the thickness D1 of the sealing member 38 in the Z direction is reduced. As a result, the effects of the sealing member 38 in cleaning the area surrounding the reception port 27 of the holding unit 20 can be enhanced.

(Effects of First Embodiment)

As explained above, the developer supply device 50 according to a first embodiment includes the developer container 30 and the holding unit 20 (the developer container holder). The developer container 30 includes the shutter 40 (the opening/closing member) configured to open and close the supply port 32 of the housing 31 and the sealing member 38 provided between the housing 31 and the shutter 40. The shutter 40 includes the cover portion 43 including the cover surface 43*a* configured to close the supply port 32 of the developer container 30 and the protrusion 41 (the protruding portion) protruding from the cover portion 43 in the +X direction (the attaching direction of the developer container 30). The protrusion 41 is provided at the position spaced away from the cover surface 43*a* to the holding unit 20 side. The holding unit 20 includes the recess 26 (the engagement portion) that is configured to be engaged with the protrusion 41 of the shutter 40 in the state where the developer container 30 is installed (attached) to the holding unit 20.

Since the shutter 40 includes the protrusion 41, the developer that falls from the inner wall of the supply port 32 during the removal of the developer container 30 from the holding unit 20 is retained by the protrusion 41 of the shutter 40. This prevents the developer from spilling out of the developer container 30 after the removal. As a result, the surroundings of the developer container 30 can be prevented from becoming contaminated with the developer.

Further in a first embodiment, from a certain point after the protrusion 41 and the recess 26 are engaged until the supply port 32 and the reception port 27 are opposed (aligned) to each other in the course of attaching the developer container 30 to the holding unit 20, a part of the recess 26 (the top surface 26*a* of the recess 26) is located between the protrusion 41 and the sealing member 38. Therefore, the amount of the developer that is adhered onto the protrusion 41 when the developer container 30 is removed can be reduced.

Further in a first embodiment, in the state where the protrusion 41 of the shutter 40 is engaged with the recess 26 of the holding unit 20, the developer container 30 is moved up to the installed position (i.e., the position where the supply port 32 and the reception port 27 are communicated with each other) to open the supply port 32 by the shutter 40. Therefore, the shutter 40 is opened only when the supply port 32 and the reception port 27 are opposed to each other, which reliably prevents leakage of the developer.

(First Modification)

Figure 31:
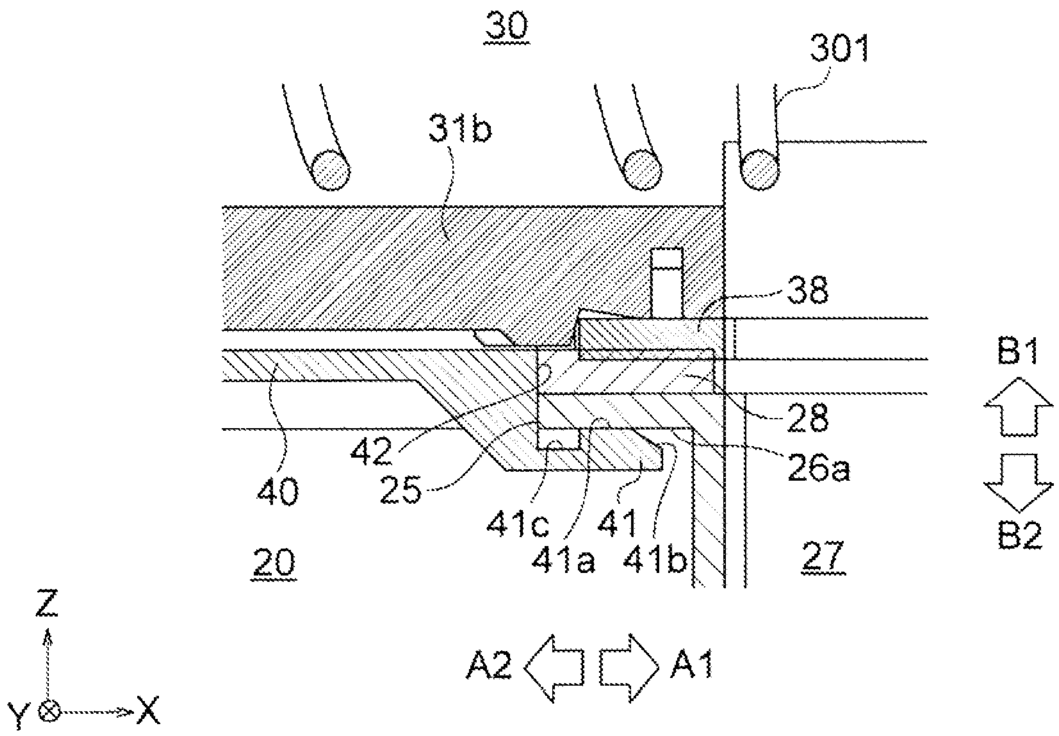
FIG. 31 is a schematic diagram illustrating an enlarged view of an engagement section between an opening/closing member and a holding unit according to a first modification.

Next, a first modification of a first embodiment is described. FIG. 31 is a diagram illustrating an enlarged view of an engagement section between the shutter 40 and the holding unit 20 in a first modification. In FIG. 31, the +X direction (the first direction) is indicated by an arrow A1, the −X direction (the second direction) is indicated by an arrow A2, the developer container 30 side is indicated by an arrow B1, and the holding unit 20 side is indicated by an arrow B2.

In the shutter 40 according to a first embodiment, the entire top surface of the protrusion 41 is the flat portion 41*a*, and the flat portion 41*a* is configured to come in contact with the top surface 26*a* of the recess 26 of the holding unit 20, as illustrated in FIG. 30.

To the contrary, in a first modification, as illustrated in FIG. 31, the protrusion 41 is formed with a hole 41*c* on a surface of the protrusion 41 on the +Z side (on the developer container 30 side), such that the hole 41*c* is provided on the −X side (the side of the second direction) with respect to the flat portion 41*a* of the protrusion 41. That is, the protrusion 41 is protruded in the +X direction (the first direction indicated by the arrow A1) from the shutter side contact portion 42, and the surface of the protrusion 41 on the developer container 30 side (the arrow B1 side) is formed with the hole 41*c* provided on the −X direction side (the second direction side: the arrow A2 side) with respect to the flat portion 41*a* of the protrusion 41. In other words, the hole 41*c* is formed between the flat portion 41*a* of the protrusion 41 (the contact portion of the protrusion 41 that contacts the top surface 26*a* of the recess 26) and the shutter side contact portion 42.

With this configuration, when the protrusion 41 is pulled out of the recess 26 as illustrated in FIGS. 22B to 23B, the developer that drops on the protrusion 41 is retained in the hole 41*c*. In addition, since the developer is retained in the hole 41*c* even after the developer container 30 is removed from the holding unit 20, it may be difficult for the developer to be scattered even if the removed developer container 30 receives a shock. As a result, the effect of preventing the surroundings of the developer container 30 from becoming contaminated with developer can be enhanced.

In a first modification, the hole 41*c* is provided on the −X side with respect to the flat portion 41*a* of the protrusion 41. However, the disclosure is not limited thereto. For example, the flat portion 41*a* may be formed to be inclined such that the flat portion 41*a* is displaced in the −Z direction as advancing in the −X direction. In such a case, an area including the lowest point of the flat portion 41*a* functions as a hole.

(Second Modification)

Figure 32A:
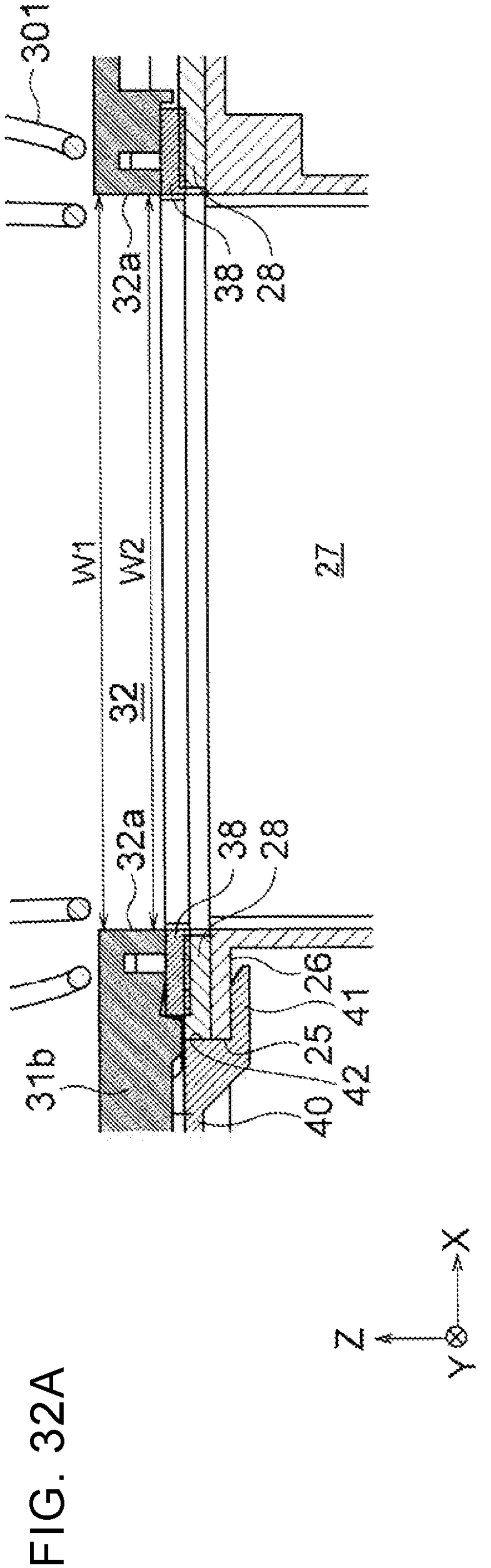
FIGS. 32A and 32B are schematic diagrams illustrating a shape of a supply port of a developer container in a first embodiment and a second modification, respectively.
Figure 32B:
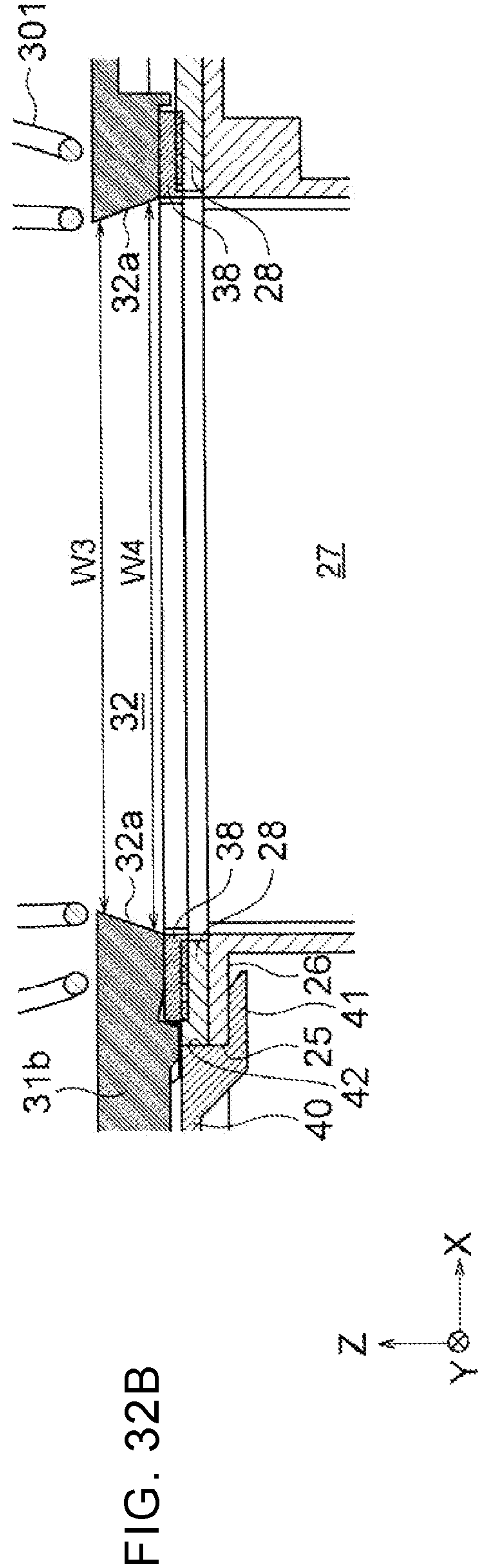

Next, a second modification of a first embodiment is described. FIG. 32A is a diagram illustrating an enlarged view of the supply port 32 of the developer container 30 and the area in the vicinity of the supply port 32 according to a first embodiment. FIG. 32B is a diagram illustrating an enlarged view of the supply port 32 of the developer container 30 and the area in the vicinity of the supply port 32 according to a second modification.

In a first embodiment, as illustrated in FIG. 32A, the inner wall surface 32*a* of the supply port 32 is parallel to the Z direction, and the internal dimension W1 of the upper end (the +Z side end) of the supply port 32 and the internal dimension W2 of the lower end (the −Z side end) of the supply port 32 are equal (W1=W2).

To the contrary, in a second modification, as illustrated in FIG. 32B, the inner wall surface 32*a* of the supply port 32 is inclined with respect to the Z direction, and the internal dimension W4 of the lower end of the supply port 32 is larger than the internal dimension W3 of the upper end of the supply port 32 (W3<W4).

With this configuration, when the developer is supplied (discharged) from the developer container 30, it is less likely that the developer is adhered to the inner wall surface 32*a* (especially, the lower area of the inner wall surface 32*a*) of the supply port 32. Therefore, the amount of the developer that is adhered to the shutter side contact portion 42 when the used developer container 30 is removed is reduced. As a result, the effect of preventing the surroundings of the developer container 30 from becoming contaminated with developer can be further enhanced.

Second Embodiment

Figure 33:
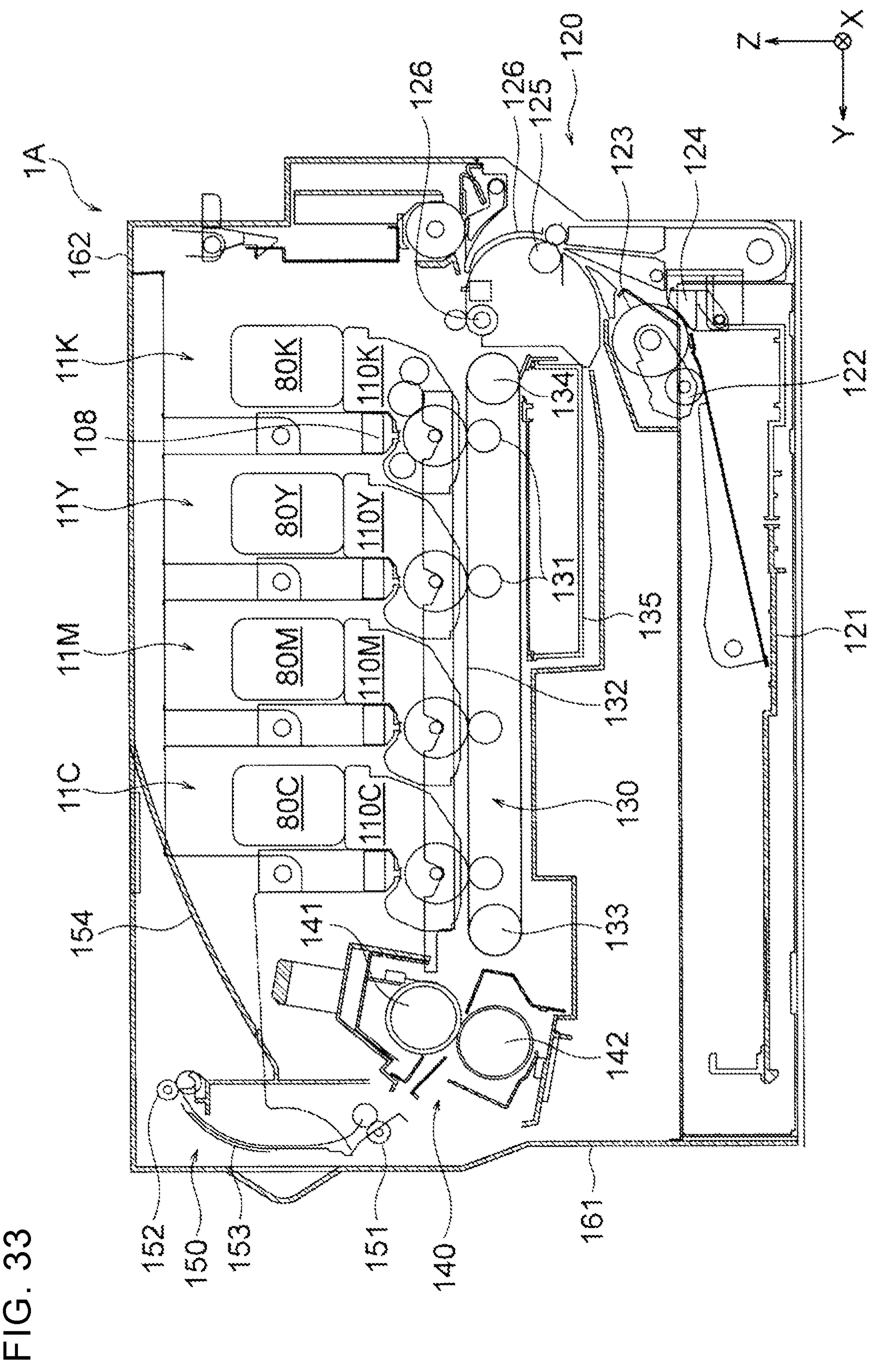
FIG. 33 is a diagram illustrating a basic configuration of an image formation apparatus according to a second embodiment.

Next, a second embodiment is described. FIG. 33 is a diagram illustrating a basic configuration of an image formation apparatus 1A according to a second embodiment. The image formation apparatus 1A according to a second embodiment has a same configuration as the image formation apparatus 1 according to a first embodiment (FIG. 1) except for image formation sections 11K, 11Y, 11M, and 11C.

The image formation sections 11K, 11Y, 11M, and 11C according to a second embodiment respectively includes image formation units 110K, 110Y, 110M, and 110C and developer containers 80K, 80Y, 80M, and 80C as developer containers.

The image formation sections 11K, 11Y, 11M, and 11C may be referred to as image formation sections 11 when there is no need to distinguish between them. The image formation units 110K, 110Y, 110M, and 110C may be referred to as image formation units 110 when there is no need to distinguish between them. The developer containers 80K, 80Y, 80M, and 80C may be referred to as developer containers 80 when there is no need to distinguish between them.

Figure 34:
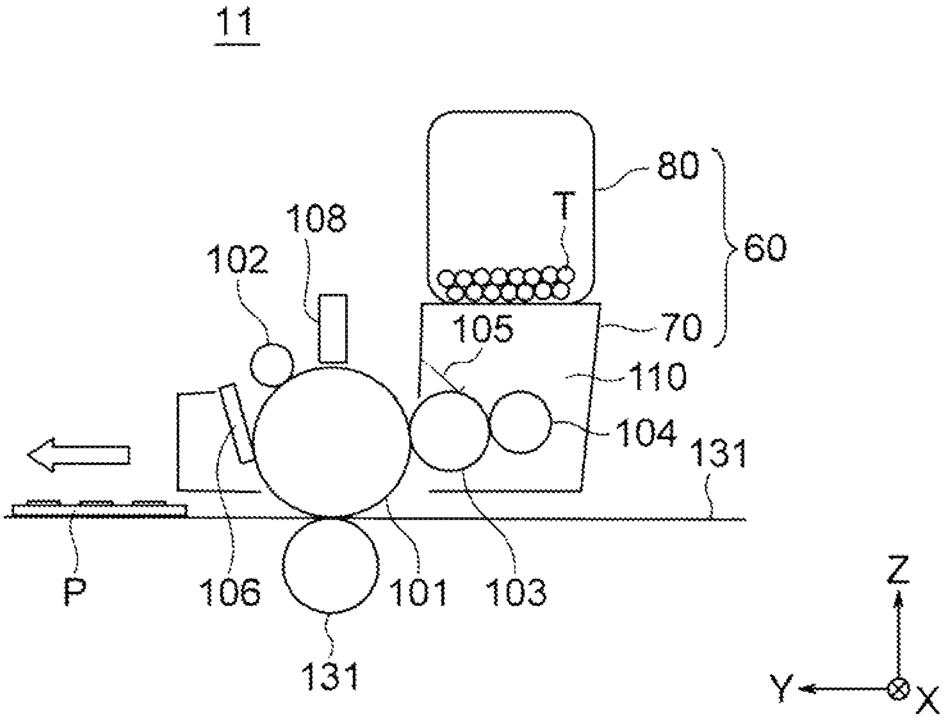
FIG. 34 is a diagram illustrating a basic configuration of an image formation section of the image formation apparatus according to a second embodiment.

FIG. 34 is a diagram illustrating a view of a basic configuration of the image formation section 11. As illustrated in FIG. 34, each image formation section 11 includes the image formation unit 110 and the developer container 80 as the developer container. The developer container 80 is detachably attached to the image formation unit 110. In a second embodiment, the holding unit 20 (FIG. 2) described in a first embodiment is not provided.

As in the image formation unit 100 according to a first embodiment, the image formation unit 110 according to a second embodiment includes the photosensitive drum 101, the charging roller 102, the development roller 103, the supply roller 104, the development blade 105, and the cleaning member 106. The configurations of these components are as described in a first embodiment.

The image formation unit 110 includes a unit housing 70 (a housing 70 of the image formation unit) serving as a developer container holder. The developer container 80 is detachably attached to the unit housing 70. The developer container 80 and the unit housing 70 constitute a developer supply device 60 configured to supply the developer to the image formation unit 110.

Figure 35:
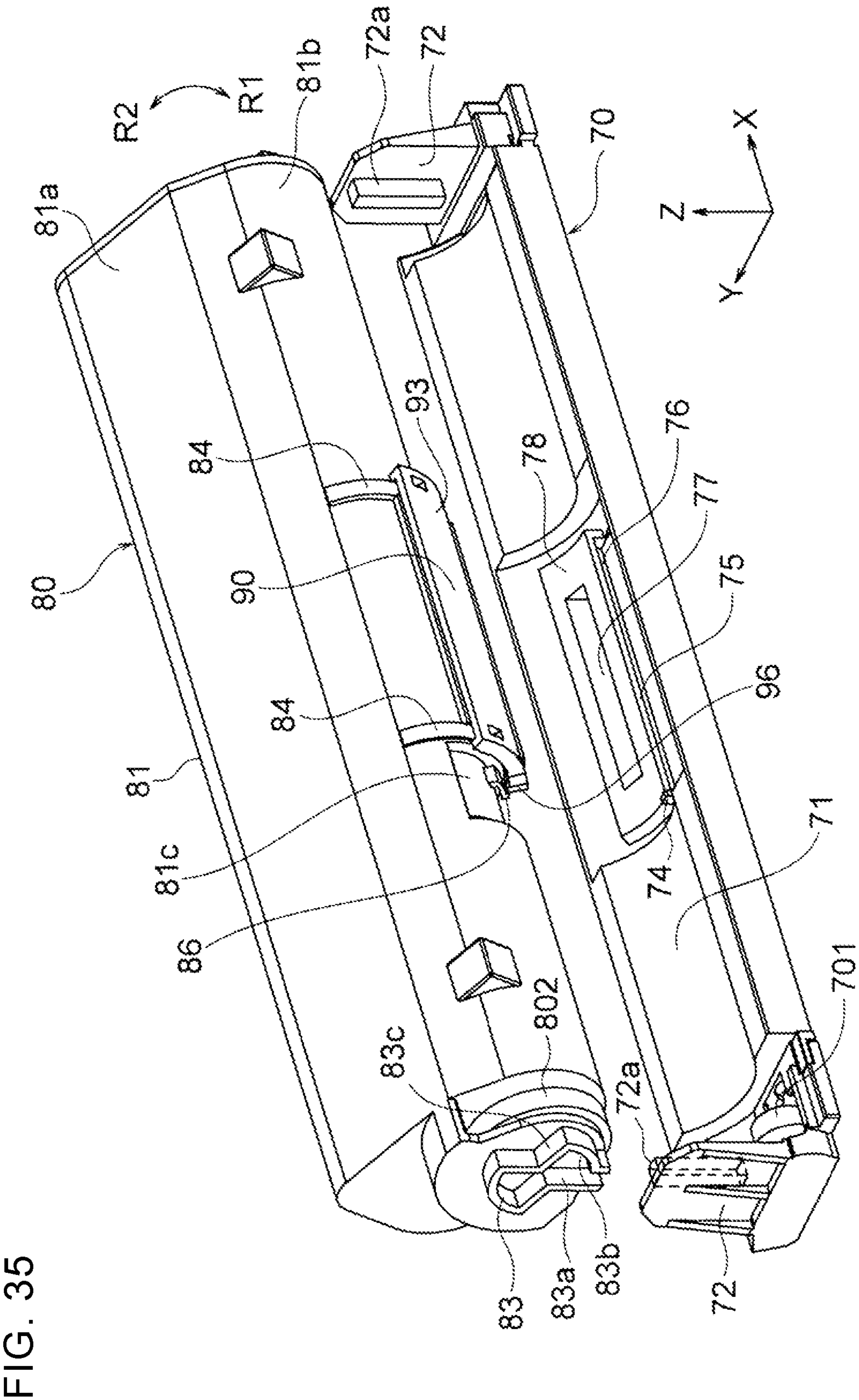
FIG. 35 is a diagram illustrating a perspective view of a developer container and a unit housing according to a second embodiment.
Figure 36:
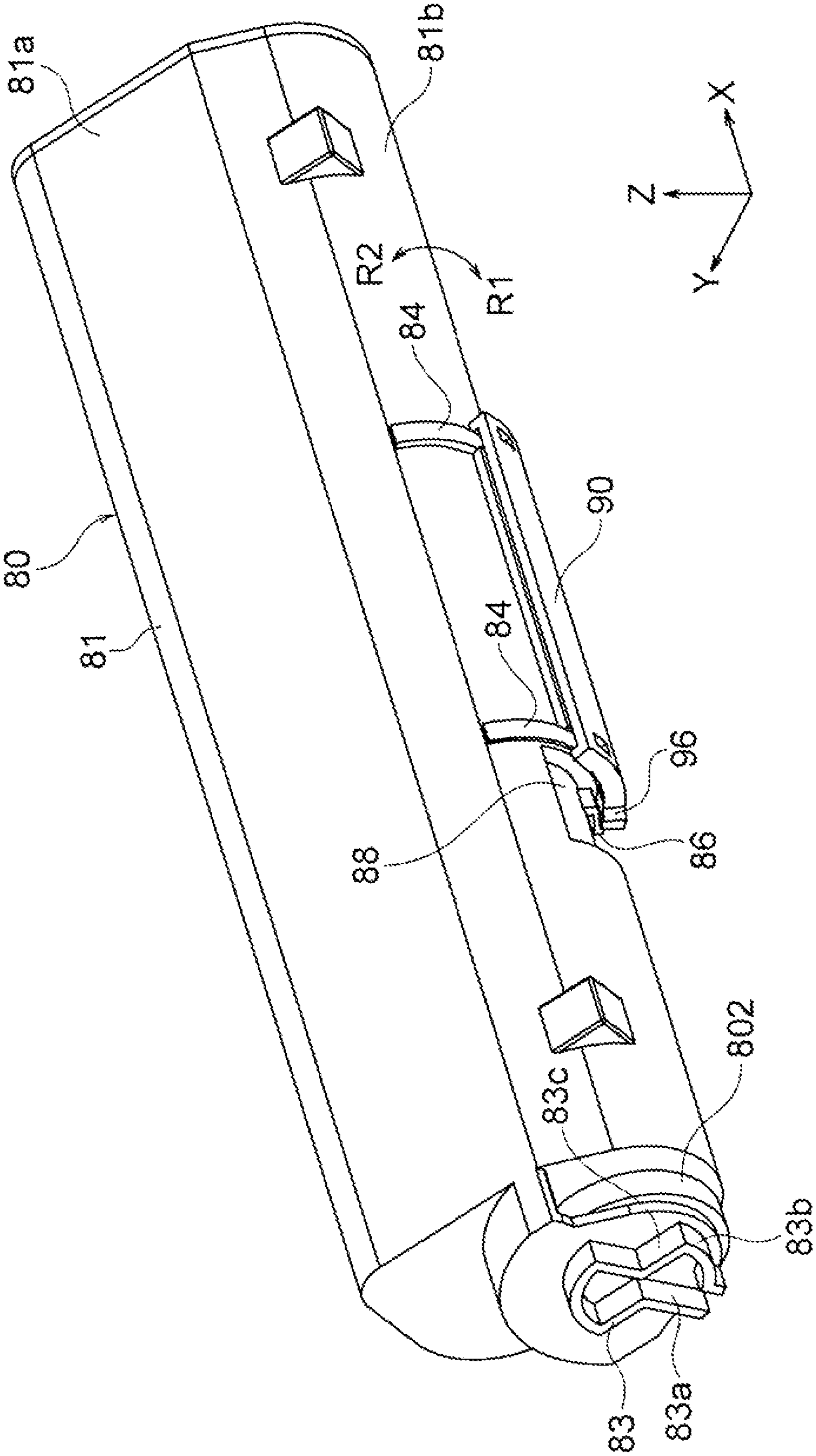
FIG. 36 is a diagram illustrating a perspective view of the developer container according to a second embodiment.
Figure 37:
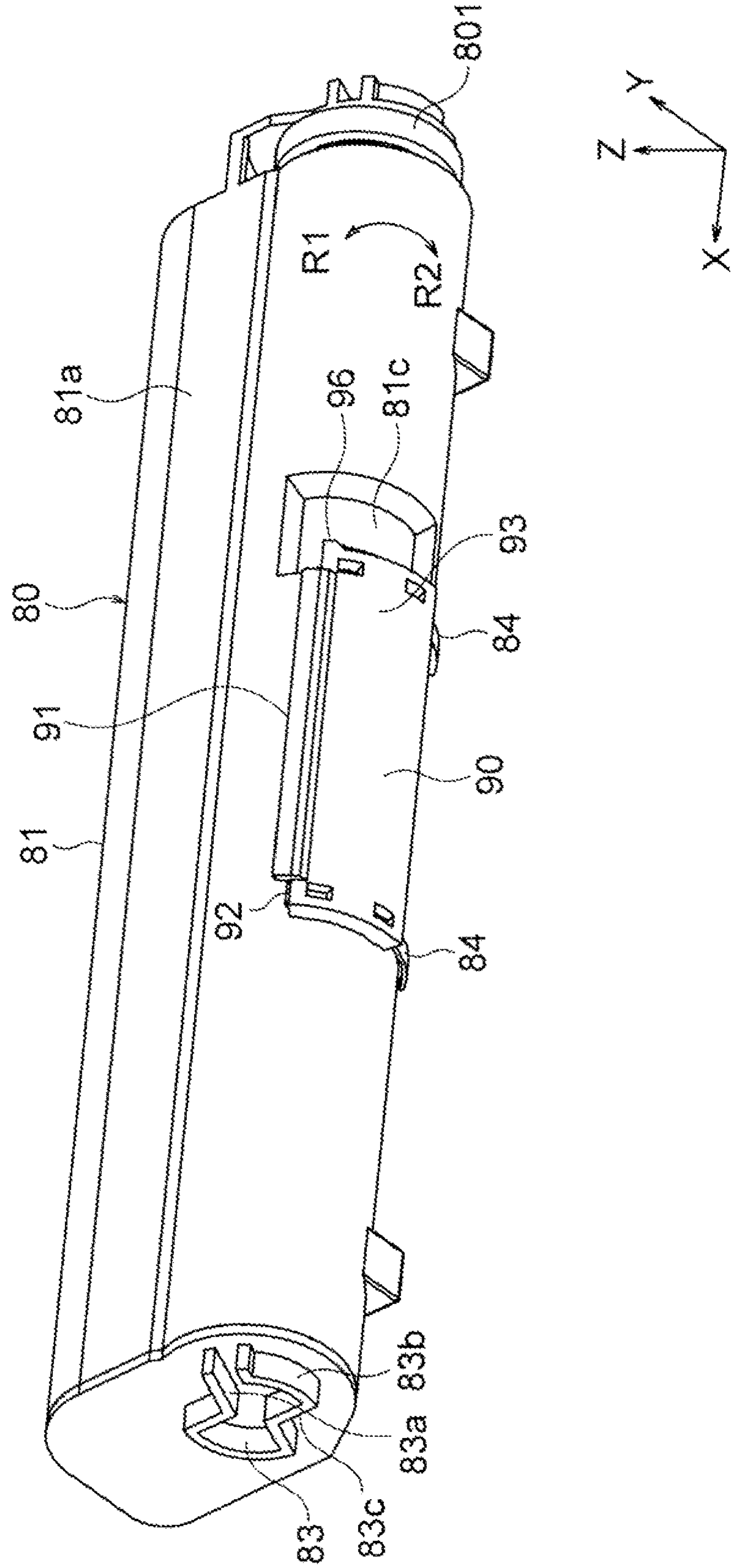
FIG. 37 is a diagram illustrating a perspective view of the developer container according to a second embodiment, viewed along a direction different from that of FIG. 36.
Figure 38:
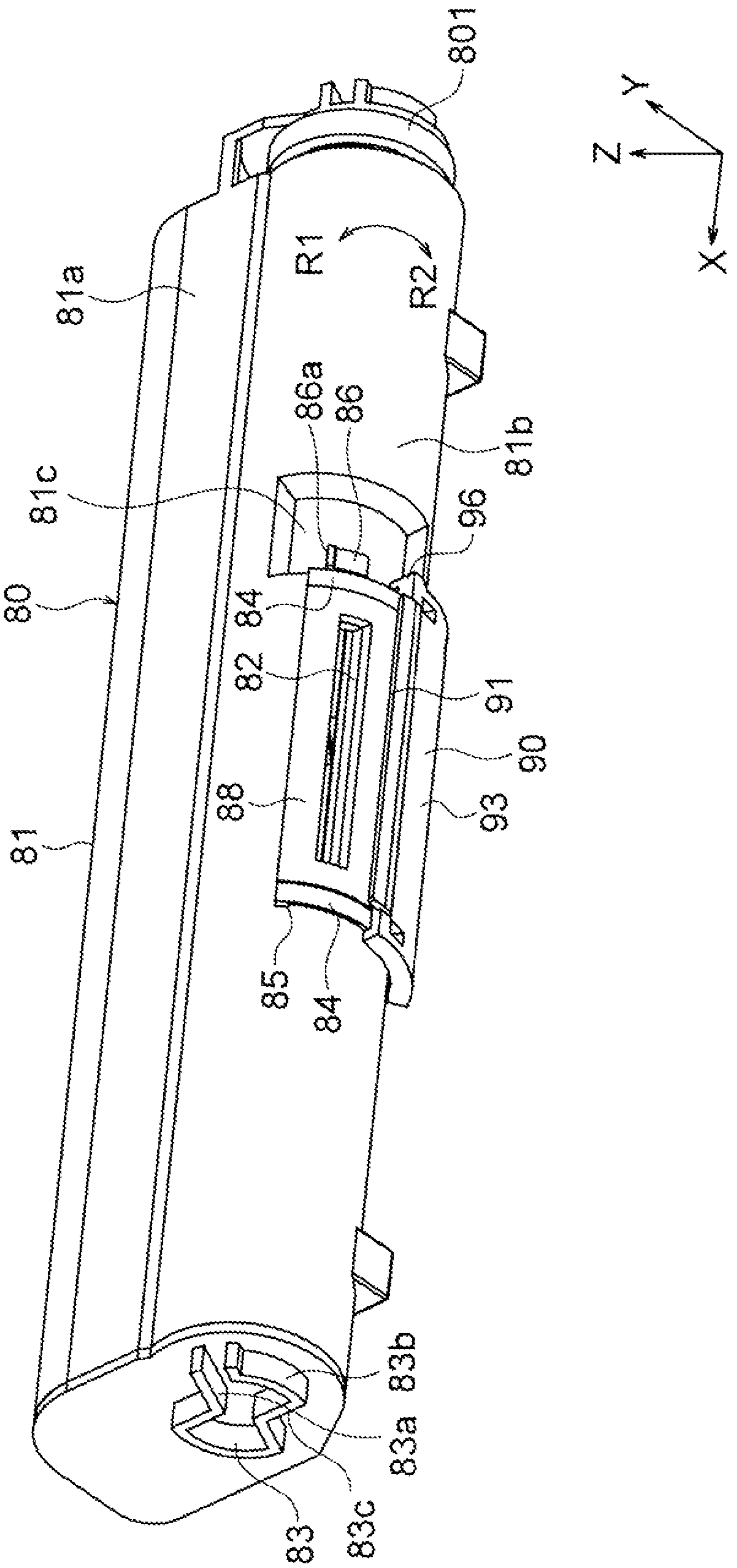
FIG. 38 is a diagram of a perspective view illustrating a state in which a supply port of the developer container is opened according to a second embodiment.

FIG. 35 is a diagram illustrating a perspective view of the developer container 80 and the unit housing 70. FIG. 36 is a diagram illustrating a perspective view of the developer container 80. FIG. 37 is a diagram illustrating a perspective view of the developer container 80 viewed from a different angle than that of FIG. 36. FIG. 38 is a diagram illustrating a perspective view of the developer container 80 with a supply port 82 (described later) opened.

In the following description, the clockwise direction when viewing in the +X direction is referred to as an R1 direction and the counterclockwise direction when viewing in the +X direction is referred to as an R2 direction. As described below, the developer container 80 is installed to the installed position on the unit housing 70 by rotating the developer container 80 in the R1 direction, while the developer container 80 is removed from the installed position by rotating the developer container 80 in the R2 direction (see FIG. 44A to FIG. 45B).

Thus, the R1 direction is also referred to as the attaching direction of the developer container 30 (or a first direction) and the R2 direction as the removal direction of the developer container 30 (or a second direction). Note that upon opening and closing the supply port 82, a housing 81 of the developer container 80 is rotated while a shutter 90 is kept still.

As illustrated in FIGS. 35 and 36, the developer container 80 includes the housing 81 that forms an outer shell thereof. The housing 81 is elongate in the X direction and includes an outer wall 81*a* and a bottom 81*b*. The outer wall 81*a* has a rectangular shape in a cross-section orthogonal to the X direction, and the bottom 81*b* has an abbreviated semi-cylindrical shape in the cross-section orthogonal to the X direction. However, the shape of the housing 81 is not limited thereto.

An inside of the housing 81 is a developer storage space or a developer storage portion where the developer is stored. In the housing 81, an agitating member 801 (FIG. 41B) configured to agitate the developer is provided. At an end of the housing 81 on the −X side, a gear 802 connected to the agitating member (a stirring member) 801 is provided.

An end of the outer wall 81*a* of the housing 81 on the −X side also includes a lock groove 83 as a first insertion/extraction guide. When attaching the developer container 80 to the unit housing 70, a guide rib 72*a* (described later) of the unit housing 70 is inserted into the lock groove 83.

The lock groove 83 includes an opening 83*a* through which the guide rib 72*a* is to be inserted in the Z direction. The lock groove 83 also includes an arc-shaped lock portion 83*b* configured to be engaged with the guide rib 72*a* (that is inserted in the lock groove 83 through the opening 83*a*) when the developer container 80 (the lock groove 83) is rotated, and a stopper portion 83*c* configured to contact with the guide rib 72*a* in the rotation direction.

The bottom 81*b* of the housing 81 is formed with the supply port 82 (FIG. 38). A sealing member 88 (FIG. 38), formed of an elastic material such as sponge, is attached to the bottom 81*b* of the housing 81 to surround the supply port 82.

The developer container 80 includes the shutter 90 as an opening/closing member configured to open and close the supply port 82 of the housing 81. The bottom 81*b* of the housing 81 includes a pair of shutter rails 84 that guide the shutter 90 in the rotational direction about a virtual axis in the X direction. The shutter 90 is configured to rotate with being guided by the shutter rails 84, so as to open the supply port 82 in an opening position illustrated in FIG. 38 and close the supply port 82 in a closing position illustrated in FIG. 37.

At an end of each shutter rail 84 in the R1 direction, a stopper 85 (FIG. 38) is formed to restrict the movement of the shutter 90 in the R1 direction relative to the shutter rail 84. The stopper 85 is, for example, a bend portion that bends radially inward from the R1 side end of the shutter rail 84.

The housing 81 of the developer container 80 is formed with a latch 86 as a first positioning portion adjacent to the −X side shutter rail 84 of the two shutter rails 84. The latch 86 is formed in an area 81*c* that is recessed one step lower from the surface of the bottom 81*b* of the housing 81.

The latch 86 is formed as a cantilever elongated in the rotation direction of the shutter 90. An end of the latch 86 in the R2 direction is connected to the housing 81, and an end (free end) of the latch 86 in the R1 direction includes a contact portion 86*a* (FIG. 38).

Figure 39:
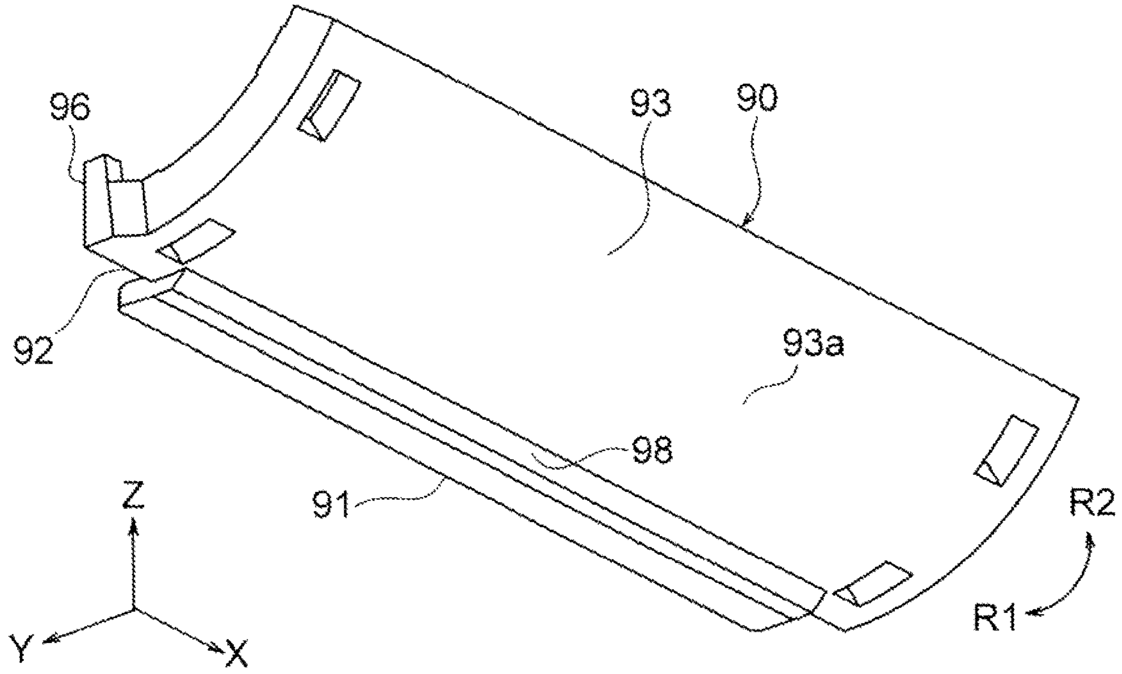
FIG. 39 is a diagram illustrating a perspective view of a shutter according to a second embodiment.
Figure 40:
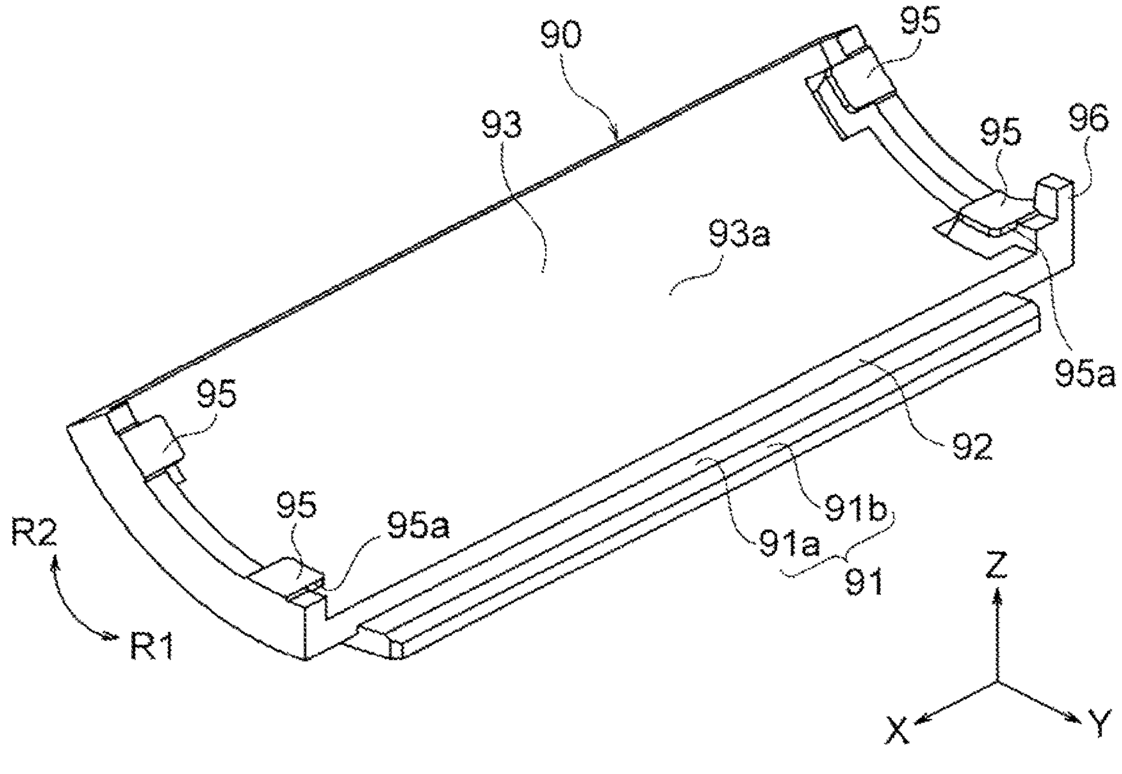
FIG. 40 is a diagram illustrating a perspective view of the shutter according to a second embodiment, viewed along a direction different from that of FIG. 39.

FIG. 39 is a diagram illustrating a perspective view of the shutter 90. FIG. 40 is a diagram illustrating a perspective view of the shutter 90 viewed from a direction different from that of FIG. 39. As illustrated in FIG. 39, the shutter 90 includes a cover portion 93 configured to cover (close) the supply port 82. The cover portion 93 includes a cover surface 93*a* facing the supply port 82. The cover surface 93*a* is a part of a cylindrical surface.

As illustrated in FIG. 40, at both ends of the cover portion 93 in the X direction, slide portions 95 (FIG. 40) are provided as second opening/closing guides that are to be engaged with the shutter rails 84 of the housing 81. Each of both ends of the cover portion 93 in the X direction includes two slide portions 95. One of the two slide portions 95 on the R1 side direction includes, at the R1 side end thereof, a stopper surface 95*a*.

The end of the shutter 90 on the −X side includes a projection 96 as a second positioning portion, which is configured to be engaged with the latch 86 of the housing 81 (FIG. 35). When the projection 96 of the shutter 90 is engaged with the latch 86 of the housing 81, the engagement causes the shutter 90 to be locked in a closing position where the shutter 90 closes the supply port 82.

At the end of the shutter 90 in the R1 side, a shutter side contact portion 92 is formed as a first contact portion (or a first movement restriction portion). The shutter side contact portion 92 is, for example, an end face orthogonal to the R1 direction.

At the end of the shutter 90 in the R1 side, a protrusion 91 is also formed. The protrusion 91 is formed on the opposite side of the housing 81 with respect to the shutter side contact portion 92 and is protruded in the R1 direction further than the shutter side contact portion 92. The protrusion 91 includes a flat portion 91*a*, which is a surface of the protrusion on the side of the housing 81 and an inclined portion 91*b* that is inclined with respect to the flat portion 91*a*. The inclined portion 91*b* is located on the R1 side relative to the flat portion 91*a*. The inclined portion 91*b* is inclined such that the inclined portion 91*b* is displaced away from a virtual cylindrical plane including the cover surface 93*a* as advancing in the R1 direction.

As illustrated in FIG. 39, a back surface 93*b* of the shutter 90, which is an opposite side of the cover surface 93*a* of the shutter 90, includes an inclined portion 98 adjacent to and provided on the R2 side of the protrusion 91. The inclined portion 98 is inclined such that the inclined portion 98 is displaced closer to a virtual cylindrical plane including the back surface 93*b* as advancing in the R2 direction. The inclined portion 98 is configured to be in contact with an elastic anchorage part 73 (described later) in a state where the developer container 80 is installed to the unit housing 70.

As illustrated in FIG. 35, the unit housing 70 includes a tray 71 serving as a support surface on which the developer container 80 is placed. The tray 71 is a part of a cylindrical plane centered on a virtual axis extending in the X direction. On the tray 71, the developer container 80 is rotatably supported.

A pair of walls 72 are provided on both sides of the tray 71 in the X direction. Each wall 72 is formed with a guide rib 72*a* as a second insertion/extraction guide, which is configured to be engaged with the lock groove 83 of the developer container 80.

At an approximately center of the tray 71 of the unit housing 70 in the X direction, a reception port 77 is formed to receive the developer supplied from the developer container 80. The developer received through the reception port 77 is supplied to the image formation unit 110. A sealing member may be placed to surround the reception port 77.

The unit housing 70 also includes a unit side contact portion 75 (a contact portion 75 of the unit housing 70) serving as a second contact portion (or a second movement restriction portion) adjacent to and provided on the R2 side of the reception port 77. The unit side contact portion 75 is configured to come in contact with a shutter side contact portion 92 (described later) of the shutter 90, so as to restrict the rotation of the shutter 90. The unit side contact portion 75 is, for example, an end face orthogonal to the rotation direction of the developer container 80.

An engagement recess 76 as an engagement portion is formed below (on the −Z side of) the unit side contact portion 75. An inside of the recess 76 is a space into which the protrusion 91 of the shutter 90 enters. The elastic anchorage part 73 (FIG. 41B) serving as an opening/closing anchorage part is adjacent to and provided on the R2 side of the recess 76 of the tray 71. The elastic anchorage part 73 is discussed later.

The unit housing 70 also includes a lock release post 74. The lock release post 74 contacts the contact portion 86*a* of the latch 86 of the developer container 80, causing the latch 86 to be deflected, thereby releasing the engagement between the latch 86 and the projection 96 of the shutter 90.

(Attaching Operation of Developer Container 80)

Figure 41A:
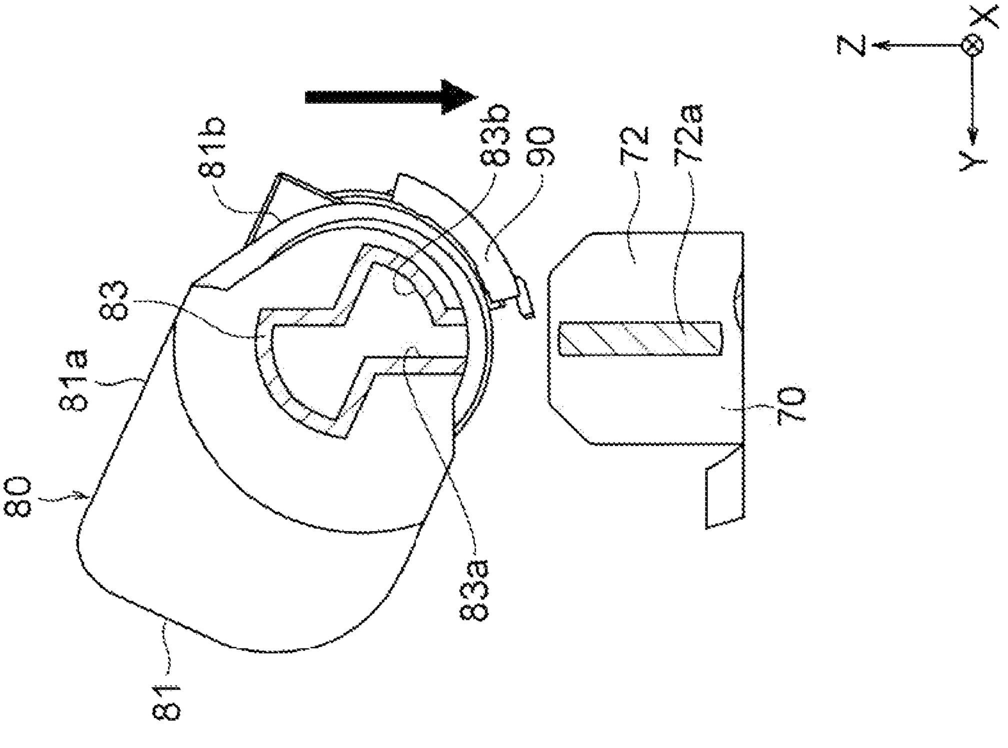
FIGS. 41A and 41B are diagrams of cross sectional views illustrating a first stage of an attaching operation of the developer container according to a second embodiment.
Figure 41B:
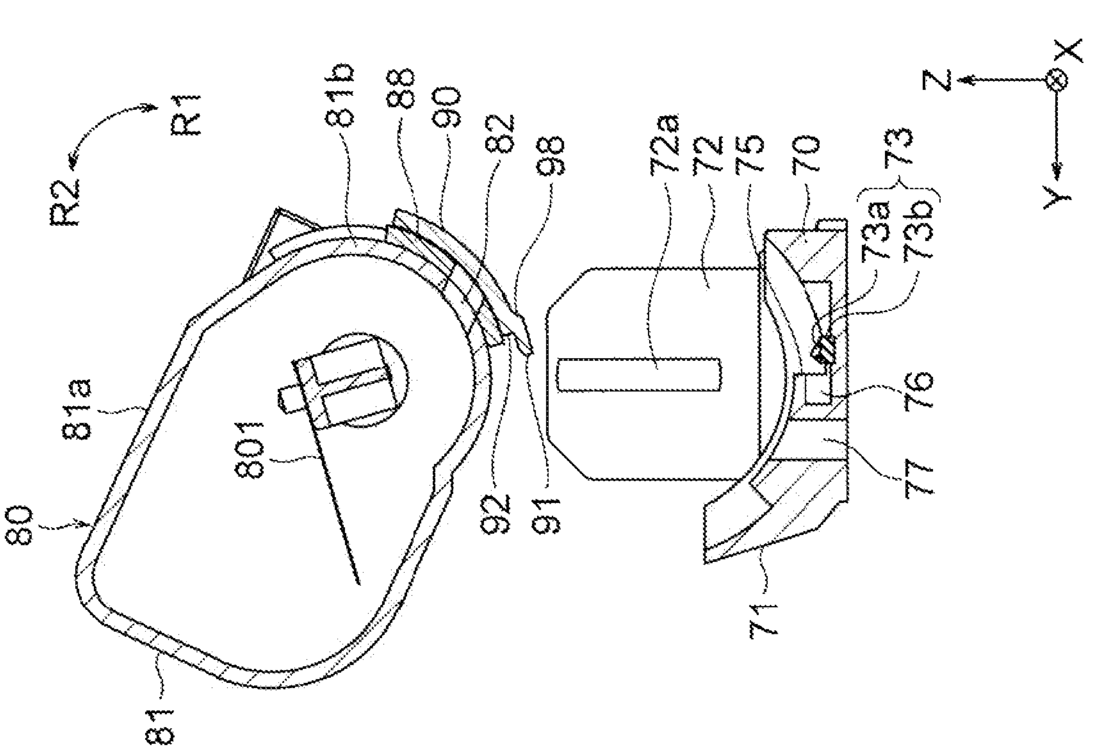

Next, an operation of attaching the developer container 80 to the unit housing 70 is described. FIGS. 41A and 41B are diagrams illustrating a first stage of the attaching operation of the developer container 80. FIG. 41A illustrates the end of the developer container 80 in the X direction, and FIG. 41B illustrates the central area of the developer container 80 in the X direction, i.e., the area including the supply port 82.

As illustrated in FIG. 41A, the developer container 80 is placed away from the unit housing 70 in the +Z direction, in order to move the developer container 80 toward the unit housing 70 in the −Z direction so as to place the developer container 80 onto the unit housing 70. In the state illustrated in FIG. 41B, by the engagement between the latch 86 (FIG. 35) of the developer container 80 and the projection 96 of the shutter 90, the shutter 90 is locked (secured) to the housing 81 of the developer container 80 at the closing position where the shutter 90 closes the supply port 82.

The unit housing 70 includes the elastic anchorage part 73 provided on the R2 side of the recess 76. The elastic anchorage part 73 includes a biasing portion 73*b* formed on the tray 71 and a contact portion 73*a*, which is configured to come in contact with the protrusion 91 of the shutter 90. The contact portion 73*a* and the biasing portion 73*b* may be integrally formed with an elastic material, or the contact portion 73*a* may be fixed to the biasing portion 73*b* formed of an elastic material. Note that the elastic anchorage part 73 is omitted in FIG. 35 described above.

Figure 42B:
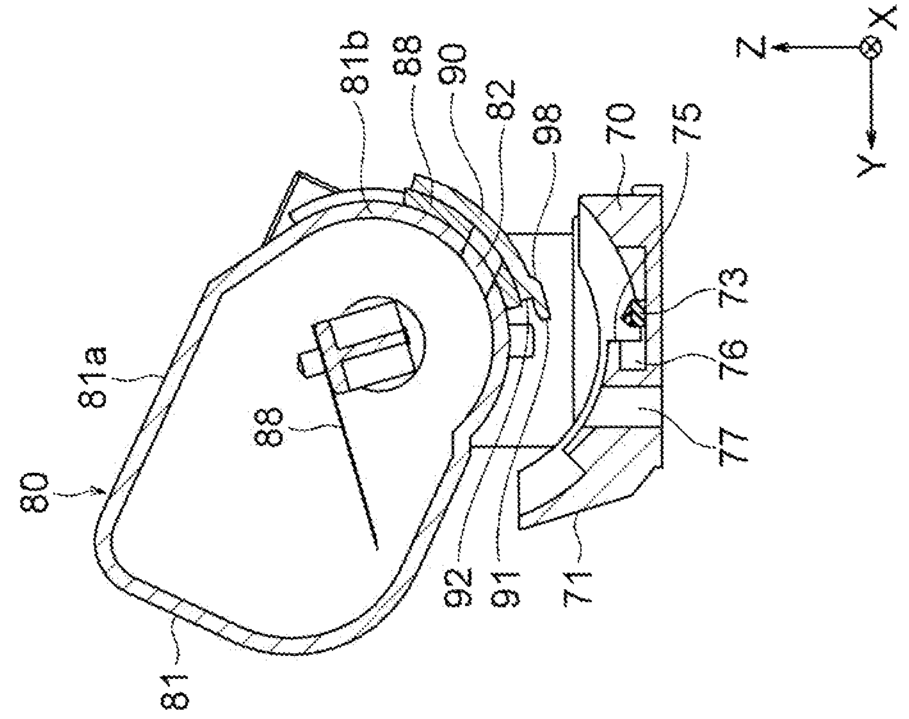
FIGS. 42A and 42B are diagrams of cross sectional views illustrating a second stage of the attaching operation of the developer container according to a second embodiment.
Figure 42A:
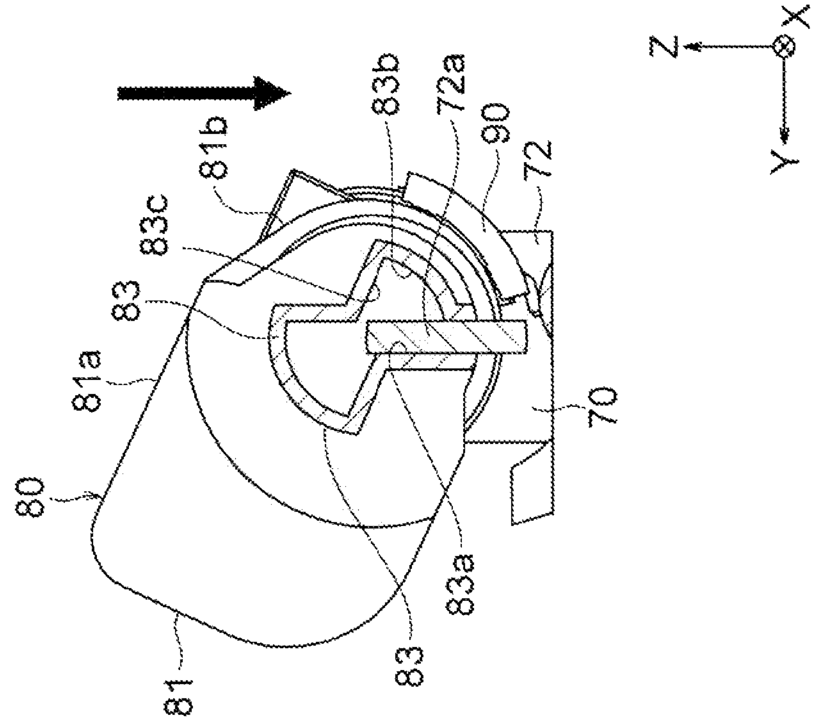

FIGS. 42A and 42B are diagrams illustrating a second stage of the attaching operation of the developer container 80. FIG. 42A illustrates the end of the developer container 80 in the X direction, and FIG. 42B illustrates the central area of the developer container 80 in the X direction, i.e., the area including the supply port 82.

As illustrated in FIG. 42A, the developer container 80 is moved toward the unit housing 70 in the −Z direction while inserting (engaging) the guide ribs 72*a* of the unit housing 70 into the lock grooves 83 of the developer container 80. That is, the guide rib 72*a* enters through the opening 83*a* of the lock groove 83 into the lock groove 83. At this stage, the shutter 90 is still in the closing position where the shutter 90 closes the supply port 82, as illustrated in FIG. 42B.

Figure 43B:
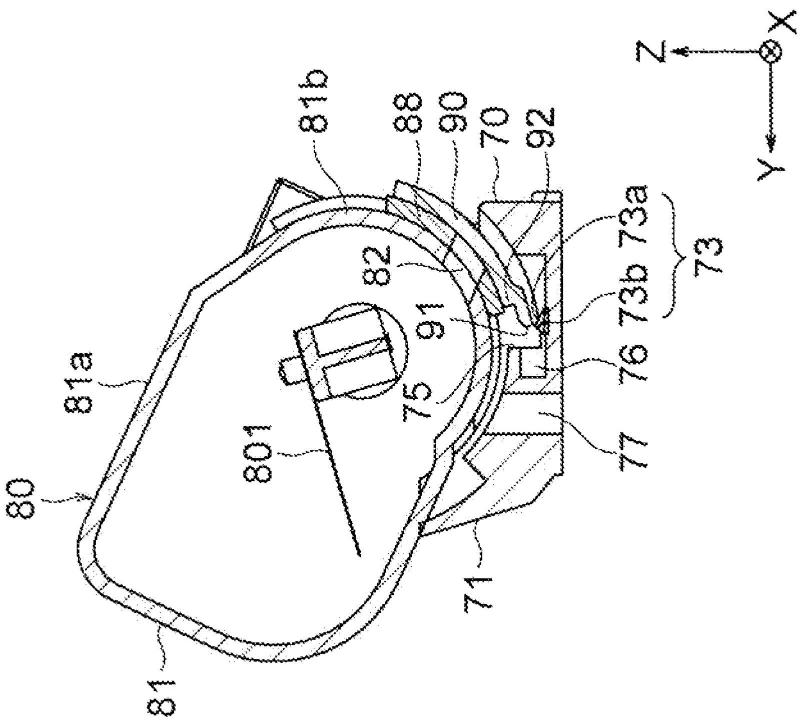
FIGS. 43A and 43B are diagrams of cross sectional views illustrating a third stage of the attaching operation of the developer container according to a second embodiment.
Figure 43A:
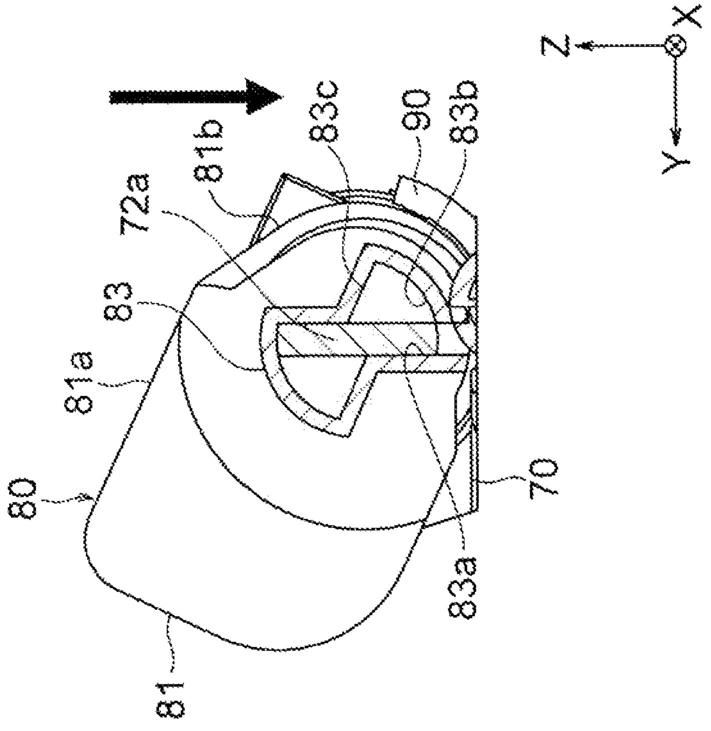

FIGS. 43A and 43B are diagrams illustrating a third stage of the attaching operation of the developer container 80. FIG. 43A illustrates the end of the developer container 80 in the X direction, and FIG. 43B illustrates the central area of the developer container 80 in the X direction, i.e., the area including the supply port 82.

By further moving the developer container 80 in the −Z direction, the guide rib 72*a* of the unit housing 70 is completely inserted in the lock groove 83, as illustrated in FIG. 43A. Also, as illustrated in FIG. 43B, the bottom 81*b* of the developer container 80 is contact with the tray 71 of the unit housing 70. With this, the developer container 80 is rotatably held on the tray 71 of the unit housing 70.

Also, the protrusion 91 of the shutter 90 comes in contact with the contact portion 73*a* of the elastic anchorage part 73 of the unit housing 70, which presses the elastic anchorage part 73 down in the −Z direction, compressing the biasing portion 73*b* of the elastic anchorage part 73.

Figure 44B:
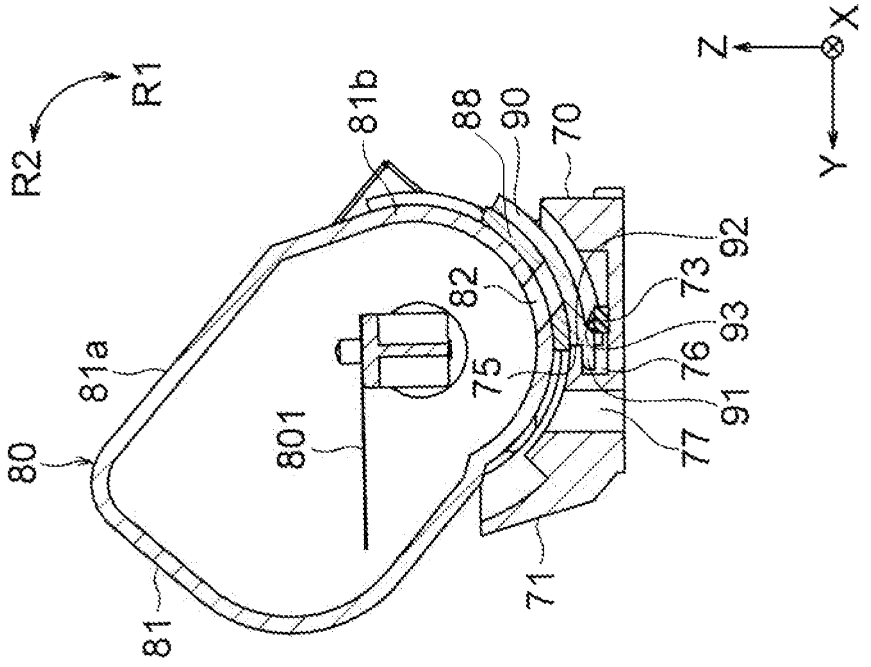
FIGS. 44A and 44B are diagrams of cross sectional views illustrating a fourth stage of the attaching operation of the developer container according to a second embodiment.
Figure 44A:
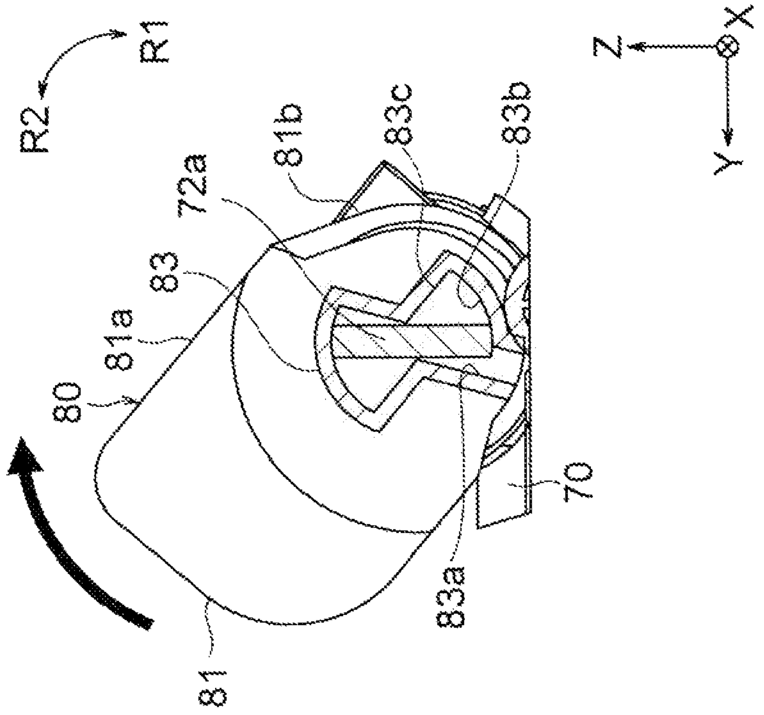

FIGS. 44A and 44B are diagrams illustrating a fourth stage of the attaching operation of the developer container 80. FIG. 44A illustrates the end of the developer container 80 in the X direction, and FIG. 44B illustrates the central area of the developer container 80 in the X direction, i.e., the area including the supply port 82.

By rotating the developer container 80 in the R1 direction, the arc-shaped lock portion 83*b* of the lock groove 83 of the developer container 80 comes in contact with the −Z side end of the guide rib 72*a* of the unit housing 70, as illustrated in FIG. 44A. With this, the developer container 80 is secured so that the developer container 80 cannot be removed from the unit housing 70.

Also, as illustrated in FIG. 44B, the shutter side contact portion 92 of the shutter 90 comes in contact with the unit side contact portion 75 of the unit housing 70, and the protrusion 91 of the shutter 90 enters the recess 76 of the unit housing 70. With this, the rotation of the shutter 90 in the R1 direction with respect to the unit housing 70 is restricted.

In addition, the lock release post 74 (FIG. 35) of the unit housing 70 comes in contact with the contact portion 86*a* (FIG. 38) of the latch 86 of the developer container 80, causing the latch 86 to be deflected. With this, the engagement between the latch 86 of the developer container 80 and the projection 96 (FIG. 35) of the shutter 90 is released, and thus the shutter 90 becomes rotatable relative to the housing 81 of the developer container 80.

Figure 45B:
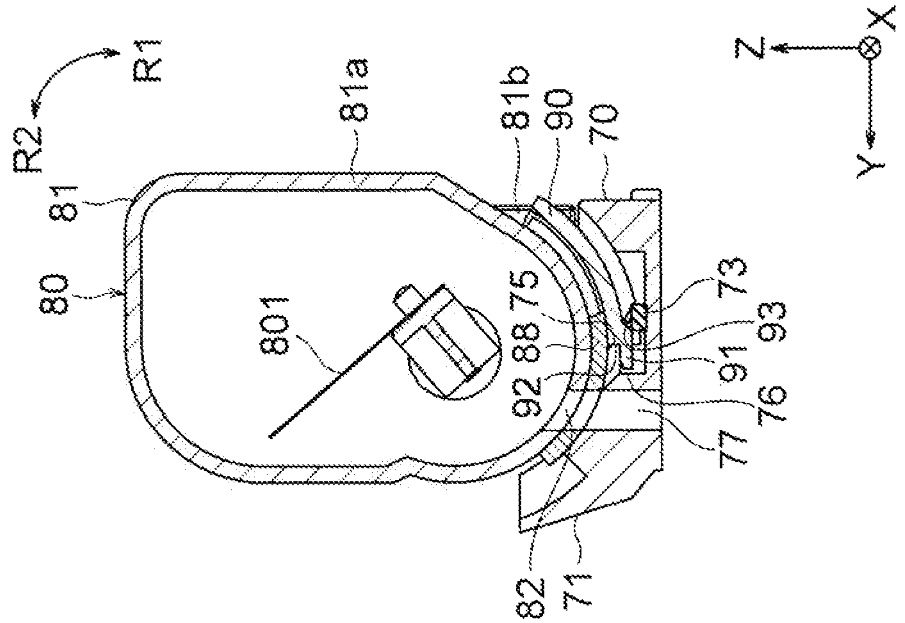
FIGS. 45A and 45B are diagrams of cross sectional views illustrating a fifth stage of the attaching operation of the developer container according to a second embodiment.
Figure 45A:
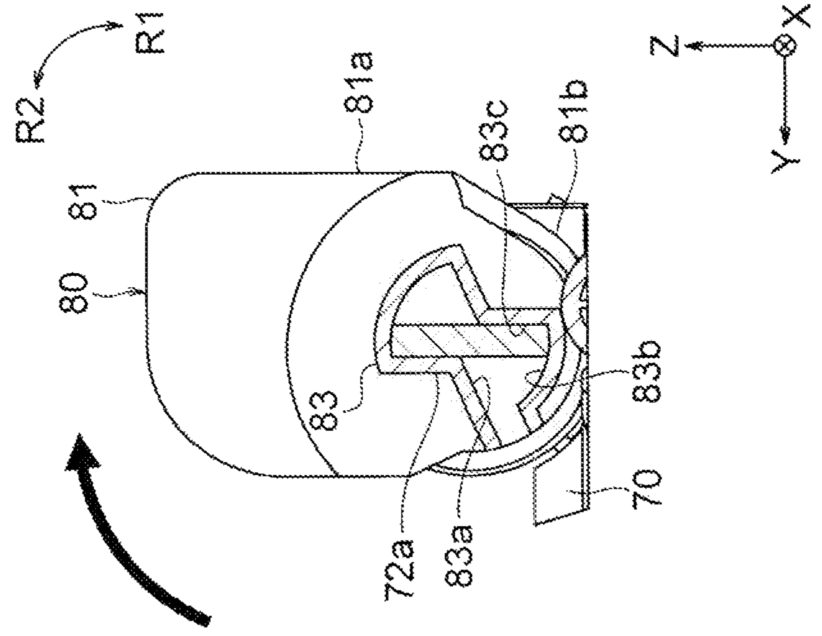

FIGS. 45A and 45B are diagrams illustrating a fifth stage of the attaching operation of the developer container 80. FIG. 45A illustrates the end of the developer container 80 in the X direction, and FIG. 45B illustrates the center area of the developer container 80 in the X direction, i.e., the area including the supply port 82.

As illustrated in FIG. 45A, by further rotating the developer container 80 in the R1 direction, the stopper portion 83*c* of the lock groove 83 comes in contact with the side surface of the guide rib 72*a* in the rotational direction. This restricts the rotation of the developer container 80 relative to the unit housing 70 in the R1 direction. In other words, the developer container 80 reaches the installed position.

Also as illustrated in FIG. 45B, since the movement of shutter 90 in the R1 direction is restricted, the housing 81 of the developer container 80 is rotated in the R1 direction with leaving the shutter 90 behind, which causes the supply port 82 to be opened. In other words, the shutter 90 rotates relative to the housing 81 of the developer container 80 in the R 2 direction, so as to open the supply port 82. As a result, the supply port 82 of the developer container 80 and the reception port 77 of the unit housing 70 are aligned with and connected to each other. With this, the developer in the developer container 80 can be supplied from the supply port 82 to the reception port 77.

In this state, when the gear 802 (FIG. 35) is rotated by the drive gear in the image formation apparatus 1A, the agitating member 801 rotates. This agitates the developer in the developer container 80 and transports the developer from the supply port 82 to the reception port 77. The developer transported to the reception port 77 is supplied to the image formation unit 110 (FIG. 33). In other words, the image formation apparatus 1A becomes ready for performing a printing operation with the developer.

(Detaching Operation of Developer Container 80)

Figures 46A, 46B, 46C:
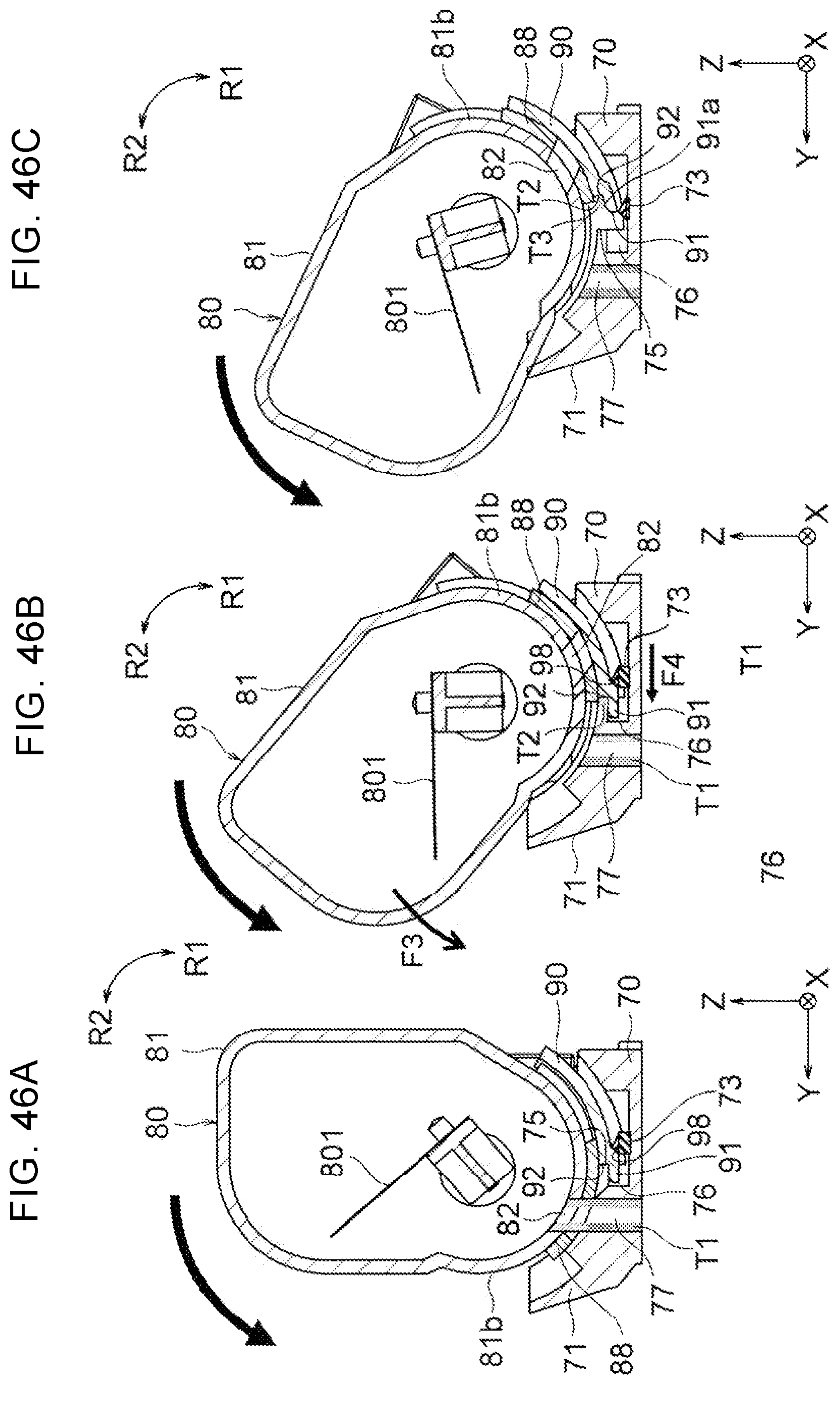
FIGS. 46A, 46B, and 46C are diagrams of cross sectional views illustrating a detaching operation of the developer container according to a second embodiment.

Next, an operation of detaching (removing) the used developer container 80 from the unit housing 70 is described. FIGS. 46A to 46C are diagrams of cross sectional views illustrating a first stage, a second stage, and a third stage of the detaching operation of the developer container 80, respectively. FIGS. 46A to 46C all illustrate the cross sectional views of a portion of the developer container 80 that includes the supply port 82.

In a state where the developer container 80 is used up, i.e., where all the developer in the developer container 80 is discharged, as indicated by a reference sign T1 in FIG. 46A, the developer is adhered to the inner wall surfaces of the supply port 82, the sealing member 88, and the reception port 77.

In the state the developer container 80 is in the installed position, the movement of the shutter 90 in the −X direction is restricted by the engagement between the inclined portion 98 of the shutter 90 and the elastic anchorage part 73.

Therefore, as illustrated in FIG. 46B, when the developer container 80 is rotated in the R2 direction, the housing 81 of the developer container 80 is rotated in the R2 direction while the shutter 90 is left behind. In other words, the shutter 90 moves relative to the housing 81 of the developer container 80 in the R1 direction and thereby closes the supply port 82.

As the developer container 80 rotates in the R2 direction, the inner wall surfaces of the supply port 82 of the developer container 80 on the upstream side and the downstream side in the R2 direction pass over the shutter side contact portion 92. With this rotation operation, the developer that is adhered to the inner wall surfaces of the supply port 82 is scraped off by the shutter side contact portion 92 and thus is adhered to the shutter side contact portion 92 as illustrated by the reference sign T2.

When the shutter 90 reaches the closing position where the shutter 90 closes the supply port 82, the latch 86 (FIG. 35) of the developer container 80 is engaged with the projection 96 of the shutter 90, and also the stopper 85 of the developer container 80 comes in contact with the stopper surface 95*a* (FIG. 40) of the shutter 90. This regulates the movement of the shutter 90 relative to the housing 81 of the developer container 80. In other words, the shutter 90 gets in the state where the shutter 90 moves integrally with the housing 81 of the developer container 80.

Although the inclined portion 98 of the shutter 90 is in contact with the elastic anchorage part 73 of the unit housing 70, when the force F3 applied by the user by pulling the developer container 80 is greater than the force F4 that the inclined portion 98 receives from the elastic anchorage part 73 (F3>F4), the biasing portion 73*b* of the elastic anchorage part 73 is compressed to release the rotation restriction of the shutter 90. With this, the developer container 80 (including the shutter 90) is allowed to rotate in the R2 direction.

Next, as illustrated in FIG. 46C, when the developer container 80 is further rotated in the R2 direction, the shutter side contact portion 92 of the shutter 90 is separated away from the unit side contact portion 75 in the R2 direction and the protrusion 91 of the shutter 90 comes out of the recess 76 of the unit housing 70 in the R2 direction.

In this rotation operation, a portion of the developer T2 that is adhered to the shutter side contact portion 92 falls and is then adhered onto the flat portion 91*a* of the protrusion 91 as illustrated by the reference sign T3.

In this state, as illustrated in FIG. 42A described above, the guide rib 72*a* of the unit housing 70 has been separated from the lock portion 83*b* of the lock groove 83 and reached the opening 83*a* of the lock groove 83. Therefore, by lifting the developer container 80 in the +Z direction, the developer container 80 can be removed from the unit housing 70.

That is, the developer container 80 is removed from the unit housing 70, with the developer T2 being adhered to the shutter side contact portion 92 and the developer T3 being adhered onto the flat portion 91*a* of the protrusion 91.

Since the developer container 80 is removed with the developer T2 being adhered to the shutter side contact portion 92 and the developer T3 being adhered to the flat portion 91*a* of the protrusion 91, this prevents the surroundings of the developer container 80 from being contaminated with the developer.

Figure 47:
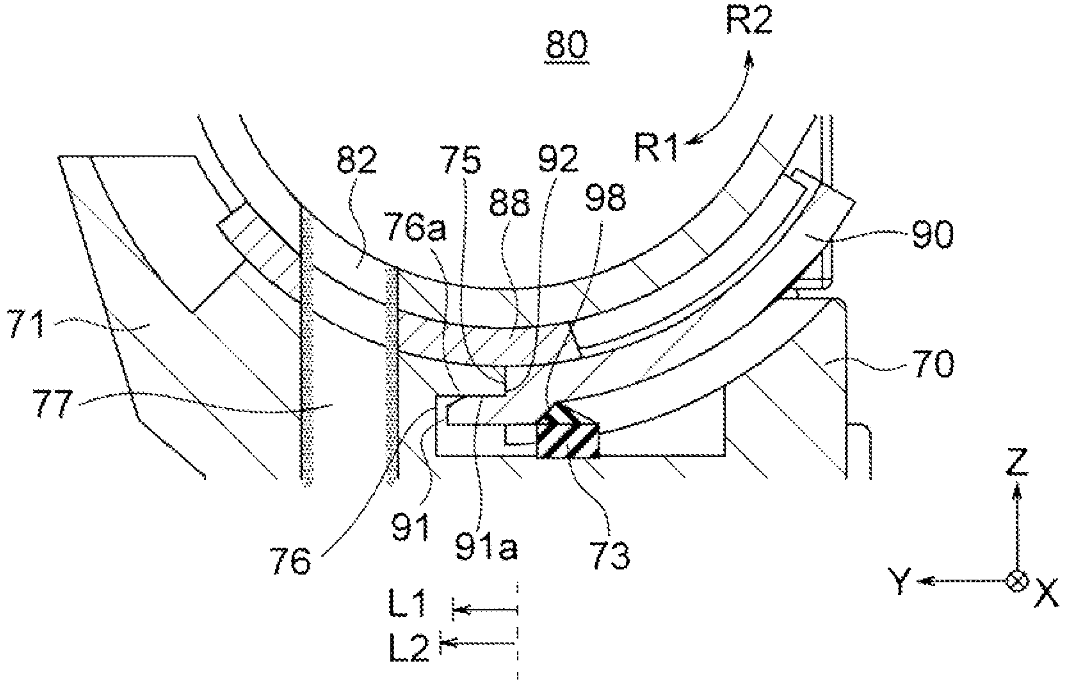
FIG. 47 is a schematic diagram illustrating an engagement section between the developer container and a unit housing according to a second embodiment.

FIG. 47 is a diagram illustrating the vicinity of the supply port 82 of the developer container 80 in the state where the developer container 80 is in the installed position (FIG. 45B). When the protrusion 91 of the shutter 90 is engaged with the recess 76 of the unit housing 70, the flat portion 91*a* of the protrusion 91 is in contact with the top surface 76*a* of the recess 76. As a result, the distance between the housing 81 of the developer container 80 and the unit housing 70 is kept constant.

Therefore, as illustrated in FIGS. 44B and 45B, the sealing member 88 passes over the unit housing 70 with the sealing member 88 being pressed between the housing 81 and the unit housing 70. Therefore, the amount of the developer that is adhered onto the protrusion 91 when the developer container 80 is removed can be reduced. Also, as in explained in a first embodiment with reference to FIGS. 26A to 27B, when a new developer container 80 is installed into the unit housing 70 from which one or more used developer containers 80 have been removed, the developer remaining around the reception port 77 of the unit housing 70 can be efficiently removed.

The distance L2 by which the recess 76 is recessed in the R1 direction from the unit side contact portion 75 is greater than the distance L1 by which the protrusion 91 protrudes in the R1 direction from the shutter side contact portion 92. Therefore, with the shutter side contact portion 92 and the unit side contact portion 75 in contact without any gap, the protrusion 91 can be engaged with the recess 76.

(Effects of Second Embodiment)

As explained above, in a second embodiment, the developer container 80 includes the shutter 90 (the opening/closing member) configured to open and close the supply port 82 of the housing 81 and the sealing member 88 provided between the housing 81 and the shutter 90. The shutter 90 includes: the cover portion 93 including the cover surface 93*a* configured to close the supply port 82 of the developer container 80; and the protrusion 91 (the protruding portion) protruded from the cover portion 93 in the R1 direction (in the attaching direction of the developer container 80). The protrusion 91 is provided at the position spaced away from the cover surface 93*a* toward the unit housing 70. The unit housing 70 includes the recess 76 (the engagement portion) that is configured to be engaged with the protrusion 91 of the shutter 90 in the state where the developer container 80 is installed (attached) to the unit housing 70.

According to a second embodiment, since the shutter 90 includes the protrusion 91, when the developer container 80 is removed from the unit housing 70, the developer that falls from the inner wall of the supply port 82 during the removal of the developer container 80 is retained on the protrusion 91 of the shutter 90. This prevents the developer from spilling out of the developer container 80. In other words, it is possible to prevent the surroundings of the developer container 80 from becoming contaminated with the developer.

Further in a second embodiment, at a certain point after the protrusion 91 and the recess 76 are engaged and before the supply port 82 and the reception port 77 are opposed (aligned) to each other in the course of attaching the developer container 80, a part of the recess 76 (the top surface 76*a* of the recess 76) is located between the protrusion 91 and the sealing member 88. Thus, the amount of the developer that is adhered to the protrusion 91 during the removal of the developer container 80 can be reduced.

Further in a second embodiment, in the state where the protrusion 91 of the shutter 90 is engaged with the recess 76 of the unit housing 70, the developer container 80 is moved to the installed position (the position where the supply port 82 and the reception port 78 are aligned with each other) so as to open the supply port 82 with the shutter 90. With this configuration, the shutter 90 is only opened when the supply port 82 and the reception port 77 are opposed to each other, which may reliably prevent the leakage of the developer.

(Modification)

Figure 48:
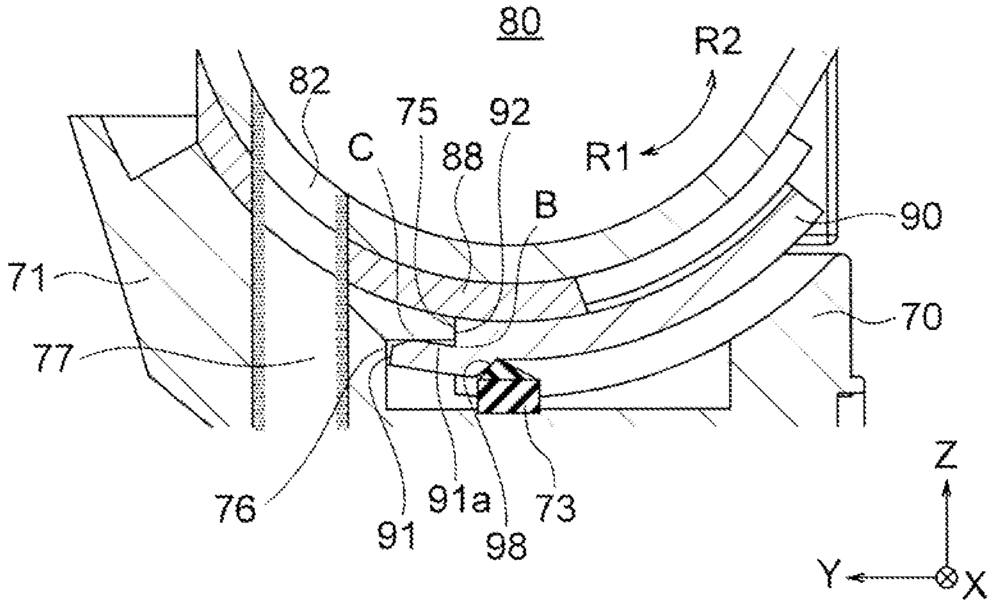
FIG. 48 is a schematic diagram illustrating an engagement section between an opening/closing member and a unit housing according to a modification.

Next, a modification of a second embodiment is described. FIG. 48 is a diagram illustrating an engagement section between the developer container 80 and the unit housing 70 according to a modification.

In a second embodiment (FIG. 47), the flat portion 91*a* of the protrusion 91 is horizontal, i.e., parallel to the X-Y plane in the state where the protrusion 91 is engaged with the recess 76. To the contrary, in a modification illustrated in FIG. 48, in the state where the protrusion 91 is engaged with the recess 76, the flat portion 91*a* of the protrusion 91 is inclined with respect to the X-Y plane such that the flat portion 91*a* is displaced in the −Z direction as advancing in the R2 direction (i.e., as approaching the shutter side contact portion 92).

In illustrated in FIG. 48, in the state where the protrusion 91 is engaged with the recess 76, a lowest point, in the vertical direction, of a surface of the protrusion 91 on the developer container 30 side is referred to as a lowest point B of an upper surface of the protrusion 91. A certain area C of the upper surface of the protrusion 91 that is positioned on the R1 side (in the first direction) with respect to the lowest point B of the upper surface of the protrusion 91 is located upper in the vertical direction than the lowest point B of the upper surface of the protrusion 91. The area C of the protrusion 91 is, for example, a contact portion configured to come in contact with the top surface 76*a* of the recess 76.

With this configuration, the developer that is scraped off by the unit side contact portion 75 and falls onto the flat portion 91*a* during the removal of the developer container 80 is guided to a side of the flat portion 91*a* closer to the unit side contact portion 75 (guided to a proximal side of the flat portion 91*a*).

Therefore, even after the developer container 80 is removed from the unit housing 70, the developer is held at the proximal side of the flat portion 91*a* of the protrusion 91 and thus is not likely to spill out. As a result, the effect of preventing the surroundings of the developer container 80 from becoming contaminated with developer can be enhanced.

In a modification described above, the case has been described in which the flat portion 91*a* of the protrusion 91 is inclined. However, a hole as in the hole 41*c* illustrated in FIG. 31 may be provided between the flat portion 91*a* of the protrusion 91 and the shutter side contact portion 92 (i.e., on the R2 side with respect to the flat portion 91*a*).

Further, an inclined portion, such as the inclined portion 26*b* illustrated in FIG. 30, may be provided between the top surface 76*a* of the recess 76 and the unit side contact portion 75 of the unit housing 70.

Furthermore, the supply port 82 of the developer container 80 may be provided with an inclined portion, such as the inner wall surface 32*a* illustrated in FIG. 32B.

Although one or more embodiments and modifications have been described above, the disclosure is not limited thereto, and various improvements or modifications can be made. Each of one or more embodiments and modifications can be combined as appropriate.

Although in one or more embodiments and modifications described above, the case has been described in which a printer is an example of an image formation apparatus. However, one or more embodiments and modifications described above can be also used in copiers, facsimiles, MFPs (multi-functional peripherals), etc. as an image formation apparatus.

The invention includes other embodiments or modifications in addition to one or more embodiments and modifications described above without departing from the spirit of the invention. The one or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A developer supply device comprising:

a developer container including a housing with a supply port, and containing a developer therein; and a developer container holder that includes a reception port to receive the developer supplied from the supply port of the developer container, and to which the developer container is to be attached in a first direction, wherein the developer container includes:

an opening/closing member movable relative to the housing between a closing position where the opening/closing member closes the supply port and an opening position where the opening/closing member opens the supply port; and a sealing member provided between the housing and the opening/closing member, the opening/closing member includes:

a cover portion including a cover surface configured to close the supply port; and a protruding portion projected in the first direction from the cover portion and provided at a position spaced apart from the cover surface to a side of the developer container holder, the developer container holder includes an engagement portion configured to be engaged with the protruding portion in a state where the developer container is attached to the developer container holder, and a part of the engagement portion is located between the protruding portion and the sealing member at a point after the protruding portion of the opening/closing member is engaged with the engagement portion of the developer container holder and before the supply port of the developer container and the reception port of the developer container holder are opposed to each other in a course of attaching the developer container to the developer container holder.

2. The developer supply device according to claim 1, wherein the opening/closing member is configured to open the supply port, by moving the developer container to a position where the supply port and the reception port are opposed to each other in a state where the protruding portion is engaged with the engagement portion.

3. The developer supply device according to claim 1, wherein the opening/closing member includes a first contact portion, the developer container holder includes a second contact portion, and the first contact portion and the second contact portion are configured to be opposed to and in contact with each other in the first direction after the protruding portion is engaged with the engagement portion until the supply port and the reception port are opposed to each other.

4. The developer supply device according to claim 3, wherein the engagement portion of the developer container holder includes a recess that is provided on a side opposite to the housing of the developer container with respect to the second contact portion and is recessed in the first direction than the second contact portion, and the protruding portion is configured to inserted in the recess when the protruding portion and the engagement portion are engaged with each other.

5. The developer supply device according to claim 4, wherein a distance by which the recess is recessed in the first direction than the second contact portion is greater than a distance by which the protruding portion protrudes in the first direction than the first contact portion.

6. The developer supply device according to claim 4, wherein the protruding portion includes a first inclined portion that is inclined such that the first inclined portion slopes away from the housing as advancing in the first direction, a second inclined portion provided to be opposed to the first inclined portion is formed between the second contact portion and the recess, and the first inclined portion and the second inclined portion are configured, when the protruding portion is engaged with the engagement portion, to come in contact with each other thereby bringing the developer container and the developer container holder closer together.

7. The developer supply device according to claim 3, wherein the protruding portion is protruded in the first direction from a portion of the cover portion on the side of the developer container holder with respect to the first contact portion, and a surface of the protruding portion on a side of the developer container includes a hole.

8. The developer supply device according to claim 1, wherein the developer container is elongate in a longitudinal direction thereof parallel to the first direction, and the developer container is configured, by being moved in the longitudinal direction of the developer container, to be attached to an installed position of the developer container to the developer container holder.

9. The developer supply device according to claim 1, wherein the developer container is elongate in a longitudinal direction thereof, and the developer container is configured, by being rotated about a rotation axis thereof extending in the longitudinal direction of the developer container, to be moved to an installed position of the developer container to the developer container holder, and the first direction is a rotation direction about the rotation axis of the developer container.

10. The developer supply device according to claim 9, wherein in a state where the protruding portion is engaged with the engagement portion, a lowest point, in a vertical direction, of a surface of the protruding portion on a side of the developer, is referred to as a lowest point of a first surface of the protruding portion, and a certain area of the first surface of the protruding portion that is on a side of the first direction with respect to the lowest point of the first surface is provided above than the lowest point of the first surface in the vertical direction.

11. A development device comprising:

the developer supply device of claim 1.

12. An image formation apparatus comprising the developer supply device according to claim 1.

* * * * *